United States Patent
Sobolewski et al.

(10) Patent No.: US 10,458,441 B2
(45) Date of Patent: *Oct. 29, 2019

(54) ROTARY PISTON ACTUATOR ANTI-ROTATION CONFIGURATIONS

(71) Applicant: Woodward, Inc., Fort Collins, CO (US)

(72) Inventors: Pawel A. Sobolewski, Arlington Heights, IL (US); Joseph H. Kim, Valencia, CA (US); Robert P. O'Hara, Castaic, CA (US); Shahbaz H. Hydari, Los Angeles, CA (US); Zenon P. Szulyk, Mount Prospect, IL (US)

(73) Assignee: Woodward, Inc., Fort Collins, CO (US)

( * ) Notice: Subject to any disclaimer, the term of this patent is extended or adjusted under 35 U.S.C. 154(b) by 245 days.

This patent is subject to a terminal disclaimer.

(21) Appl. No.: 15/494,157

(22) Filed: Apr. 21, 2017

(65) Prior Publication Data
US 2017/0218983 A1 Aug. 3, 2017

Related U.S. Application Data

(63) Continuation of application No. 14/491,523, filed on Sep. 19, 2014, now Pat. No. 9,631,645, which is a
(Continued)

(51) Int. Cl.
*F15B 15/12* (2006.01)
*F15B 15/06* (2006.01)
(Continued)

(52) U.S. Cl.
CPC .......... *F15B 15/125* (2013.01); *B64C 13/504* (2018.01); *B64C 13/505* (2018.01);
(Continued)

(58) Field of Classification Search
CPC ........ F01C 9/002; F01C 11/002; F04C 9/002; F15B 15/125
See application file for complete search history.

(56) References Cited

U.S. PATENT DOCUMENTS

| 2,286,452 A | 6/1942 | Worth |
| 2,649,077 A | 8/1953 | Mehm |

(Continued)

FOREIGN PATENT DOCUMENTS

| AU | 2013201056 | 11/2013 |
| CA | 2772480 | 9/2012 |

(Continued)

OTHER PUBLICATIONS

Chinese Third Office Action issued in Chinese Application No. 201480045873.2 dated May 8, 2018, 31 pages.
(Continued)

*Primary Examiner* — Thomas E Lazo
(74) *Attorney, Agent, or Firm* — Fish & Richardson P.C.

(57) ABSTRACT

A rotary actuator includes a housing having an interior boundary that defines a central bore and has interior recesses, a chamber housing assembly disposed in the central bore and having an arcuate chamber, the arcuate chamber comprising a cavity, an exterior boundary of the chamber housing assembly having exterior recesses, each of the exterior recesses aligned with a respective one of the interior recesses, pins residing between the interior boundary and the exterior boundary, each of the pins mated to one of the exterior recesses and a corresponding one of the interior recesses to maintain an orientation of the chamber housing assembly with respect to the housing, a rotor assembly rotatably journaled in the chamber housing assembly and comprising a rotary output shaft and a rotor arm, and an arcuate-shaped piston disposed in the chamber housing assembly for reciprocal movement in the arcuate chamber.

15 Claims, 41 Drawing Sheets

Related U.S. Application Data continuation-in-part of application No. 13/778,561, filed on Feb. 27, 2013, now Pat. No. 9,234,535, and a continuation-in-part of application No. 13/831,220, filed on Mar. 14, 2013, now Pat. No. 9,163,648, and a continuation-in-part of application No. 13/921,904, filed on Jun. 19, 2013, now Pat. No. 9,816,537, and a continuation-in-part of application No. 14/170,434, filed on Jan. 31, 2014, now Pat. No. 8,955,425, and a continuation-in-part of application No. 14/258,434, filed on Apr. 22, 2014, now Pat. No. 9,593,696, and a continuation-in-part of application No. 14/170,461, filed on Jan. 31, 2014, now Pat. No. 9,476,434.

(51) Int. Cl.
*F01C 9/00* (2006.01)
*F15B 15/02* (2006.01)
*B64C 13/50* (2006.01)
*B64C 13/40* (2006.01)

(52) U.S. Cl.
CPC .............. *F01C 9/002* (2013.01); *F15B 15/02* (2013.01); *F15B 15/06* (2013.01); *B64C 13/40* (2013.01); *Y10T 29/49895* (2015.01)

(56) References Cited

U.S. PATENT DOCUMENTS

| | | |
|---|---|---|
| 2,801,068 A | 7/1957 | Paul |
| 2,936,636 A | 5/1960 | Wacht |
| 2,966,144 A | 12/1960 | Self |
| 3,070,075 A | 12/1962 | Hanselmann |
| 3,367,424 A | 2/1968 | Shunichi et al. |
| 3,444,788 A | 5/1969 | Sneen |
| 3,446,120 A | 5/1969 | Sneen |
| 3,731,546 A | 5/1973 | Macdonald |
| 3,731,597 A | 5/1973 | Payne |
| 4,296,570 A * | 10/1981 | Balbach ............... E05F 15/56 49/137 |
| 4,409,888 A * | 10/1983 | Weyer ................ F15B 15/063 901/22 |
| 4,628,797 A | 12/1986 | Kendall |
| 4,755,104 A | 7/1988 | Castro et al. |
| 4,979,700 A | 12/1990 | Tiedeman |
| 5,044,257 A | 9/1991 | Scobie |
| 5,054,374 A | 10/1991 | Scobie et al. |
| 5,235,900 A | 8/1993 | Garceau |
| 5,386,761 A | 2/1995 | Holtgraver |
| 5,495,791 A | 3/1996 | Sande et al. |
| 5,549,448 A | 8/1996 | Langston |
| 5,722,616 A * | 3/1998 | Durand ................ B64C 13/40 244/226 |
| 5,967,587 A | 10/1999 | Collet |
| 5,996,523 A | 12/1999 | Fox |
| 6,361,033 B1 | 3/2002 | Jones et al. |
| 6,769,868 B2 | 8/2004 | Harrold |
| 6,865,982 B2 * | 3/2005 | Bunyard ............... F15B 15/125 92/120 |
| 7,384,016 B2 | 6/2008 | Kota et al. |
| 7,436,094 B2 | 10/2008 | Zhao et al. |
| 7,486,042 B2 | 2/2009 | Potter et al. |
| 7,510,151 B2 | 3/2009 | Perez-Sanchez |
| 7,549,605 B2 | 6/2009 | Hanlon et al. |
| 7,578,476 B2 | 8/2009 | Wiers et al. |
| 7,600,718 B2 | 10/2009 | Perez-Sanchez |
| 7,665,694 B2 | 2/2010 | Hein et al. |
| 7,731,124 B2 | 6/2010 | Griffin |
| 7,762,500 B1 | 7/2010 | Dhall |
| 7,871,033 B2 | 1/2011 | Karem et al. |
| 7,895,935 B2 | 3/2011 | Kells |
| 7,922,445 B1 | 4/2011 | Pankey et al. |
| 7,930,971 B2 | 4/2011 | Werkhoven |
| 7,954,769 B2 | 6/2011 | Bushnell |
| 8,006,940 B2 | 8/2011 | Zeumer |
| 8,033,509 B2 | 10/2011 | Yount et al. |
| 8,080,966 B2 | 12/2011 | Potter et al. |
| 8,181,550 B2 | 5/2012 | Gemmati et al. |
| 8,210,473 B2 | 7/2012 | Schweighart et al. |
| 8,226,048 B2 | 7/2012 | Beyer et al. |
| 8,245,495 B2 | 8/2012 | Pesyna et al. |
| 8,245,976 B2 | 8/2012 | Sakurai et al. |
| 8,245,982 B2 | 8/2012 | Vormezeele et al. |
| 8,267,350 B2 | 9/2012 | Elliott et al. |
| 8,272,599 B2 | 9/2012 | Haverdings |
| 8,276,852 B2 | 10/2012 | Shmilovich et al. |
| 8,302,903 B2 | 11/2012 | Morgan et al. |
| 8,322,647 B2 | 12/2012 | Amraly et al. |
| 8,333,348 B1 | 12/2012 | Miller |
| 8,336,817 B2 | 12/2012 | Flatt |
| 8,336,818 B2 | 12/2012 | Flatt |
| 8,362,719 B2 | 1/2013 | Sheahan, Jr. et al. |
| 8,376,818 B2 | 2/2013 | Horner |
| 8,393,576 B2 | 3/2013 | Lutke et al. |
| 8,403,415 B2 | 3/2013 | Lawson |
| 8,424,810 B1 | 4/2013 | Shmilovich et al. |
| 8,435,000 B2 | 5/2013 | Wong et al. |
| 8,500,526 B2 | 8/2013 | Horner |
| 8,511,608 B1 | 8/2013 | Good et al. |
| 8,540,485 B2 | 9/2013 | Bogrash |
| 8,544,791 B2 | 10/2013 | Oyama et al. |
| 8,596,582 B2 | 12/2013 | Uchida et al. |
| 8,596,583 B2 | 12/2013 | Eichhorn et al. |
| 8,602,352 B2 | 12/2013 | Keller et al. |
| 8,602,364 B2 | 12/2013 | Dostmann et al. |
| 8,622,350 B1 | 1/2014 | Hoffenberg |
| 8,628,045 B2 | 1/2014 | Lauwereys et al. |
| 8,684,316 B2 | 4/2014 | Sakurai et al. |
| 8,714,493 B2 | 5/2014 | Morris |
| 8,726,787 B2 | 5/2014 | Glynn et al. |
| 8,746,625 B2 | 6/2014 | Recksiek et al. |
| 8,777,153 B2 | 7/2014 | Parker |
| 8,800,935 B2 | 8/2014 | Francis |
| 9,163,648 B2 * | 10/2015 | Kim .................. F01C 9/002 |
| 9,593,696 B2 * | 3/2017 | Kim .................. F15B 15/125 |
| 9,631,645 B2 * | 4/2017 | Sobolewski .......... F15B 15/125 |
| 9,816,537 B2 * | 11/2017 | Kim .................. F15B 15/02 |
| 10,030,679 B2 | 7/2018 | Kim et al. |
| 2006/0181171 A1 | 8/2006 | Zhao |
| 2009/0108129 A1 | 4/2009 | Flatt |
| 2009/0260345 A1 | 10/2009 | Chaudhry |
| 2010/0187368 A1 | 7/2010 | Cathelain et al. |
| 2010/0319341 A1 | 12/2010 | Blitz et al. |
| 2011/0181129 A1 | 7/2011 | Aso |
| 2011/0198438 A1 | 8/2011 | Colting |
| 2012/0031087 A1 | 2/2012 | Reynolds et al. |
| 2012/0060491 A1 | 3/2012 | Gunter et al. |
| 2012/0111993 A1 | 5/2012 | DeHart |
| 2012/0325976 A1 | 12/2012 | Parker |
| 2013/0104729 A1 * | 5/2013 | Ito ........................ F16H 29/02 92/32 |
| 2013/0119197 A1 | 5/2013 | Ducos |
| 2013/0133513 A1 * | 5/2013 | Ito ........................ F04C 9/00 92/120 |
| 2013/0181089 A1 | 7/2013 | Recksiek et al. |
| 2013/0221158 A1 | 8/2013 | Binkholder et al. |
| 2013/0247754 A1 | 9/2013 | Ito et al. |
| 2013/0283942 A1 | 10/2013 | Bouillot et al. |
| 2013/0299633 A1 | 11/2013 | Tierney et al. |
| 2013/0320151 A1 | 12/2013 | Kordel et al. |
| 2013/0327887 A1 | 12/2013 | Dyckrup et al. |
| 2013/0345908 A1 | 12/2013 | Dorr et al. |
| 2014/0001309 A1 | 1/2014 | Tieys et al. |
| 2014/0238226 A1 | 8/2014 | Kim et al. |
| 2014/0238227 A1 | 8/2014 | Kim et al. |
| 2014/0238228 A1 | 8/2014 | Sobolewski et al. |
| 2014/0238229 A1 | 8/2014 | Sobolewski et al. |
| 2014/0238230 A1 | 8/2014 | Kim et al. |
| 2014/0238231 A1 | 8/2014 | Kim et al. |

(56) References Cited

U.S. PATENT DOCUMENTS

| | | | |
|---|---|---|---|
| 2014/0271296 A1 | 9/2014 | Kim et al. | |
| 2018/0320712 A1 | 11/2018 | Kim et al. | |

FOREIGN PATENT DOCUMENTS

| | | |
|---|---|---|
| CN | 2429672 Y | 5/2001 |
| CN | 201876368 U | 6/2011 |
| CN | 102171914 A | 8/2011 |
| CN | 102195401 A | 9/2011 |
| CN | 202128132 U | 2/2012 |
| CN | 102597537 A | 7/2012 |
| CN | 202442867 U | 9/2012 |
| CN | 103453095 A | 12/2013 |
| CN | 103814224 A | 5/2014 |
| DE | 624423 | 1/1936 |
| DE | 871557 | 3/1953 |
| DE | 872000 | 3/1953 |
| DE | 29804298 U1 | 5/1998 |
| DE | 102008036760 | 2/2010 |
| DE | 102009052641 | 5/2011 |
| EP | 0098614 | 1/1984 |
| EP | 0669469 B1 | 9/1997 |
| EP | 1101902 | 5/2001 |
| EP | 1429037 A1 | 6/2004 |
| EP | 1985536 | 10/2008 |
| EP | 2157299 | 2/2010 |
| EP | 2644823 | 2/2013 |
| EP | 2586966 | 5/2013 |
| EP | 2644823 | 10/2013 |
| FR | 2138241 | 1/1973 |
| GB | 771595 | 4/1957 |
| GB | 893361 | 4/1962 |
| GB | 1174028 | 12/1969 |
| JP | 2003083308 A | 3/2003 |
| WO | WO 82/00045 | 1/1982 |
| WO | WO2007/003000 | 1/2007 |
| WO | WO2010/097596 | 9/2010 |
| WO | WO2010/119280 | 10/2010 |
| WO | WO2011/155866 | 12/2011 |
| WO | WO2013/000577 | 1/2013 |
| WO | WO2013/119242 | 8/2013 |
| WO | WO2013/120036 | 8/2013 |
| WO | WO2013/143538 | 10/2013 |
| WO | WO2014/029972 | 2/2014 |

OTHER PUBLICATIONS

The State Intellectual Property Office of People's Republic of China, Chinese Application No. 201480023776.3, Chinese First Office Action, dated Mar. 31, 2017, 10 pages.
Chinese Second Office Action in Chinese Application No. 20158062794, dated Dec. 18, 2018, 10 pages, with English translation.
Authorized Officer Romain Bindreiff, PCT International Preliminary Report on Patentability, PCT/US2014/017582, dated Feb. 10, 2015, 20 pages.
Authorized Officer Romain Bindreiff, PCT Written Opinion of the International Preliminary Examining Authority, PCT/US2014/017473, dated Feb. 2, 2015, 6 pages.
Authorized Officer Romain Bindreiff, PCT Written Opinion of the International Preliminary Examining Authority, PCT/US2014/017928, dated Feb. 3, 2015, 5 pages.
International Preliminary Report on Patentability under Chapter I issued in International Application No. PCT/2014/042257 dated Dec. 30, 2015, 9 pages.
International Search Report and Written Opinion issued in International Application No. PCT/US2014/017582 dated May 8, 2014; 11 pages.
International Search Report and Written Opinion issued in International Application No. PCT/US2014/017928 dated May 20, 2014; 12 pages.
International Search Report and Written Opinion of the International Searching Authority issued in International Application No. PCT/US2014/017473 dated May 13, 2014; 12 pages.
International Search Report and Written Opinion of the International Searching Authority issued in International Application No. PCT/US2014/042257 dated Sep. 10, 2014; 12 pages.
International Search Report and Written Opinion of the International Searching Authority issued in International Application No. PCT/US2015/013707 dated May 29, 2015; 14 pages.
International Search Report and Written Opinion of the International Searching Authority issued in International Application No. PCT/US2015/013737 dated May 21, 2015, 13 pages.
International Search Report issued in International Application No. PCT/US2015/013895 dated Jul. 31, 2015; 17 pages.
Invitation to Pay Additional Fees and Partial International Search Report issued in International Application No. PCT/US2015/013895 dated May 20, 2015; 5 pages.
Kim et al., "Rotary Piston Type Actuator with a Central Actuation Assembly", U.S. Appl. No. 13/831,220, filed Mar. 14, 2013, 61 pages.
Kim et al., "Rotary Piston Type Actuator with a Central Actuation Assembly", U.S. Appl. No. 13/921,904, filed Jun. 29, 2013, 77 pages.
Kim et al., "Rotary Piston Type Actuator with Hydraulic Supply", U.S. Appl. No. 14/258,434, filed Apr. 22, 2014, 167 pages.
Kim et al., "Rotary Piston Type Actuator", U.S. Appl. No. 13/778,561, filed Feb. 27, 2013, 56 pages.
PCT International Preliminary Report on Patentability, PCT/US2014/017473, dated Jul. 2, 2015, 21 pages.
PCT International Preliminary Report on Patentability, PCT/US2014/017928, dated Jul. 2, 2015, 24 pages.
Sobolewski et al., "Rotary Piston Type Actuator with Modular Housing", U.S. Appl. No. 14/170,461, filed Jan. 31, 2014, 100 pages.
Sobolewski et al., "Rotary Piston Type Actuator with Pin Retention Features", U.S. Appl. No. 14/170,434, filed Jan. 31, 2014, 97 pages.
Office Action issued in Chinese Application No. 201480010705.X dated Jun. 21, 2017; 3 pages—no English translation.
Notice of Allowance issued in Chinese Application No. 201480010705.X dated Sep. 27, 2017; 4 pages.
Office Action issued in Chinese Application No. 201480045873.2 dated Oct. 16, 2017; 11 pages.
Office Action issued in Chinese Application No. 201580017668.X dated Feb. 1, 2018; 22 pages.
Notice of Allowance issued in Chinese Application No. 201480023776.3 dated Feb. 5, 2018; 7 pages.
Office Action issued in Chinese Application No. 201580062794.7 dated Mar. 30, 2018, 24 pages.
EPO Communication pursuant to Article 94(3), EP Application No. 14709113.6, dated Apr. 19, 2018, 6 pages.
European Extended Search Report in European Application No. 18210141.0, dated Mar. 22, 2019, 8 pages.

* cited by examiner

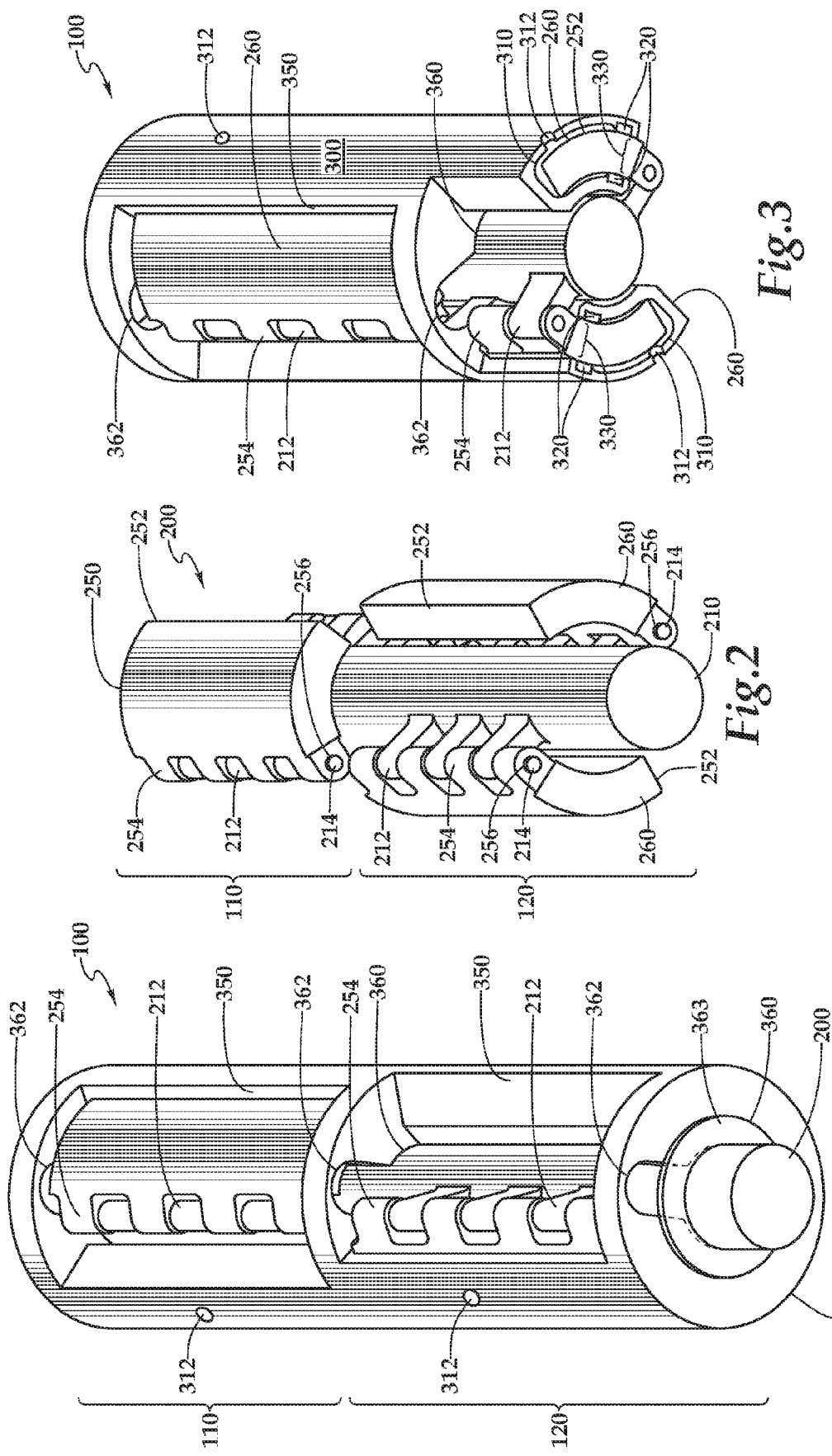

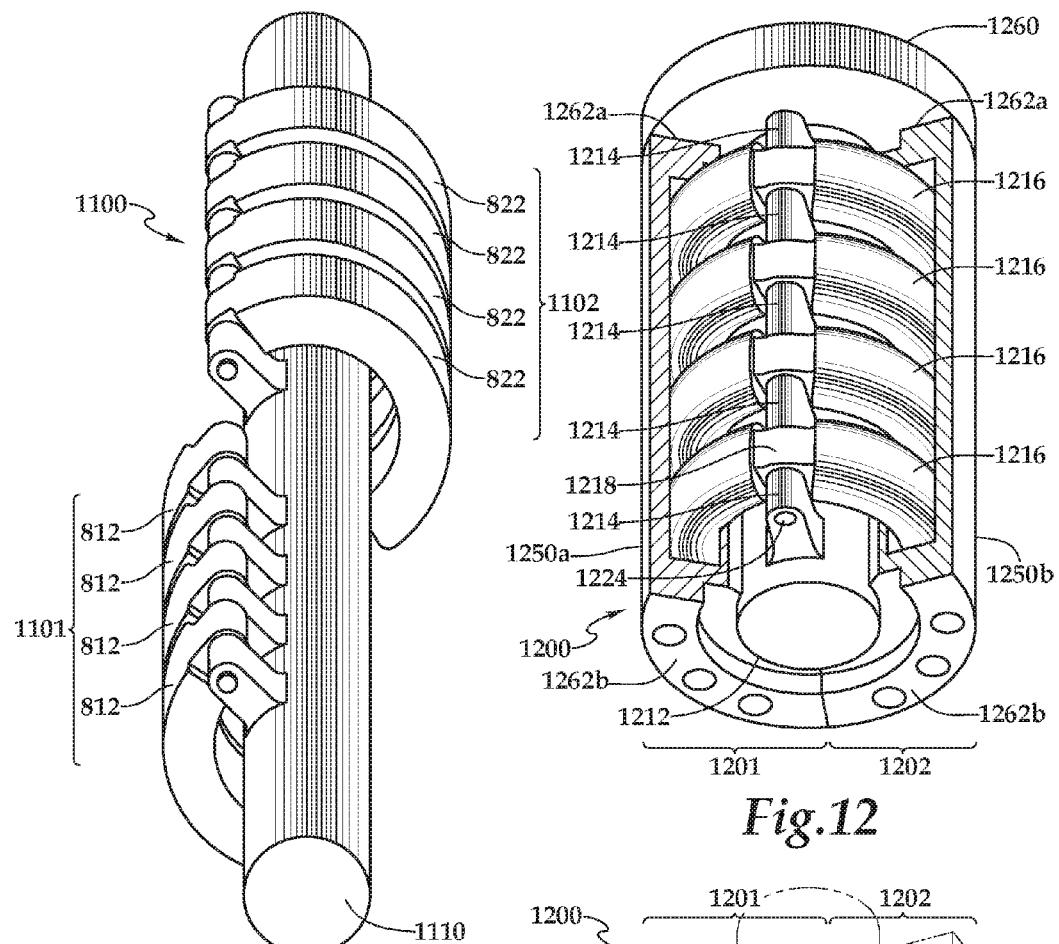
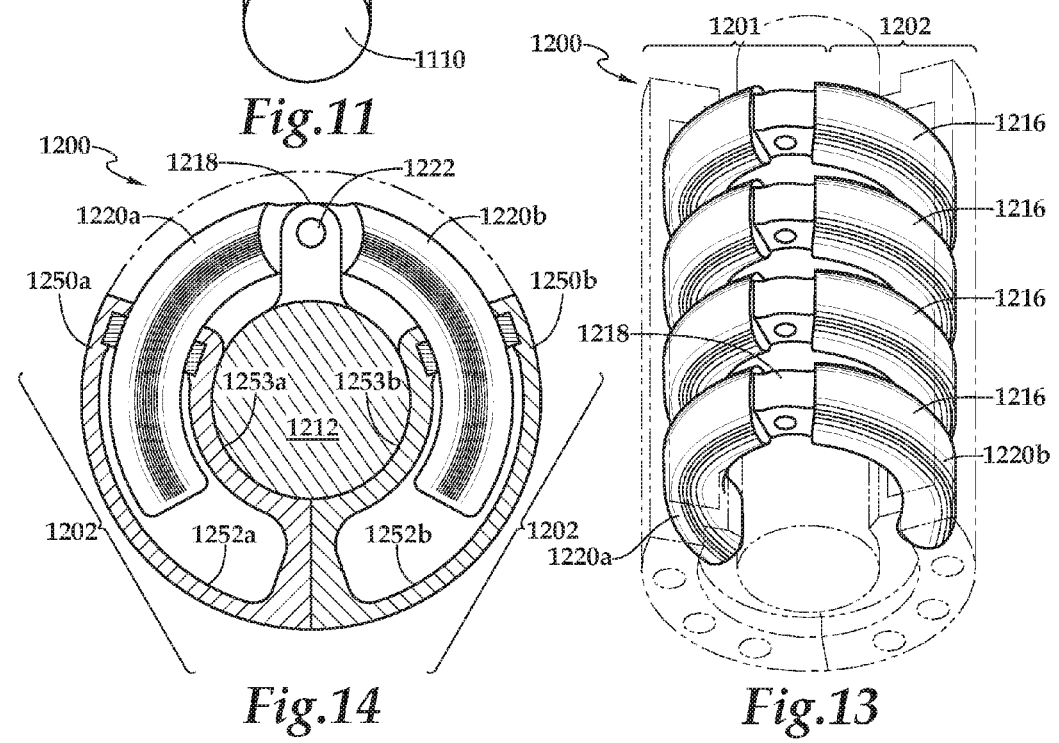
Fig.11   Fig.12
Fig.14   Fig.13

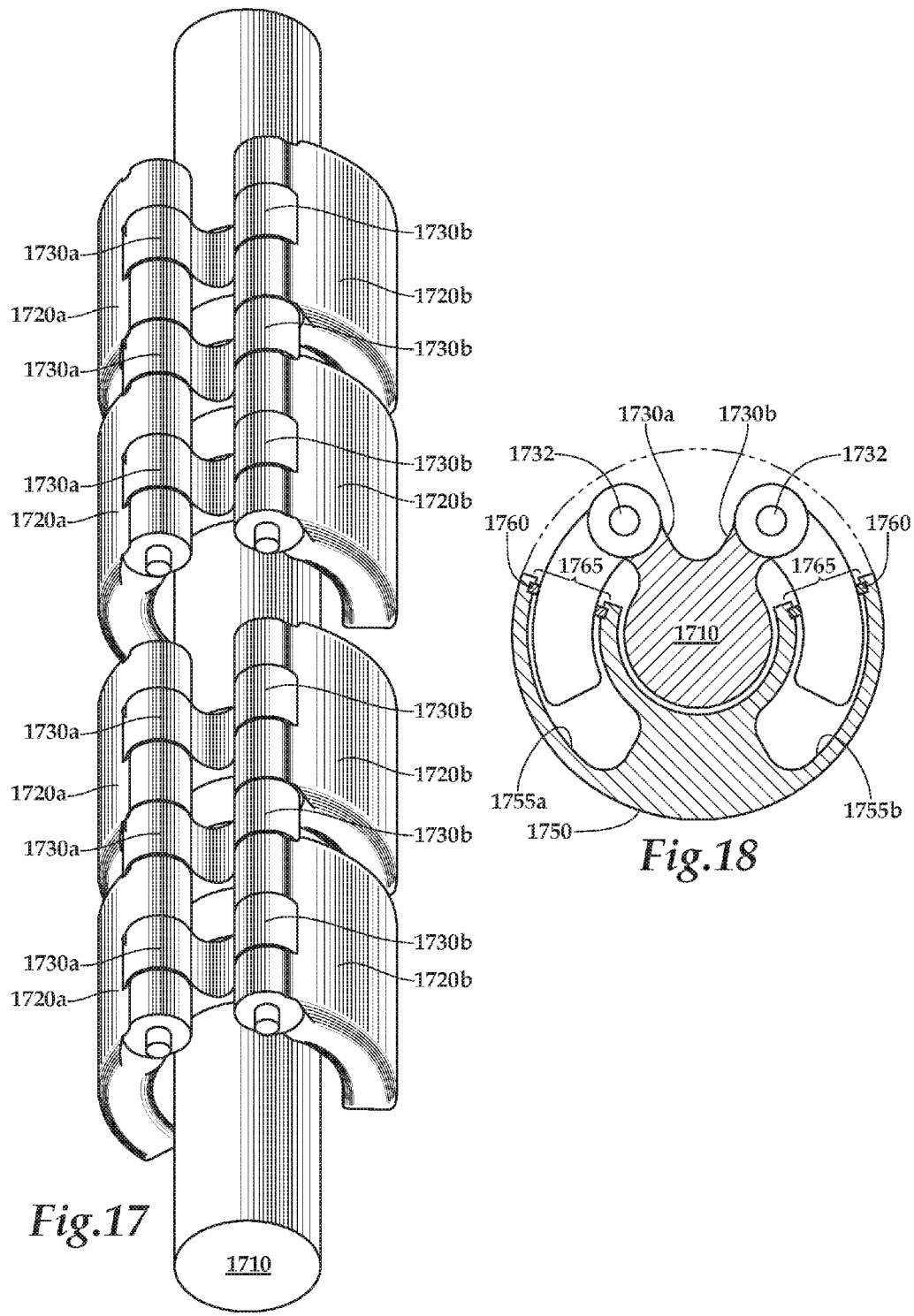

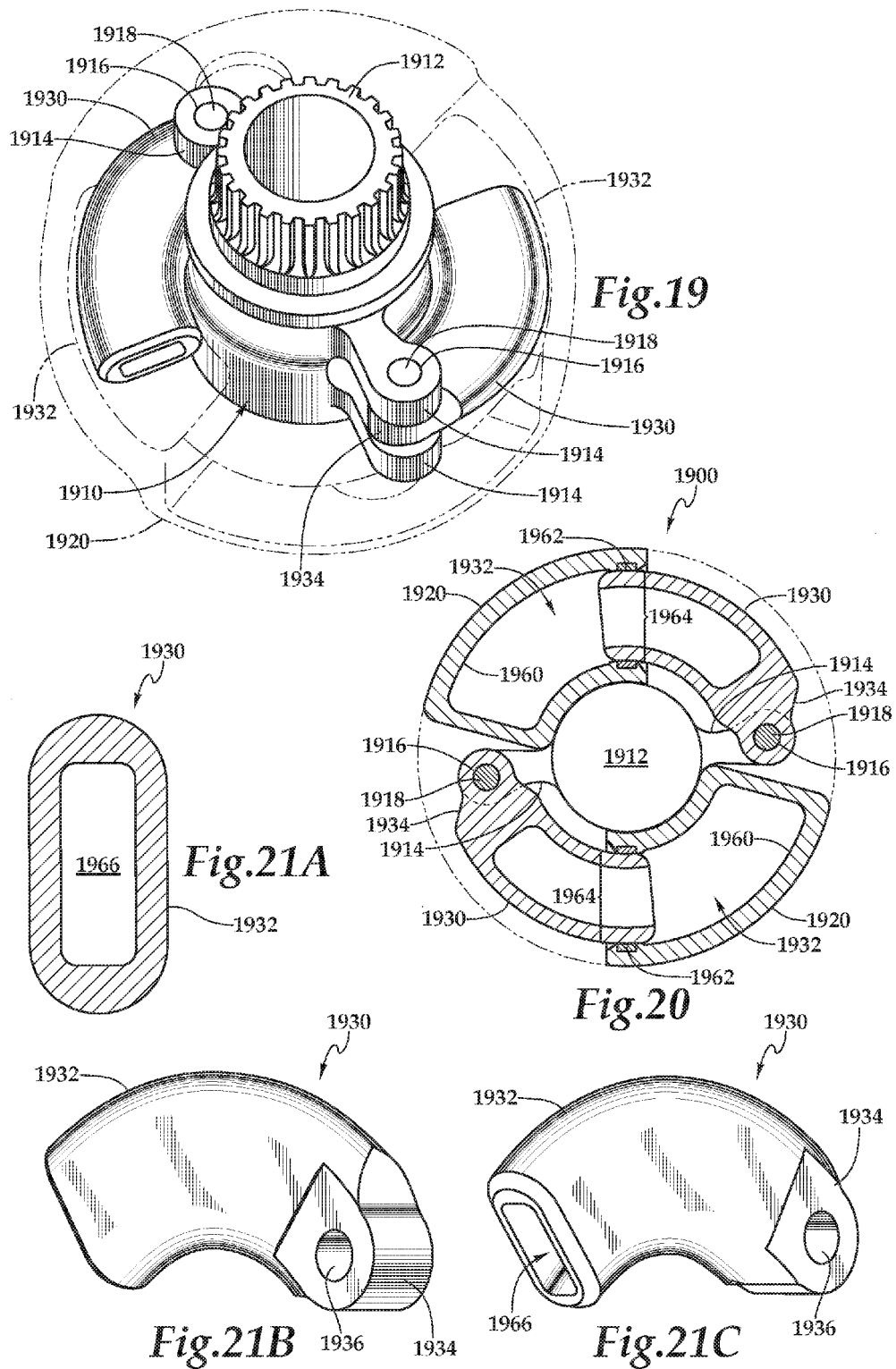

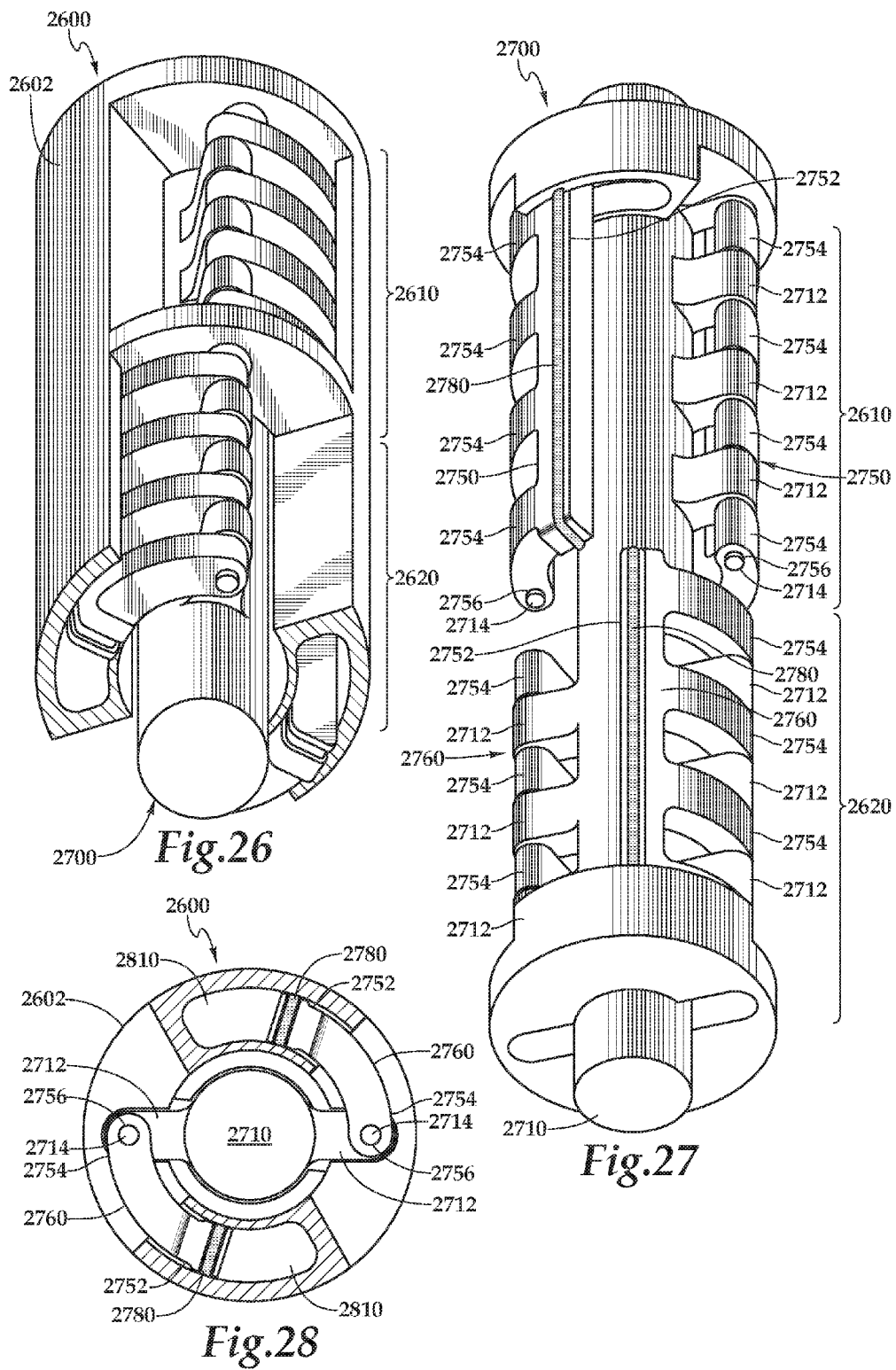

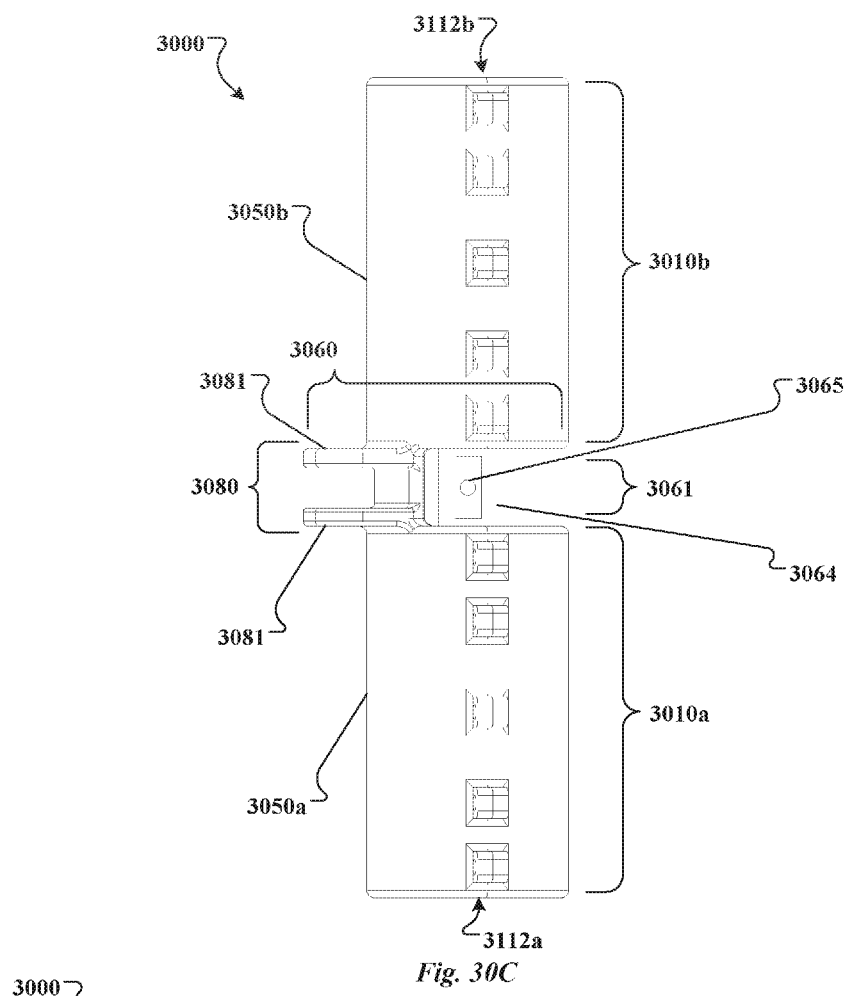
*Fig. 30C*
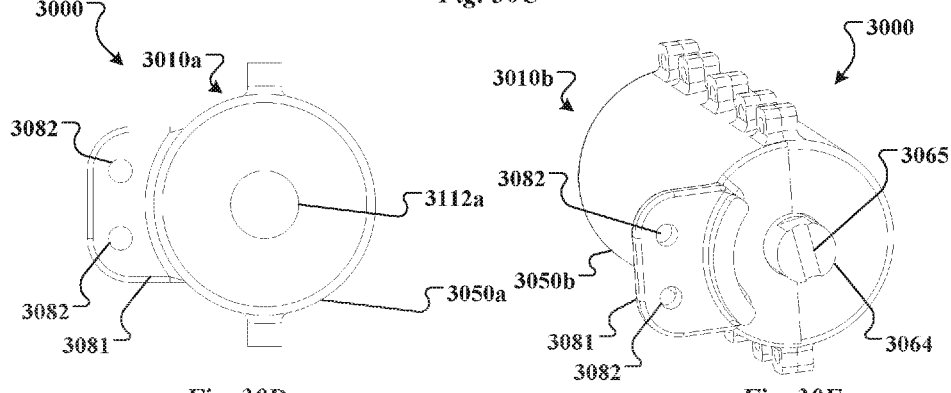
*Fig. 30D*  *Fig. 30E*

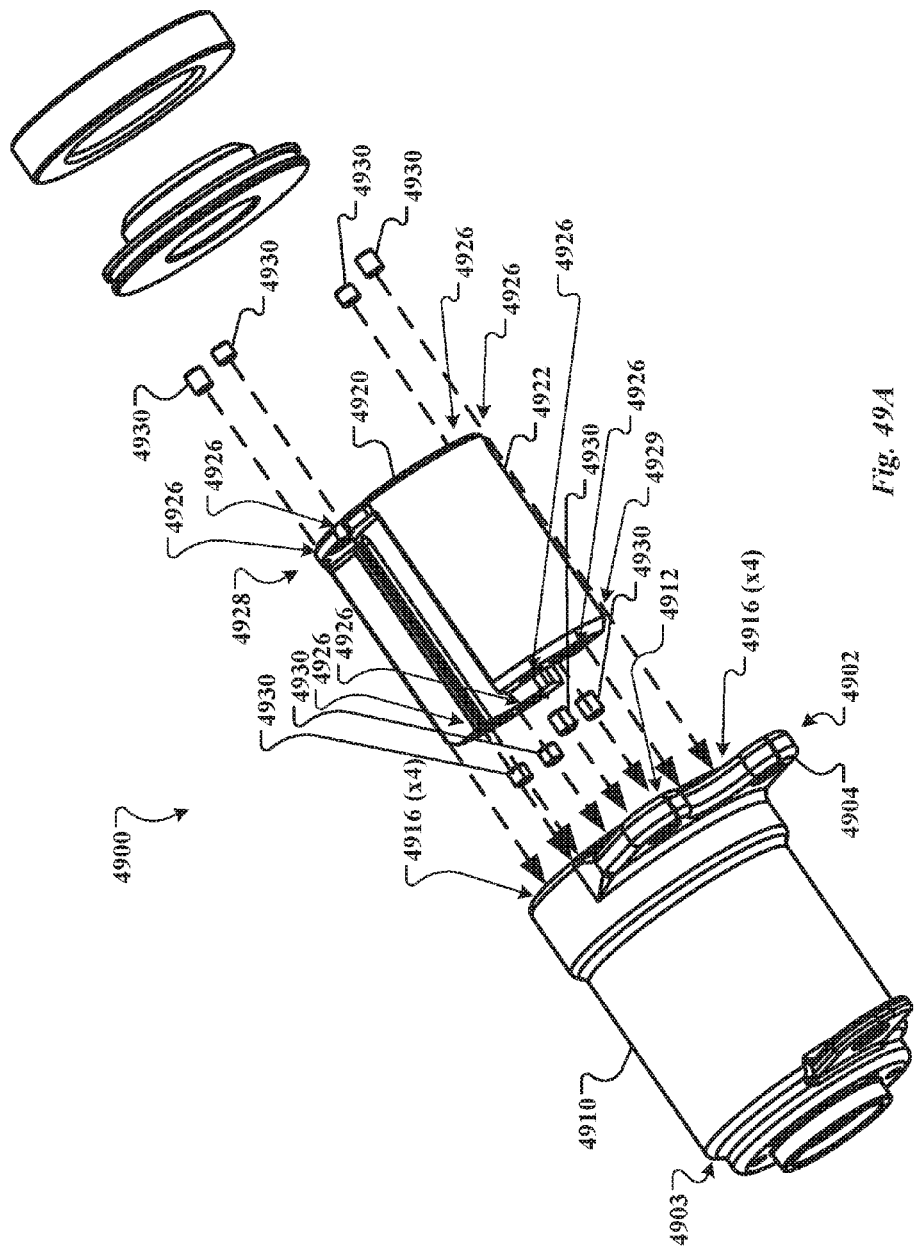

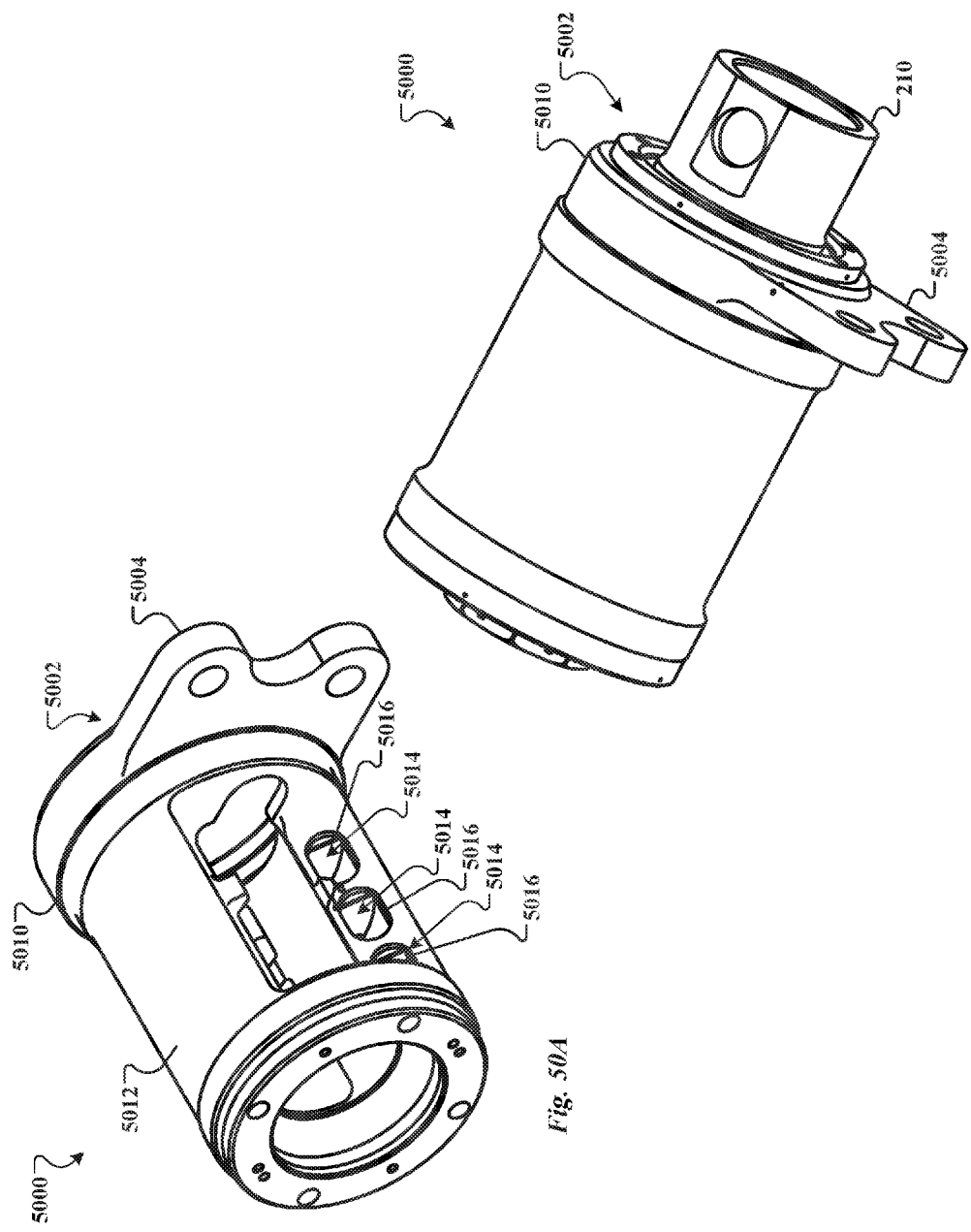

ROTARY PISTON ACTUATOR ANTI-ROTATION CONFIGURATIONS

CROSS REFERENCE TO RELATED APPLICATIONS

This application is a continuation of and claims the benefit of priority to U.S. patent application Ser. No. 14/491,523, filed Sep. 19, 2014, which is a continuation-in-part of and claims the benefit of the priority to U.S. patent application Ser. No. 13/778,561, filed Feb. 27, 2013 and entitled "ROTARY PISTON TYPE ACTUATOR", now issued as U.S. Pat. No. 9,234,535, U.S. patent application Ser. No. 13/831,220, filed Mar. 14, 2013 and entitled "ROTARY PISTON TYPE ACTUATOR WITH A CENTRAL ACTUATION ASSEMBLY", now issued as U.S. Pat. No. 9,163,648, U.S. patent application Ser. No. 13/921,904, filed Jun. 19, 2013 and entitled "ROTARY PISTON TYPE ACTUATOR WITH A CENTRAL ACTUATION ASSEMBLY", U.S. patent application Ser. No. 14/170,434, filed Jan. 31, 2014 and entitled "ROTARY PISTON TYPE ACTUATOR WITH PIN RETENTION FEATURES", now issued as U.S. Pat. No. 8,955,425, U.S. patent application Ser. No. 14/170,461, filed Jan. 31, 2014 and entitled "ROTARY PISTON TYPE ACTUATOR WITH MODULAR HOUSING", issued as U.S. Pat. No. 9,476,434, and U.S. patent application Ser. No. 14/258,434, filed Apr. 22, 2014 and entitled "ROTARY PISTON TYPE ACTUATOR WITH HYDRAULIC SUPPLY", issued as U.S. Pat. No. 9,593,696, the disclosures of which are incorporated by reference in their entirety.

TECHNICAL FIELD

This invention relates to an actuator device and more particularly to a rotary piston type actuator device wherein the pistons of the rotor are moved by fluid under pressure and wherein the actuator device includes a central actuation assembly adapted for attachment to and external mounting feature on a member to be actuated.

BACKGROUND

Rotary hydraulic actuators of various forms are currently used in industrial mechanical power conversion applications. This industrial usage is commonly for applications where continuous inertial loading is desired without the need for load holding for long durations, e.g. hours, without the use of an external fluid power supply. Aircraft flight control applications generally implement loaded positional holding, for example, in a failure mitigation mode, using the blocked fluid column to hold position.

In certain applications, such as primary flight controls used for aircraft operation, positional accuracy in load holding by rotary actuators is desired. Positional accuracy can be improved by minimizing internal leakage characteristics inherent to the design of rotary actuators. However, it can be difficult to provide leak-free performance in typical rotary hydraulic actuators, e.g., rotary "vane" or rotary "piston" type configurations.

SUMMARY

In general, this document relates to rotary piston-type actuators.

In a first aspect, a rotary actuator includes a housing comprising an interior boundary that defines a central bore and comprises interior recesses, a chamber housing assembly disposed in the central bore and comprising an arcuate chamber, the arcuate chamber comprising a cavity, a fluid port in fluid communication with the cavity, and an open end, an exterior boundary of the chamber housing assembly comprising exterior recesses, each of the exterior recesses aligned with a respective one of the interior recesses, pins residing between the interior boundary of the housing and the exterior boundary of the chamber housing assembly, each of the pins mated to one of the exterior recesses and a corresponding one of the interior recesses to maintain an orientation of the chamber housing assembly with respect to the housing, a rotor assembly rotatably journaled in the chamber housing assembly and comprising a rotary output shaft and a rotor arm extending radially outward from the rotary output shaft, and an arcuate-shaped piston disposed in the chamber housing assembly for reciprocal movement in the arcuate chamber through the open end, wherein a seal, the cavity, and the piston define a pressure chamber, and a portion of the piston connects to the rotor arm.

Various embodiments can include some, all, or none of the following features. Each exterior recess and the corresponding interior recess can define a pin receptacle, and each of the pins can extend from a mounting surface into a respective pin receptacle. The interior recesses can be defined by interior depressions in the interior boundary at a mounting end of the housing and the exterior recesses can be defined by exterior depressions in the exterior boundary at a mounting end of the chamber housing assembly. The interior recesses can be defined by interior depressions in the interior boundary at a distal end of the housing and the exterior recesses can be defined by exterior depressions in the exterior boundary at a distal end of the chamber housing assembly. The pin receptacles can define inner radiuses that are sized to mate with a cylindrical outer boundary of the pins. The housing can include a mounting lug that projects radially outward at a mounting end of the housing, and the mounting lug can provide a mounting point for removably affixing the rotary actuator to an external mounting surface.

In a second aspect, a rotary actuator includes a housing comprising an interior surface that defines an arcuate chamber, the arcuate chamber comprising a cavity, a fluid port in fluid communication with the cavity, and an open end, the housing comprising a mounting lug that projects radially outward from a cylindrical exterior portion of the housing at a mounting end of the housing, the mounting lug providing a mounting point for removably affixing the rotary actuator to an external mounting surface, a rotor assembly rotatably journaled in the housing and comprising a rotary output shaft and a rotor arm extending radially outward from the rotary output shaft, and an arcuate-shaped piston disposed in the housing for reciprocal movement in the arcuate chamber through the open end, wherein a seal, the cavity, and the piston define a pressure chamber, and a portion of the piston connects to the rotor arm.

Various embodiments can include some, all, or none of the following features. The housing can include a unitary structure that includes the arcuate chamber and the mounting lug. The rotary actuator can also include a support ring about the housing, the support ring comprising a second mounting lug that projects radially outward from a cylindrical exterior portion of the support ring. The support ring can include an interior surface that mates with an exterior surface of the housing to maintain an orientation of the support ring with respect to the housing. The interior surface can include flat regions that mate with corresponding flat regions on the exterior surface of the housing.

In a third aspect, a method of assembling a rotary actuator includes receiving a first assembly comprising a chamber housing assembly comprising an arcuate chamber comprising a cavity, a fluid port in fluid communication with the cavity, and an open end, an exterior boundary of the chamber housing assembly comprising exterior recesses, pins mated to the exterior recesses of the chamber housing assembly, a rotor assembly rotatably journaled in the chamber housing assembly and comprising a rotary output shaft and a rotor arm extending radially outward from the rotary output shaft, and an arcuate-shaped piston disposed in the chamber housing assembly for reciprocal movement in the arcuate chamber through the open end, wherein a seal, the cavity, and the piston define a pressure chamber, and a portion of the piston connects to the rotor arm, and positioning the first assembly in a central bore of a housing, the housing comprising an interior boundary that defines the central bore and comprises interior recesses, wherein positioning the first assembly in the central bore of the housing aligns each of the interior recesses with a respective one of the exterior recesses and mates the interior recess to a corresponding pin to maintain an orientation of the chamber housing assembly with respect to the housing.

Various implementations can include some, all, or none of the following features. Each exterior recess and the corresponding interior recess can define a pin receptacle, and each of the pins can extend from a mounting surface into a respective pin receptacle. The interior recesses can be defined by interior depressions in the interior boundary at a mounting end of the housing, the exterior recesses can be defined by exterior depressions in the exterior boundary at a mounting end of the chamber housing assembly. The interior recesses can be defined by interior depressions in the interior boundary at a distal end of the housing, the exterior recesses can be defined by exterior depressions in the exterior boundary at a distal end of the chamber housing assembly. The pin receptacles can define inner radiuses that are sized to mate with a cylindrical outer boundary of the pins. The housing can include a mounting lug that projects radially outward at a mounting end of the housing, and the mounting lug can provide a mounting point for removably affixing the rotary actuator to an external mounting surface.

In a fourth aspect, a method of assembling a rotary actuator includes receiving a first assembly having a housing comprising an interior surface that defines an arcuate chamber, the arcuate chamber comprising a cavity, a fluid port in fluid communication with the cavity, and an open end, the housing comprising a mounting lug that projects radially outward from a cylindrical exterior portion of the housing at a mounting end of the housing, the mounting lug providing a mounting point for removably affixing the rotary actuator to an external mounting surface, a rotor assembly rotatably journaled in the housing and comprising a rotary output shaft and a rotor arm extending radially outward from the rotary output shaft, and an arcuate-shaped piston disposed in the housing for reciprocal movement in the arcuate chamber through the open end, wherein a seal, the cavity, and the piston define a pressure chamber, and a portion of the piston connects to the rotor arm, receiving a support ring comprising a second mounting lug that projects radially outward from a cylindrical exterior portion of the support ring, and positioning the support ring about a cylindrical exterior portion of the housing at a supporting end of the housing axially opposed to the mounting end.

Various implementations can include some, all, or none of the following features. The support ring can include an interior surface that mates with an exterior surface of the housing to maintain an orientation of the support ring with respect to the housing, the method further comprising mating the interior surface with the exterior surface. The interior surface can include flat regions that mate with corresponding flat regions on the exterior surface of the housing, the method also including mating the flat regions of the interior surface with the corresponding flat regions on the exterior surface of the housing.

The systems and techniques described herein may provide one or more of the following advantages. First, relative rotary movement between pressure chambers and a mounting point can be reduced. Second, a unitary, one-piece housing can provide both a collection of pressure chambers and a mounting point to reduce or eliminate relative rotary movement between the pressure chambers and the mount point. Third, a rotary actuator can provide mounting features that allow the actuator to be permanently or removably affixed to external surfaces at both axial ends of the actuator.

The details of one or more implementations are set forth in the accompanying drawings and the description below. Other features and advantages will be apparent from the description and drawings, and from the claims.

DESCRIPTION OF DRAWINGS

FIG. 1 is a perspective view of an example rotary piston-type actuator.

FIG. 2 is a perspective view of an example rotary piston assembly.

FIG. 3 is a perspective cross-sectional view of an example rotary piston-type actuator.

FIG. 11 is a perspective view of another example of a rotary piston-type actuator.

FIGS. 12-14 are perspective and cross-sectional views of another example rotary piston-type actuator.

FIGS. 17 and 18 are perspective and cross-sectional views of another example rotary piston-type actuator that includes another example rotary piston assembly.

FIGS. 19 and 20 are perspective and cross-sectional views of another example rotary piston-type actuator.

FIGS. 21A-21C are cross-sectional and perspective views of an example rotary piston.

FIG. 26 is a perspective view of another example rotary piston-type actuator.

FIG. 27 is a cross-sectional view of another example rotary piston assembly.

FIG. 28 is a perspective cross-sectional view of another example rotary piston-type actuator.

FIG. 30C is a top view of the example rotary actuator of FIG. 30A.

FIG. 30D is an end view of the example rotary actuator of FIG. 30A.

FIG. 30E is a partial perspective view from cross section AA of FIG. 30C.

FIGS. 49A-49C are perspective, end, and exploded views of an example anti-rotation configuration of an example rotary piston-type actuator.

FIGS. 50A-50C are perspective and exploded views of another example anti-rotation configuration of an example rotary piston-type actuator.

DETAILED DESCRIPTION

Figure 4:
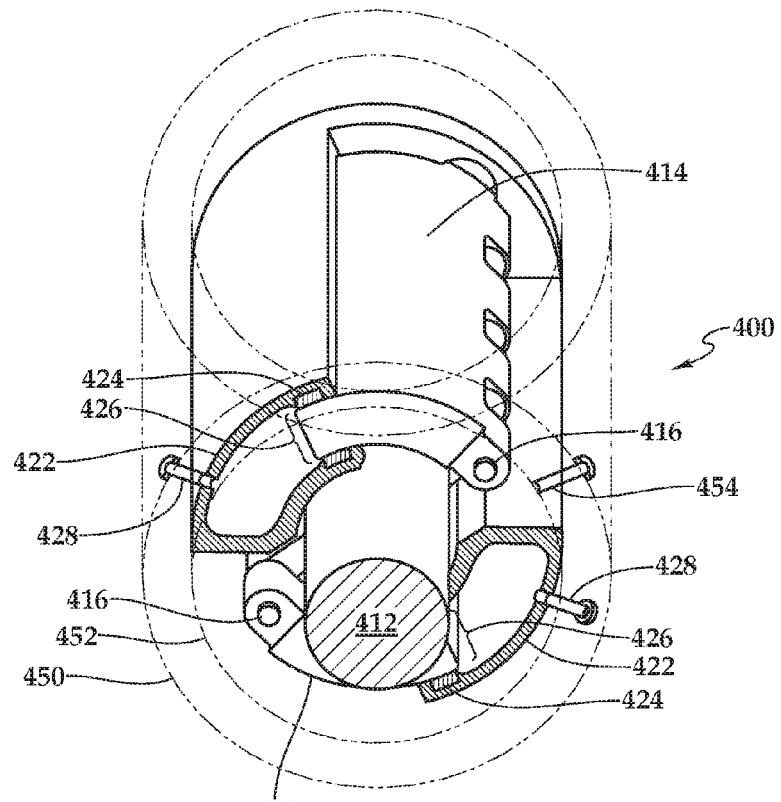
FIG. 4 is a perspective view of another example rotary piston-type actuator.

This document describes devices for producing rotary motion. In particular, this document describes devices that can convert fluid displacement into rotary motion through the use of components more commonly used for producing linear motion, e.g., hydraulic or pneumatic linear cylinders. Vane-type rotary actuators are relatively compact devices used to convert fluid motion into rotary motion. Rotary vane actuators (RVA), however, generally use seals and component configurations that exhibit cross-vane leakage of the driving fluid. Such leakage can affect the range of applications in which such designs can be used. Some applications may require a rotary actuator to hold a rotational load in a selected position for a predetermined length of time, substantially without rotational movement (e.g., less than 5 degrees of movement), when the actuator's fluid ports are blocked. For example, some aircraft applications may require that an actuator hold a flap or other control surface that is under load (e.g., through wind resistance, gravity or g-forces) at a selected position when the actuator's fluid ports are blocked. Cross-vane leakage, however, can allow movement from the selected position.

Linear pistons use relatively mature sealing technology that exhibits well-understood dynamic operation and leakage characteristics that are generally better than rotary vane actuator type seals. Linear pistons, however, require additional mechanical components in order to adapt their linear motions to rotary motions. Such linear-to-rotary mechanisms are generally larger and heavier than rotary vane actuators that are capable of providing similar rotational actions, e.g., occupying a larger work envelope. Such linear-to-rotary mechanisms may also generally be installed in an orientation that is different from that of the load they are intended to drive, and therefore may provide their torque output indirectly, e.g., installed to push or pull a lever arm that is at a generally right angle to the axis of the axis of rotation of the lever arm. Such linear-to-rotary mechanisms may therefore become too large or heavy for use in some applications, such as aircraft control where space and weight constraints may make such mechanisms impractical for use.

In general, rotary piston assemblies use curved pressure chambers and curved pistons to controllably push and pull the rotor arms of a rotor assembly about an axis. In use, certain embodiments of the rotary piston assemblies described herein can provide the positional holding characteristics generally associated with linear piston-type fluid actuators, to rotary applications, and can do so using the relatively more compact and lightweight envelopes generally associated with rotary vane actuators.

FIGS. 1-3 show various views of the components of an example rotary piston-type actuator 100. Referring to FIG. 1, a perspective view of the example rotary piston-type actuator 100 is shown. The actuator 100 includes a rotary piston assembly 200 and a pressure chamber assembly 300. The actuator 100 includes a first actuation section 110 and a second actuation section 120. In the example of actuator 100, the first actuation section 110 is configured to rotate the rotary piston assembly 200 in a first direction, e.g., counterclockwise, and the second actuation section 120 is configured to rotate the rotary piston assembly 200 in a second direction opposite the first direction, e.g., clockwise.

Referring now to FIG. 2, a perspective view of the example rotary piston assembly 200 is shown apart from the pressure chamber assembly 300. The rotary piston assembly 200 includes a rotor shaft 210. A plurality of rotor arms 212 extend radially from the rotor shaft 210, the distal end of each rotor arm 212 including a bore (not shown) substantially aligned (e.g., +/−2 degrees) with the axis of the rotor shaft 210 and sized to accommodate one of the collection of connector pins 214.

As shown in FIG. 2, the first actuation section 110 includes a pair of rotary pistons 250, and the second actuation section 120 includes a pair of rotary pistons 260. While the example actuator 100 includes two pairs of the rotary pistons 250, 260, other embodiments can include greater and/or lesser numbers of cooperative and opposing rotary pistons. Examples of other such embodiments will be discussed below, for example, in the descriptions of FIGS. 4-25.

In the example rotary piston assembly shown in FIG. 2, each of the rotary pistons 250, 260 includes a piston end 252 and one or more connector arms 254. The piston end 252 is formed to have a generally semi-circular body having a substantially smooth surface (e.g., a surface quality that can form a fluid barrier when in contact with a seal). Each of the connector arms 254 includes a bore 256 substantially aligned (e.g., +/−2 degrees) with the axis of the semi-circular body of the piston end 252 and sized to accommodate one of the connector pins 214.

The rotary pistons 260 in the example assembly of FIG. 2 are oriented opposite each other in the same rotational direction. The rotary pistons 250 are oriented opposite each other in the same rotational direction, but opposite that of the rotary pistons 260. In some embodiments, the actuator 100 can rotate the rotor shaft 210 about 60 degrees total.

Each of the rotary pistons 250, 260 of the example assembly of FIG. 2 may be assembled to the rotor shaft 210 by aligning the connector arms 254 with the rotor arms 212 such that the bores (not shown) of the rotor arms 212 align with the bores 265. The connector pins 214 may then be inserted through the aligned bores to create hinged connections between the pistons 250, 260 and the rotor shaft 210. Each connector pin 214 is slightly longer than the aligned bores. In the example assembly, about the circumferential periphery of each end of each connector pin 214 that extends beyond the aligned bores is a circumferential recess (not shown) that can accommodate a retaining fastener (not shown), e.g., a snap ring or spiral ring.

FIG. 3 is a perspective cross-sectional view of the example rotary piston-type actuator 100. The illustrated example shows the rotary pistons 260 inserted into a corresponding pressure chamber 310 formed as an arcuate cavity in the pressure chamber assembly 300. The rotary pistons 250 are also inserted into corresponding pressure chambers 310, not visible in this view.

In the example actuator 100, each pressure chamber 310 includes a seal assembly 320 about the interior surface of the pressure chamber 310 at an open end 330. In some implementations, the seal assembly 320 can be a circular or semi-circular sealing geometry retained on all sides in a standard seal groove. In some implementations, commercially available reciprocating piston or cylinder type seals can be used. For example, commercially available seal types that may already be in use for linear hydraulic actuators flying on current aircraft may demonstrate sufficient capability for linear load and position holding applications. In some implementations, the sealing complexity of the actuator 100 may be reduced by using a standard, e.g., commercially available, semi-circular, unidirectional seal designs generally used in linear hydraulic actuators. In some embodiments, the seal assembly 320 can be a one-piece seal.

In some embodiments of the example actuator 100, the seal assembly 320 may be included as part of the rotary pistons 250, 260. For example, the seal assembly 320 may be located near the piston end 252, opposite the connector arm 254, and slide along the interior surface of the pressure chamber 310 to form a fluidic seal as the rotary piston 250, 260 moves in and out of the pressure chamber 310. An example actuator that uses such piston-mounted seal assemblies will be discussed in the descriptions of FIGS. 26-28. In some embodiments, the seal 310 can act as a bearing. For example, the seal assembly 320 may provide support for the piston 250, 260 as it moves in and out of the pressure chamber 310.

In some embodiments, the actuator 100 may include a wear member between the piston 250, 260 and the pressure chamber 310. For example, a wear ring may be included in proximity to the seal assembly 320. The wear ring may act as a pilot for the piston 250, 260, and/or act as a bearing providing support for the piston 250, 260.

In the example actuator 100, when the rotary pistons 250, 260 are inserted through the open ends 330, each of the seal assemblies 320 contacts the interior surface of the pressure chamber 310 and the substantially smooth surface (e.g., a surface quality that can form a fluid barrier when in contact with a seal) surface of the piston end 252 to form a substantially pressure-sealed (e.g., less than 10% pressure drop per hour) region within the pressure chamber 310. Each of the pressure chambers 310 may include a fluid port 312 formed through the pressure chamber assembly 300, through which pressurized fluid may flow. Upon introduction of pressurized fluid, e.g., hydraulic oil, water, air, gas, into the pressure chambers 310, the pressure differential between the interior of the pressure chambers 310 and the ambient conditions outside the pressure chambers 310 causes the piston ends 252 to be urged outward from the pressure chambers 310. As the piston ends 252 are urged outward, the pistons 250, 260 urge the rotary piston assembly 200 to rotate.

In the example of the actuator 100, cooperative pressure chambers may be fluidically connected by internal or external fluid ports. For example, the pressure chambers 310 of the first actuation section 110 may be fluidically interconnected to balance the pressure between the pressure chambers 310. Similarly the pressure chambers 310 of the second actuation section 120 may be fluidically interconnected to provide similar pressure balancing. In some embodiments, the pressure chambers 310 may be fluidically isolated from each other. For example, the pressure chambers 310 may each be fed by an independent supply of pressurized fluid.

In the example of the actuator 100, the use of the alternating arcuate, e.g., curved, rotary pistons 250, 260 arranged opposing each other operates to translate the rotor arms in an arc-shaped path about the axis of the rotary piston assembly 200, thereby rotating the rotor shaft 210 clockwise and counter-clockwise in a substantially (e.g., within 10%) torque balanced arrangement. Each cooperative pair of pressure chambers 310 operates uni-directionally in pushing the respective rotary piston 250 outward, e.g., extension, to drive the rotor shaft 210 in the specific direction. To reverse direction, the opposing cylinder section's 110 pressure chambers 260 are pressurized to extend their corresponding rotary pistons 260 outward.

The pressure chamber assembly 300, as shown, includes a collection of openings 350. In general, the openings 350 provide space in which the rotor arms 212 can move when the rotor shaft 210 is partly rotated. In some implementations, the openings 350 can be formed to remove material from the pressure chamber assembly 300, e.g., to reduce the mass of the pressure chamber assembly 300. In some implementations, the openings 350 can be used during the process of assembly of the actuator 100. For example, the actuator 100 can be assembled by inserting the rotary pistons 250, 260 through the openings 350 such that the piston ends 252 are inserted into the pressure chambers 310. With the rotary pistons 250, 260 inserted into the pressure chambers 310, the rotor shaft 210 can be assembled to (e.g., rotatably journaled within) the actuator 100 by aligning the rotor shaft 210 with an axial bore 360 formed along the axis of the pressure chamber assembly 300, and by aligning the rotor arms 212 with a collection of keyways 362 formed along the axis of the pressure chamber assembly 300. The rotor shaft 210 can then be inserted into the pressure chamber assembly 300. The rotary pistons 250, 260 can be partly extracted from the pressure chambers 310 to substantially align the bores 256 with the bores of the rotor arms 212 (e.g., +/-2 degrees). The connector pins 214 can then be passed through the keyways 362 and the aligned bores to connect the rotary pistons 250, 260 to the rotor shaft 210. The connector pins 214 can be secured longitudinally by inserting retaining fasteners through the openings 350 and about the ends of the connector pins 214. The rotor shaft 210 can be connected to an external mechanism as an output shaft in order to transfer the rotary motion of the actuator 100 to other mechanisms. A bushing or bearing 362 is fitted between the rotor shaft 210 and the axial bore 360 at each end of the pressure chamber assembly 300.

In some embodiments, the rotary pistons 250, 260 may urge rotation of the rotor shaft 210 by contacting the rotor arms 212. For example, the piston ends 252 may not be coupled to the rotor arms 212. Instead, the piston ends 252 may contact the rotor arms 212 to urge rotation of the rotor shaft as the rotary pistons 250, 260 are urged outward from the pressure chambers 310. Conversely, the rotor arms 212 may contact the piston ends 252 to urge the rotary pistons 250, 260 back into the pressure chambers 310.

In some embodiments, a rotary position sensor assembly (not shown) may be included in the actuator 100. For example, an encoder may be used to sense the rotational position of the rotor shaft 210 relative to the pressure chamber assembly or another feature that remains substantially stationary (e.g., +/-5 degrees) relative to the rotation of the shaft 210. In some implementations, the rotary position sensor may provide signals that indicate the position of the rotor shaft 210 to other electronic or mechanical modules, e.g., a position controller.

In use, pressurized fluid in the example actuator 100 can be applied to the pressure chambers 310 of the second actuation section 120 through the fluid ports 312. The fluid pressure urges the rotary pistons 260 out of the pressure chambers 310. This movement urges the rotary piston assembly 200 to rotate clockwise. Pressurized fluid can be applied to the pressure chambers 310 of the first actuation section 110 through the fluid ports 312. The fluid pressure urges the rotary pistons 250 out of the pressure chambers 310. This movement urges the rotary piston assembly 200 to rotate counter-clockwise. The fluid conduits can also be blocked fluidically to cause the rotary piston assembly 200 to substantially maintain its rotary position relative to the pressure chamber assembly 300 (e.g., +/-5 degrees).

In some embodiments of the example actuator 100, the pressure chamber assembly 300 can be formed from a single piece of material. For example, the pressure chambers 310, the openings 350, the fluid ports 312, the keyways 362, and the axial bore 360 may be formed by molding, machining, or otherwise forming a unitary piece of material.

FIG. 4 is a perspective view of another example rotary piston-type actuator 400. In general, the actuator 400 is similar to the actuator 100, but instead of using opposing pairs of rotary pistons 250, 260, each acting uni-directionally to provide clockwise and counter-clockwise rotation, the actuator 400 uses a pair of bidirectional rotary pistons.

As shown in FIG. 4, the actuator 400 includes a rotary piston assembly that includes a rotor shaft 412 and a pair of rotary pistons 414. The rotor shaft 412 and the rotary pistons 414 are connected by a pair of connector pins 416.

The example actuator shown in FIG. 4 includes a pressure chamber assembly 420. The pressure chamber assembly 420 includes a pair of pressure chambers 422 formed as arcuate cavities in the pressure chamber assembly 420. Each pressure chamber 422 includes a seal assembly 424 about the interior surface of the pressure chamber 422 at an open end 426. The seal assemblies 424 contact the inner walls of the pressure chambers 422 and the rotary pistons 414 to form fluidic seals between the interiors of the pressure chambers 422 and the space outside. A pair of fluid ports 428 is in fluidic communication with the pressure chambers 422. In use, pressurized fluid can be applied to the fluid ports 428 to urge the rotary pistons 414 partly out of the pressure chambers 422, and to urge the rotor shaft 412 to rotate in a first direction, e.g., clockwise in this example.

The pressure chamber assembly 420 and the rotor shaft 412 and rotary pistons 414 of the rotary piston assembly may be structurally similar to corresponding components found in to the second actuation section 120 of the actuator 100. In use, the example actuator 400 also functions substantially similarly to the actuator 100 when rotating in a first direction when the rotary pistons 414 are being urged outward from the pressure chambers 422. e.g., clockwise in this example. As will be discussed next, the actuator 400 differs from the actuator 100 in the way that the rotor shaft 412 is made to rotate in a second direction, e.g., counter-clockwise in this example.

To provide actuation in the second direction, the example actuator 400 includes an outer housing 450 with a bore 452. The pressure chamber assembly 420 is formed to fit within the bore 452. The bore 452 is fluidically sealed by a pair of end caps (not shown). With the end caps in place, the bore 452 becomes a pressurizable chamber. Pressurized fluid can flow to and from the bore 452 through a fluid port 454.

Pressurized fluid in the bore 452 is separated from fluid in the pressure chambers 422 by the seals 426.

Figure 5:
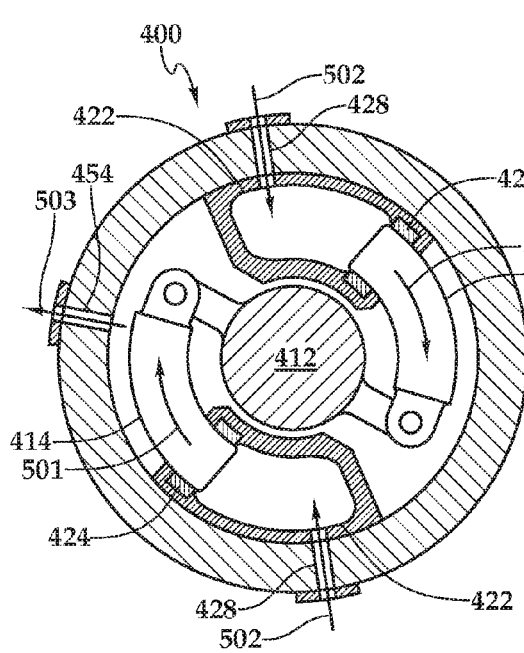
FIGS. 5 and 6 are cross-sectional views of an example rotary piston-type actuator.

Referring now to FIG. 5, the example actuator 400 is shown in a first configuration in which the rotor shaft 412 has been rotated in a first direction, e.g., clockwise, as indicated by the arrows 501. The rotor shaft 412 can be rotated in the first direction by flowing pressurized fluid into the pressure chambers 422 through the fluid ports 428, as indicated by the arrows 502. The pressure within the pressure chambers 422 urges the rotary pistons 414 partly outward from the pressure chambers 422 and into the bore 452. Fluid within the bore 452, separated from the fluid within the pressure chambers 422 by the seals 424 and displaced by the movement of the rotary pistons 414, is urged to flow out the fluid port 454, as indicated by the arrow 503.

Figure 6:
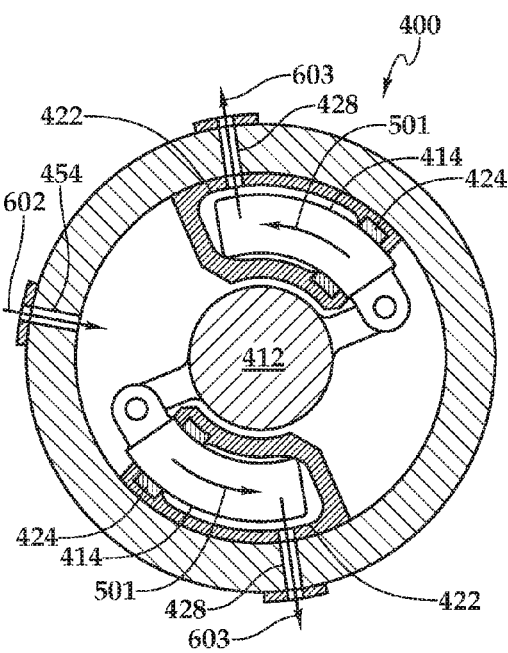

Referring now to FIG. 6, the example actuator 400 is shown in a second configuration in which the rotor shaft 412 has been rotated in a second direction, e.g., counter-clockwise, as indicated by the arrows 601. The rotor shaft 412 can be rotated in the second direction by flowing pressurized fluid into the bore 452 through the fluid port 454, as indicated by the arrow 602. The pressure within the bore 452 urges the rotary pistons 414 partly into the pressure chambers 422 from the bore 452. Fluid within the pressure chambers 422, separated from the fluid within the bore 452 by the seals 424 and displaced by the movement of the rotary pistons 414, is urged to flow out the fluid ports 428, as indicated by the arrows 603. In some embodiments, one or more of the fluid ports 428 and 454 can be oriented radially relative to the axis of the actuator 400, as illustrated in FIGS. 4-6, however in some embodiments one or more of the fluid ports 428 and 454 can be oriented parallel to the axis of the actuator 400 or in any other appropriate orientation.

Figure 7:
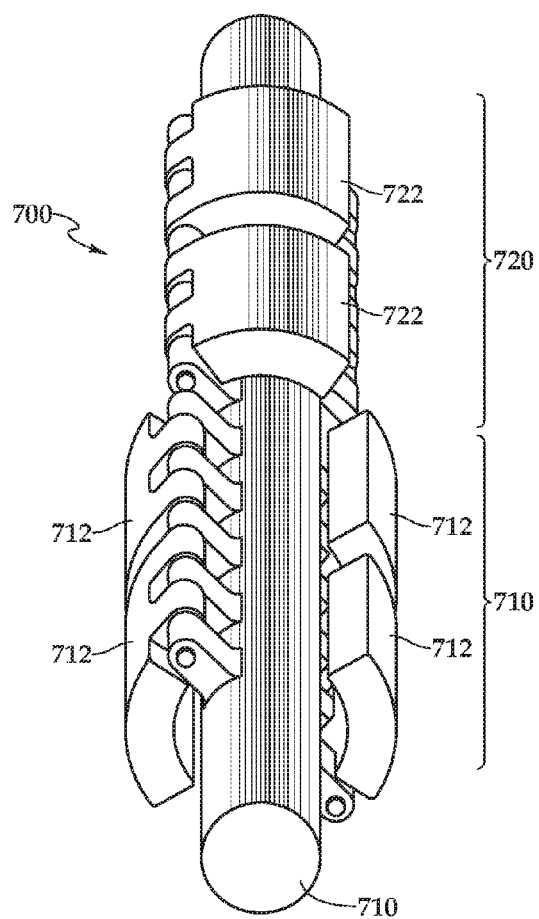
FIG. 7 is a perspective view of another embodiment of a rotary piston-type actuator.

FIG. 7 is a perspective view of another embodiment of a rotary piston assembly 700. In the example actuator 100 of FIG. 1, two opposing pairs of rotary pistons were used, but in other embodiments other numbers and configurations of rotary pistons and pressure chambers can be used. In the example of the assembly 700, a first actuation section 710 includes four rotary pistons 712 cooperatively operable to urge a rotor shaft 701 in a first direction. A second actuation section 720 includes four rotary pistons 722 cooperatively operable to urge the rotor shaft 701 in a second direction.

Although examples using four rotary pistons, e.g., actuator 100, and eight rotary pistons, e.g., assembly 700, have been described, other configurations may exist. In some embodiments, any appropriate number of rotary pistons may be used in cooperation and/or opposition. In some embodiments, opposing rotary pistons may not be segregated into separate actuation sections, e.g., the actuation sections 710 and 720. While cooperative pairs of rotary pistons are used in the examples of actuators 100, 400, and assembly 700, other embodiments exist. For example, clusters of two, three, four, or more cooperative or oppositional rotary pistons and pressure chambers may be arranged radially about a section of a rotor shaft. As will be discussed in the descriptions of FIGS. 8-10, a single rotary piston may be located at a section of a rotor shaft. In some embodiments, cooperative rotary pistons may be interspersed alternatingly with opposing rotary pistons. For example, the rotary pistons 712 may alternate with the rotary pistons 722 along the rotor shaft 701.

Figure 8:
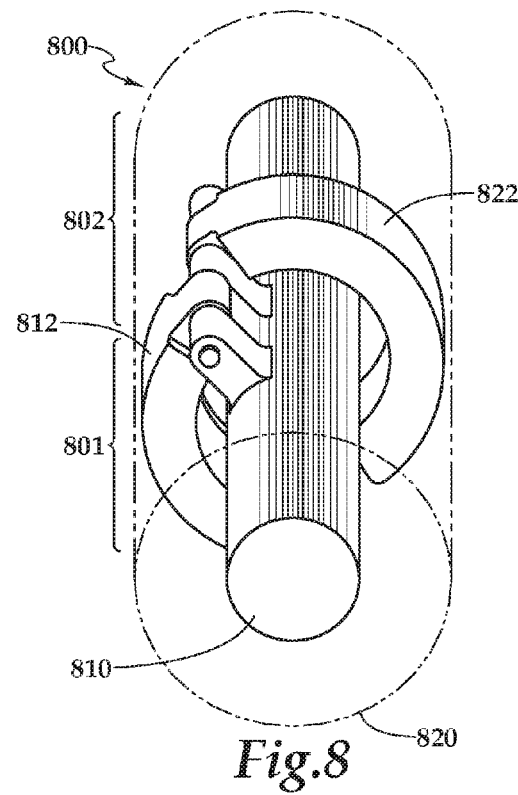
FIG. 8 is a perspective view of another example of a rotary piston-type actuator.

FIG. 8 is a perspective view of another example of a rotary piston-type actuator 800. The actuator 800 differs from the example actuators 100 and 400, and the example assembly 700 in that instead of implementing cooperative pairs of rotary pistons along a rotor shaft, e.g., two of the rotary pistons 250 are located radially about the rotor shaft 210, individual rotary pistons are located along a rotor shaft.

The example actuator 800 includes a rotor shaft 810 and a pressure chamber assembly 820. The actuator 800 includes a first actuation section 801 and a second actuation section 802. In the example actuator 800, the first actuation section 801 is configured to rotate the rotor shaft 810 in a first direction, e.g., clockwise, and the second actuation section 802 is configured to rotate the rotor shaft 810 in a second direction opposite the first direction, e.g., counter-clockwise.

The first actuation section 801 of example actuator 800 includes a rotary piston 812, and the second actuation section 802 includes a rotary piston 822. By implementing a single rotary piston 812, 822 at a given longitudinal position along the rotor shaft 810, a relatively greater range of rotary travel may be achieved compared to actuators that use pairs of rotary pistons at a given longitudinal position along the rotary piston assembly, e.g., the actuator 100. In some embodiments, the actuator 800 can rotate the rotor shaft 810 about 145 degrees total.

In some embodiments, the use of multiple rotary pistons 812, 822 along the rotor shaft 810 can reduce distortion of the pressure chamber assembly 820, e.g., reduce bowing out under high pressure. In some embodiments, the use of multiple rotary pistons 812, 822 along the rotor shaft 810 can provide additional degrees of freedom for each piston 812, 822. In some embodiments, the use of multiple rotary pistons 812, 822 along the rotor shaft 810 can reduce alignment issues encountered during assembly or operation. In some embodiments, the use of multiple rotary pistons 812, 822 along the rotor shaft 810 can reduce the effects of side loading of the rotor shaft 810.

Figure 9:
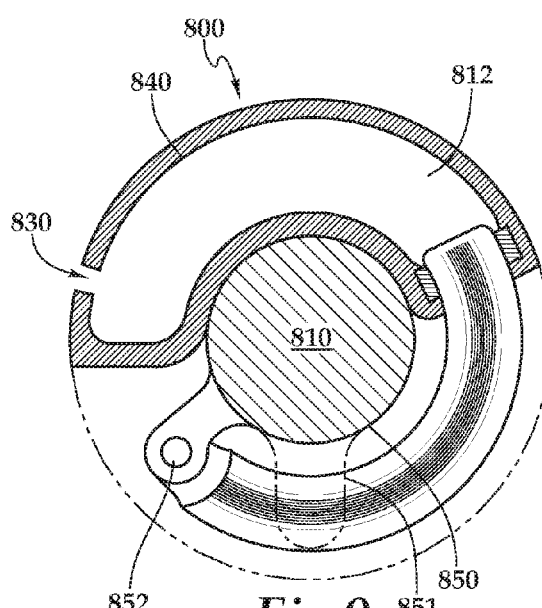
FIGS. 9 and 10 show and example rotary piston-type actuator in example extended and retracted configurations.

FIG. 9 shows the example actuator 800 with the rotary piston 812 in an extended configuration. A pressurized fluid is applied to a fluid port 830 to pressurize an arcuate pressure chamber 840 formed in the pressure chamber assembly 820. Pressure in the pressure chamber 840 urges the rotary piston 812 partly outward, urging the rotor shaft 810 to rotate in a first direction, e.g., clockwise.

Figure 10:
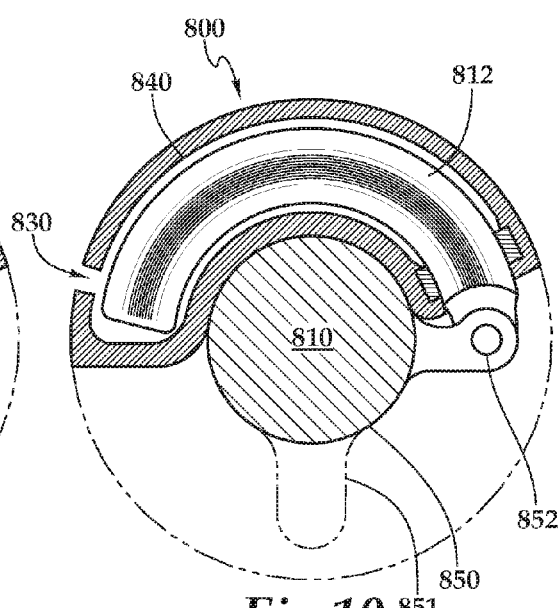

FIG. 10 shows the example actuator 800 with the rotary piston 812 in a retracted configuration. Mechanical rotation of the rotor shaft 810, e.g., pressurization of the actuation section 820, urges the rotary piston 812 partly inward, e.g., clockwise. Fluid in the pressure chamber 840 displaced by the rotary piston 812 flows out through the fluid port 830.

The example actuator 800 can be assembled by inserting the rotary piston 812 into the pressure chamber 840. Then the rotor shaft 810 can be inserted longitudinally through a bore 850 and a keyway 851. The rotary piston 812 is connected to the rotor shaft 810 by a connecting pin 852.

FIG. 11 is a perspective view of another example of a rotary piston-type actuator 1100. In general, the actuator 1100 is similar to the example actuator 800, except multiple rotary pistons are used in each actuation section.

The example actuator 1100 includes a rotary piston assembly 1110 and a pressure chamber assembly 1120. The actuator 1100 includes a first actuation section 1101 and a second actuation section 1102. In the example of actuator 1100, the first actuation section 1101 is configured to rotate the rotary piston assembly 1110 in a first direction, e.g., clockwise, and the second actuation section 1102 is configured to rotate the rotary piston assembly 1110 in a second direction opposite the first direction, e.g., counter-clockwise.

The first actuation section 1101 of example actuator 1100 includes a collection of rotary pistons 812, and the second actuation section 1102 includes a collection of rotary pistons 822. By implementing individual rotary pistons 812, 822 at various longitudinal positions along the rotary piston assembly 1110, a range of rotary travel similar to the actuator 800 may be achieved. In some embodiments, the actuator 1100 can rotate the rotor shaft 1110 about 60 degrees total.

In some embodiments, the use of the collection of rotary pistons 812 may provide mechanical advantages in some applications. For example, the use of multiple rotary pistons 812 may reduce stress or deflection of the rotary piston assembly, may reduce wear of the seal assemblies, or may provide more degrees of freedom. In another example, providing partitions, e.g., webbing, between chambers can add strength to the pressure chamber assembly 1120 and can reduce bowing out of the pressure chamber assembly 1120 under high pressure. In some embodiments, placement of an end tab on the rotor shaft assembly 1110 can reduce cantilever effects experienced by the actuator 800 while under load, e.g., less stress or bending.

FIGS. 12-14 are perspective and cross-sectional views of another example rotary piston-type actuator 1200. The actuator 1200 includes a rotary piston assembly 1210, a first actuation section 1201, and a second actuation section 1202.

The rotary piston assembly 1210 of example actuator 1200 includes a rotor shaft 1212, a collection of rotor arms 1214, and a collection of dual rotary pistons 1216. Each of the dual rotary pistons 1216 includes a connector section 1218 a piston end 1220a and a piston end 1220b. The piston ends 1220a-1220b are arcuate in shape, and are oriented opposite to each other in a generally semicircular arrangement, and are joined at the connector section 1218. A bore 1222 is formed in the connector section 1218 and is oriented substantially parallel (e.g., +/−5 degrees) to the axis of the semicircle formed by the piston ends 1220a-1220b. The bore 1222 is sized to accommodate a connector pin (not shown) that is passed through the bore 1222 and a collection of bores 1224 formed in the rotor arms 1213 to secure each of the dual rotary pistons 1216 to the rotor shaft 1212.

The first actuation section 1201 of example actuator 1200 includes a first pressure chamber assembly 1250a, and the second actuation section 1202 includes a second pressure chamber assembly 1250b. The first pressure chamber assembly 1250a includes a collection of pressure chambers 1252a formed as arcuate cavities in the first pressure chamber assembly 1250a. The second pressure chamber assembly 1250b includes a collection of pressure chambers 1252b formed as arcuate cavities in the first pressure chamber assembly 1250b. When the pressure chamber assemblies 1250a-1250b are assembled into the actuator 1200, each of the pressure chambers 1252a lies generally in a plane with a corresponding one of the pressure chambers 1252b, such that a pressure chamber 1252a and a pressure chamber 1252b occupy two semicircular regions about a central axis. A semicircular bore 1253a and a semicircular bore 1253b substantially align (e.g., +/−5 degrees) to accommodate the rotor shaft 1212.

Each of the pressure chambers 1252a-1252b of example actuator 1200 includes an open end 1254 and a seal assembly 1256. The open ends 1254 are formed to accommodate the insertion of the piston ends 1220a-1220b. The seal assemblies 1256 contact the inner walls of the pressure chambers 1252a-1252b and the outer surfaces of the piston ends 1220a-1220b to form a fluidic seal.

The rotary piston assembly 1210 of example actuator 1200 can be assembled by aligning the bores 1222 of the dual rotary pistons 1216 with the bores 1224 of the rotor arms 1214. The connector pin (not shown) is passed through the bores 1222 and 1224 and secured longitudinally by retaining fasteners.

The example actuator 1200 can be assembled by positioning the rotor shaft 1212 abutting the semicircular bore 1253a and rotating it to insert the piston ends 1220a into the pressure chambers 1252a. The second pressure chamber 1252b is positioned abutting the first pressure chamber 1252a such that the semicircular bore 1253b contacts the rotor shaft 1212. The rotary piston assembly 1210 is then rotated to partly insert the piston ends 1220b into the pressure chambers 1252b. An end cap 1260 is fastened to the longitudinal ends 1262a of the pressure chambers 1252a-1252b. A second end cap (not shown) is fastened to the longitudinal ends 1262b of the pressure chambers 1252a-1252b. The end caps substantially maintain the positions of the rotary piston assembly 1210 and the pressure chambers 1252a-1252b relative to each other (e.g., +/−5 degrees). In some embodiments, the actuator 1200 can provide about 90 degrees of total rotational stroke.

In operation, pressurized fluid is applied to the pressure chambers 1252a of example actuator 1200 to rotate the rotary piston assembly 1210 in a first direction, e.g., clockwise. Pressurized fluid is applied to the pressure chambers 1252b to rotate the rotary piston assembly 1210 in a second direction, e.g., counter-clockwise.

Figures 15, 16:
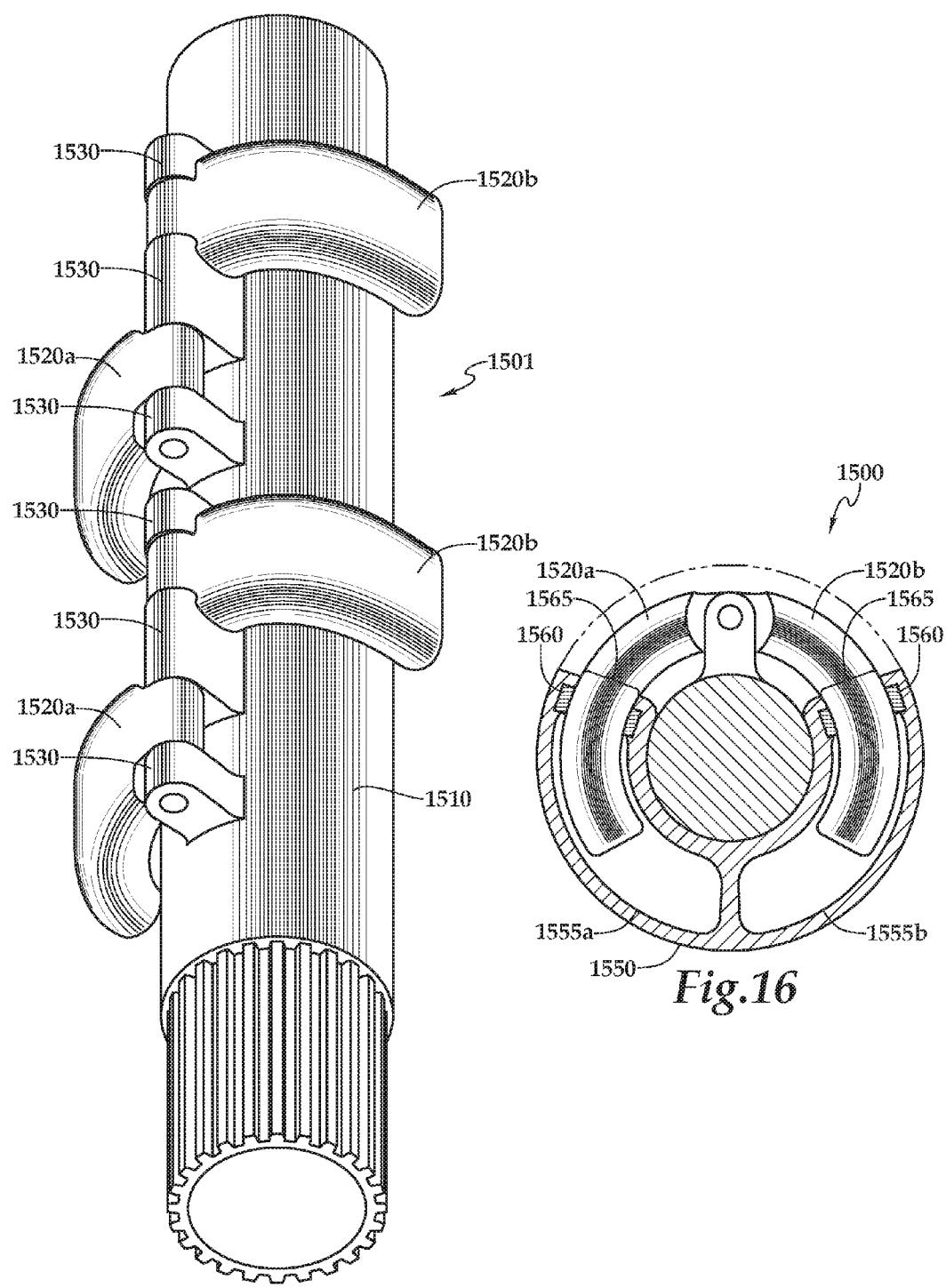
FIGS. 15 and 16 are perspective and cross-sectional views of another example rotary piston-type actuator that includes another example rotary piston assembly.

FIGS. 15 and 16 are perspective and cross-sectional views of another example rotary piston-type actuator 1500 that includes another example rotary piston assembly 1501. In some embodiments, the assembly 1501 can be an alternative embodiment of the rotary piston assembly 200 of FIG. 2.

The assembly 1501 of example actuator 1500 includes a rotor shaft 1510 connected to a collection of rotary pistons 1520a and a collection of rotary pistons 1520b by a collection of rotor arms 1530 and one or more connector pins (not shown). The rotary pistons 1520a and 1520b are arranged along the rotor shaft 1510 in a generally alternating pattern, e.g., one rotary piston 1520a, one rotary piston 1520b, one rotary piston 1520a, one rotary piston 1520b. In some embodiments, the rotary pistons 1520a and 1520b may be arranged along the rotor shaft 1510 in a generally intermeshed pattern, e.g., one rotary piston 1520a and one rotary piston 1520b rotationally parallel to each other, with connector portions formed to be arranged side-by-side or with the connector portion of rotary piston 1520a formed to one or more male protrusions and/or one or more female recesses to accommodate one or more corresponding male protrusions and/or one or more corresponding female recesses formed in the connector portion of the rotary piston 1520b.

Referring to FIG. 16, a pressure chamber assembly 1550 of example actuator 1500 includes a collection of arcuate pressure chambers 1555a and a collection of arcuate pressure chambers 1555b. The pressure chambers 1555a and 1555b are arranged in a generally alternating pattern corresponding to the alternating pattern of the rotary pistons 1520a-1520b. The rotary pistons 1520a-1520b extend partly into the pressure chambers 1555a-1555b. A seal assembly 1560 is positioned about an open end 1565 of each of the pressure chambers 1555a-1555b to form fluidic seals between the inner walls of the pressure chambers 1555a-1555b and the rotary pistons 1520a-1520b.

In use, pressurized fluid can be alternatingly provided to the pressure chambers 1555a and 1555b of example actuator 1500 to urge the rotary piston assembly 1501 to rotate partly clockwise and counterclockwise. In some embodiments, the actuator 1500 can rotate the rotor shaft 1510 about 92 degrees total.

FIGS. 17 and 18 are perspective and cross-sectional views of another example rotary piston-type actuator 1700 that includes another example rotary piston assembly 1701. In some embodiments, the assembly 1701 can be an alternative embodiment of the rotary piston assembly 200 of FIG. 2 or the assembly 1200 of FIG. 12.

The assembly 1701 of example actuator 1700 includes a rotor shaft 1710 connected to a collection of rotary pistons 1720*a* by a collection of rotor arms 1730*a* and one or more connector pins 1732. The rotor shaft 1710 is also connected to a collection of rotary pistons 1720*b* by a collection of rotor arms 1730*b* and one or more connector pins 1732. The rotary pistons 1720*a* and 1720*b* are arranged along the rotor shaft 1710 in a generally opposing, symmetrical pattern, e.g., one rotary piston 1720*a* is paired with one rotary piston 1720*b* at various positions along the length of the assembly 1701.

Referring to FIG. 18, a pressure chamber assembly 1750 of example actuator 1700 includes a collection of arcuate pressure chambers 1755*a* and a collection of arcuate pressure chambers 1755*b*. The pressure chambers 1755*a* and 1755*b* are arranged in a generally opposing, symmetrical pattern corresponding to the symmetrical arrangement of the rotary pistons 1720*a*-1720*b*. The rotary pistons 1720*a*-1720*b* extend partly into the pressure chambers 1755*a*-1755*b*. A seal assembly 1760 is positioned about an open end 1765 of each of the pressure chambers 1755*a*-1755*b* to form fluidic seals between the inner walls of the pressure chambers 1755*a*-1755*b* and the rotary pistons 1720*a*-1720*b*.

In use, pressurized fluid can be alternatingly provided to the pressure chambers 1755*a* and 1755*b* of example actuator 1700 to urge the rotary piston assembly 1701 to rotate partly clockwise and counterclockwise. In some embodiments, the actuator 1700 can rotate the rotor shaft 1710 about 52 degrees total.

FIGS. 19 and 20 are perspective and cross-sectional views of another example rotary piston-type actuator 1900. Whereas the actuators described previously, e.g., the example actuator 100 of FIG. 1, are generally elongated and cylindrical, the actuator 1900 is comparatively flatter and more disk-shaped.

Referring to FIG. 19, a perspective view of the example rotary piston-type actuator 1900 is shown. The actuator 1900 includes a rotary piston assembly 1910 and a pressure chamber assembly 1920. The rotary piston assembly 1910 includes a rotor shaft 1912. A collection of rotor arms 1914 extend radially from the rotor shaft 1912, the distal end of each rotor arm 1914 including a bore 1916 aligned substantially parallel (e.g., +/−2 degrees) with the axis of the rotor shaft 1912 and sized to accommodate one of a collection of connector pins 1918.

The rotary piston assembly 1910 of example actuator 1900 includes a pair of rotary pistons 1930 arranged substantially symmetrically opposite each other across the rotor shaft 1912. In the example of the actuator 1900, the rotary pistons 1930 are both oriented in the same rotational direction, e.g., the rotary pistons 1930 cooperatively push in the same rotational direction. In some embodiments, a return force may be provided to rotate the rotary piston assembly 1910 in the direction of the rotary pistons 1930. For example, the rotor shaft 1912 may be coupled to a load that resists the forces provided by the rotary pistons 1930, such as a load under gravitational pull, a load exposed to wind or water resistance, a return spring, or any other appropriate load that can rotate the rotary piston assembly. In some embodiments, the actuator 1900 can include a pressurizable outer housing over the pressure chamber assembly 1920 to provide a back-drive operation, e.g., similar to the function provided by the outer housing 450 in FIG. 4. In some embodiments, the actuator 1900 can be rotationally coupled to an oppositely oriented actuator 1900 that can provide a back-drive operation.

In some embodiments, the rotary pistons 1930 can be oriented in opposite rotational directions, e.g., the rotary pistons 1930 can oppose each other push in the opposite rotational directions to provide bidirectional motion control. In some embodiments, the actuator 100 can rotate the rotor shaft about 60 degrees total.

Each of the rotary pistons 1930 of example actuator 1900 includes a piston end 1932 and one or more connector arms 1934. The piston end 1932 is formed to have a generally semi-circular body having a substantially smooth surface. Each of the connector arms 1934 includes a bore 1936 (see FIGS. 21B and 21C) substantially aligned (e.g., +/−2 degrees) with the axis of the semi-circular body of the piston end 1932 and sized to accommodate one of the connector pins 1918.

Each of the rotary pistons 1930 of example actuator 1900 is assembled to the rotor shaft 1912 by aligning the connector arms 1934 with the rotor arms 1914 such that the bores 1916 of the rotor arms 1914 align with the bores 1936. The connector pins 1918 are inserted through the aligned bores to create hinged connections between the pistons 1930 and the rotor shaft 1912. Each connector pin 1916 is slightly longer than the aligned bores. About the circumferential periphery of each end of each connector pin 1916 that extends beyond the aligned bores is a circumferential recess (not shown) that can accommodate a retaining fastener (not shown), e.g., a snap ring or spiral ring.

Referring now to FIG. 20 a cross-sectional view of the example rotary piston-type actuator 1900 is shown. The illustrated example shows the rotary pistons 1930 partly inserted into a corresponding pressure chamber 1960 formed as an arcuate cavity in the pressure chamber assembly 1920.

Each pressure chamber 1960 of example actuator 1900 includes a seal assembly 1962 about the interior surface of the pressure chamber 1960 at an open end 1964. In some embodiments, the seal assembly 1962 can be a circular or semi-circular sealing geometry retained on all sides in a standard seal groove.

When the rotary pistons 1930 of example actuator 1900 are inserted through the open ends 1964, each of the seal assemblies 1962 contacts the interior surface of the pressure chamber 1960 and the substantially smooth surface of the piston end 1932 to form a substantially pressure-sealed region (e.g., less than 10% pressure drop per hour) within the pressure chamber 1960. Each of the pressure chambers 1960 each include a fluid port (not shown) formed through the pressure chamber assembly 1920, through with pressurized fluid may flow.

Upon introduction of pressurized fluid, e.g., hydraulic oil, water, air, gas, into the pressure chambers 1960 of example actuator 1900, the pressure differential between the interior of the pressure chambers 1960 and the ambient conditions outside the pressure chambers 1960 causes the piston ends 1932 to be urged outward from the pressure chambers 1960. As the piston ends 1932 are urged outward, the pistons 1930 urge the rotary piston assembly 1910 to rotate.

In the illustrated example actuator 1900, each of the rotary pistons 1930 includes a cavity 1966. FIGS. 21A-21C provide additional cross-sectional and perspective views of one of the rotary pistons 1930. Referring to FIG. 21A, a cross-section the rotary piston 1930, taken across a section of the piston end 1932 is shown. The cavity 1966 is formed within the piston end 1932. Referring to FIG. 21B, the connector arm 1934 and the bore 1936 is shown in perspective. FIG. 21C features a perspective view of the cavity 1966.

In some embodiments, the cavity 1966 may be omitted. For example, the piston end 1932 may be solid in cross-section. In some embodiments, the cavity 1966 may be formed to reduce the mass of the rotary piston 1930 and the mass of the actuator 1900. For example, the actuator 1900 may be implemented in an aircraft application, where weight may play a role in actuator selection. In some embodiments, the cavity 1966 may reduce wear on seal assemblies, such as the seal assembly 320 of FIG. 3. For example, by reducing the mass of the rotary piston 1930, the amount of force the piston end 1932 exerts upon the corresponding seal assembly may be reduced when the mass of the rotary piston is accelerated, e.g., by gravity or G-forces.

In some embodiments, the cavity 1966 may be hollow in cross-section, and include one or more structural members, e.g., webs, within the hollow space. For example, structural cross-members may extend across the cavity of a hollow piston to reduce the amount by which the piston may distort, e.g., bowing out, when exposed to a high pressure differential across the seal assembly.

Figure 22:
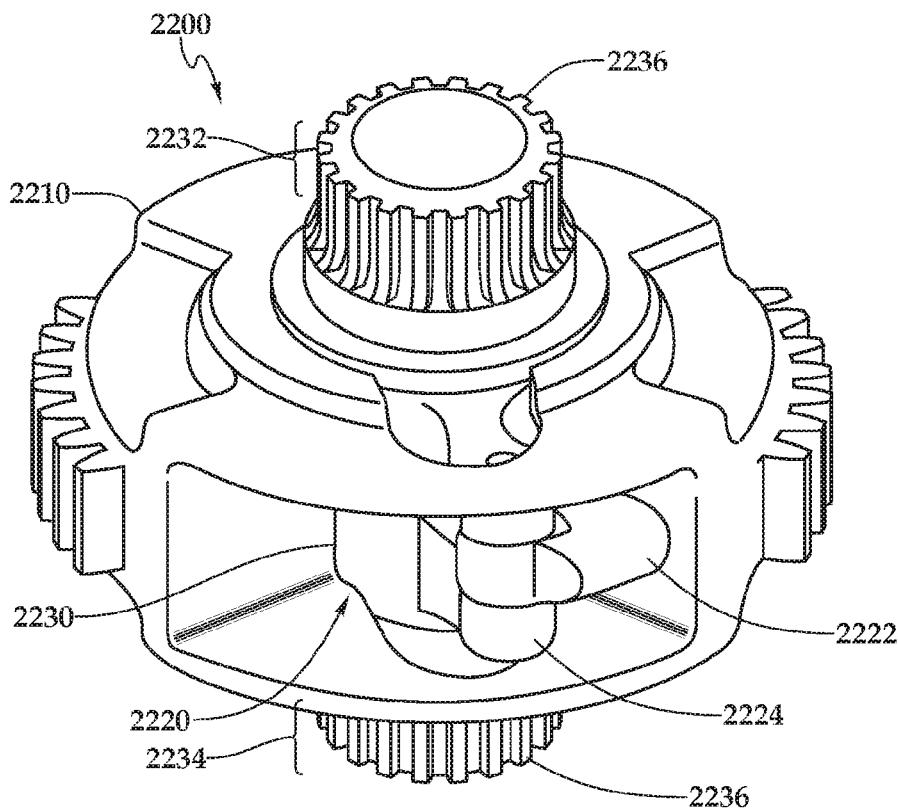
FIGS. 22 and 23 illustrate a comparison of two example rotor shaft embodiments.
Figure 23:
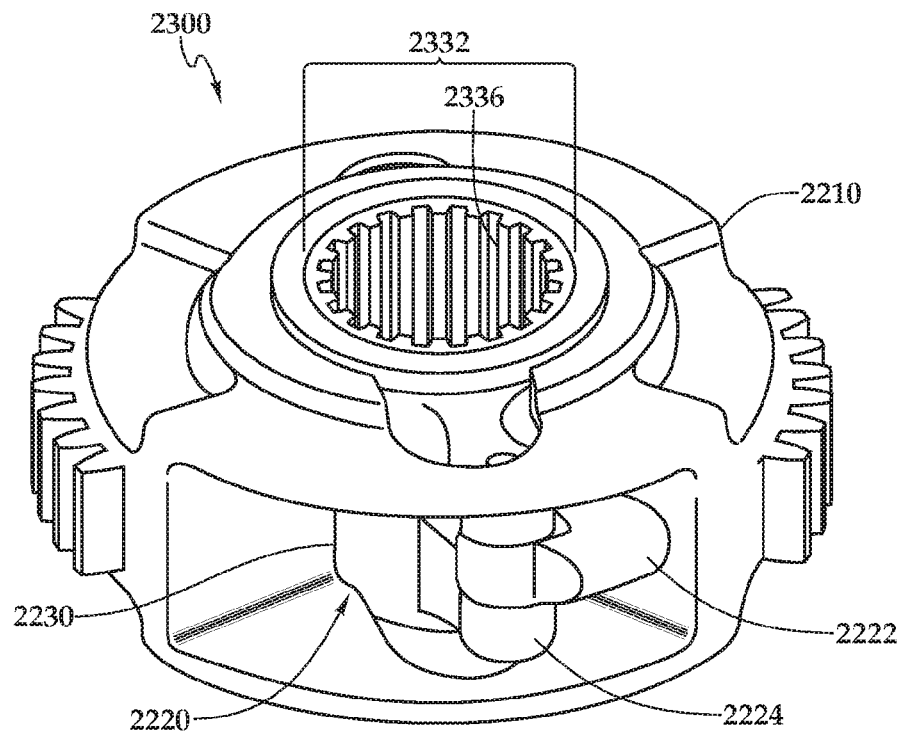

FIGS. 22 and 23 illustrate a comparison of two example rotor shaft embodiments. FIG. 22 is a perspective view of an example rotary piston-type actuator 2200. In some embodiments, the example actuator 2200 can be the example actuator 1900.

The example actuator 2200 includes a pressure chamber assembly 2210 and a rotary piston assembly 2220. The rotary piston assembly 2220 includes at least one rotary piston 2222 and one or more rotor arms 2224. The rotor arms 2224 extend radially from a rotor shaft 2230.

The rotor shaft 2230 of example actuator includes an output section 2232 and an output section 2234 that extend longitudinally from the pressure chamber assembly 2210. The output sections 2232-2234 include a collection of splines 2236 extending radially from the circumferential periphery of the output sections 2232-2234. In some implementations, the output section 2232 and/or 2234 may be inserted into a correspondingly formed splined assembly to rotationally couple the rotor shaft 2230 to other mechanisms. For example, by rotationally coupling the output section 2232 and/or 2234 to an external assembly, the rotation of the rotary piston assembly 2220 may be transferred to urge the rotation of the external assembly.

FIG. 23 is a perspective view of another example rotary piston-type actuator 2300. The actuator 2300 includes the pressure chamber assembly 2210 and a rotary piston assembly 2320. The rotary piston assembly 2320 includes at least one of the rotary pistons 2222 and one or more of the rotor arms 2224. The rotor arms 2224 extend radially from a rotor shaft 2330.

The rotor shaft 2330 of example actuator 2300 includes a bore 2332 formed longitudinally along the axis of the rotor shaft 2330. The rotor shaft 2330 includes a collection of splines 2336 extending radially inward from the circumferential periphery of the bore 2332. In some embodiments, a correspondingly formed splined assembly may be inserted into the bore 2332 to rotationally couple the rotor shaft 2330 to other mechanisms.

Figure 24:
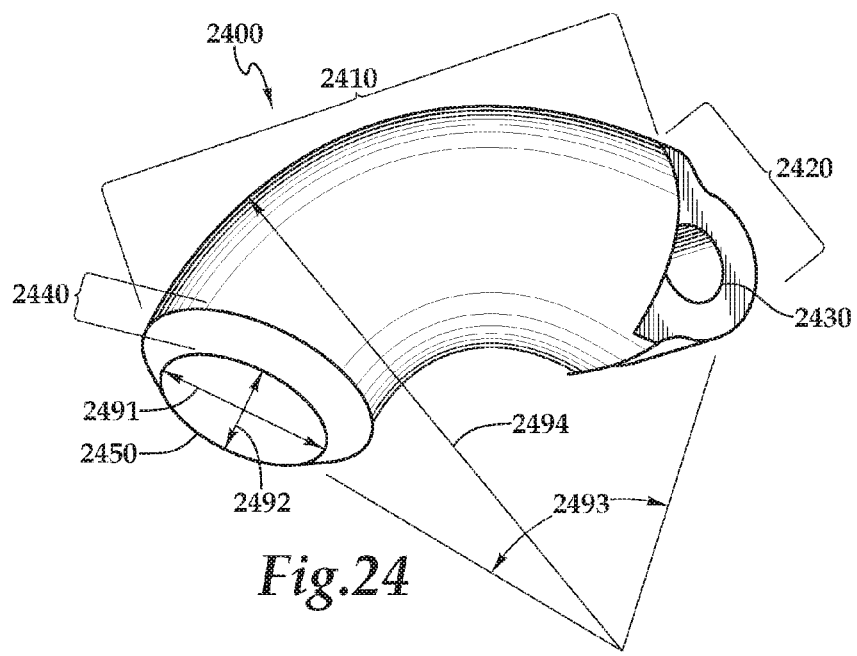
FIG. 24 is a perspective view of another example rotary piston.

FIG. 24 is a perspective view of another example rotary piston 2400. In some embodiments, the rotary piston 2400 can be the rotary piston 250, 260, 414, 712, 812, 822, 1530a, 1530b, 1730a, 1730b, 1930 or 2222.

The example rotary piston 2400 includes a piston end 2410 and a connector section 2420. The connector section 2420 includes a bore 2430 formed to accommodate a connector pin, e.g., the connector pin 214.

The piston end 2410 of example actuator 2400 includes an end taper 2440. The end taper 2440 is formed about the periphery of a terminal end 2450 of the piston end 2410. The end taper 2440 is formed at a radially inward angle starting at the outer periphery of the piston end 2410 and ending at the terminal end 2450. In some implementations, the end taper 2440 can be formed to ease the process of inserting the rotary piston 2400 into a pressure chamber, e.g., the pressure chamber 310.

The piston end 2410 of example actuator 2400 is substantially smooth surface (e.g., a surface quality that can form a fluid barrier when in contact with a seal). In some embodiments, the smooth surface of the piston end 2410 can provide a surface that can be contacted by a seal assembly. For example, the seal assembly 320 can contact the smooth surface of the piston end 2410 to form part of a fluidic seal, reducing the need to form a smooth, fluidically sealable surface on the interior walls of the pressure chamber 310.

In the illustrated example, the rotary piston 2400 is shown as having a generally solid circular cross-section, whereas the rotary pistons piston 250, 260, 414, 712, 812, 822, 1530a, 1530b, 1730a, 1730b, 1930 or 2222 have been illustrated as having various generally rectangular, elliptical, and other shapes, both solid and hollow, in cross section. In some embodiments, the cross sectional dimensions of the rotary piston 2400, as generally indicated by the arrows 2491 and 2492, can be adapted to any appropriate shape, e.g., square, rectangular, ovoid, elliptical, circular, and other shapes, both solid and hollow, in cross section. In some embodiments, the arc of the rotary piston 2400, as generally indicated by the angle 2493, can be adapted to any appropriate length. In some embodiments, the radius of the rotary piston 2400, as generally indicated by the line 2494, can be adapted to any appropriate radius. In some embodiments, the piston end 2410 can be solid, hollow, or can include any appropriate hollow formation. In some embodiments, any of the previously mentioned forms of the piston end 2410 can also be used as the piston ends 1220a and/or 1220b of the dual rotary pistons 1216 of FIG. 12.

Figure 25:
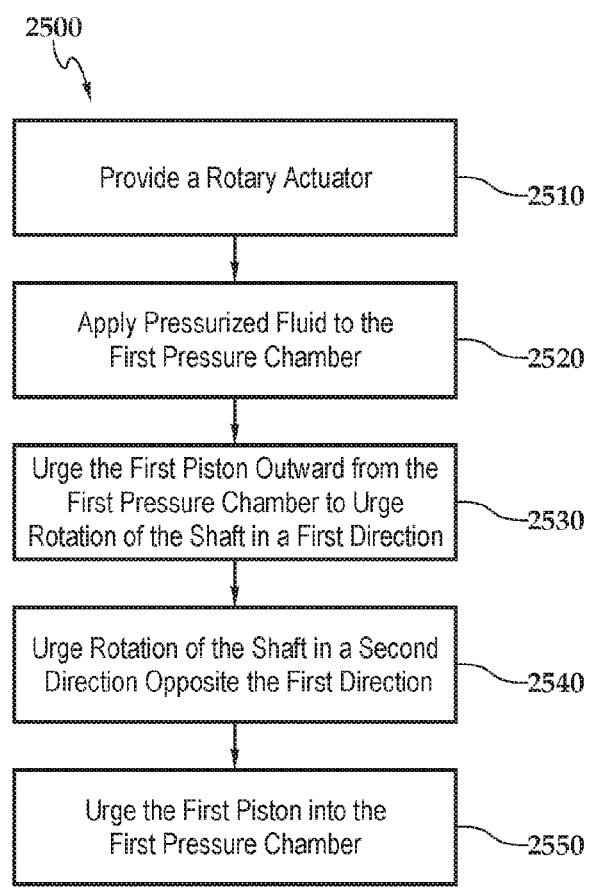
FIG. 25 is a flow diagram of an example process for performing rotary actuation.

FIG. 25 is a flow diagram of an example process 2500 for performing rotary actuation. In some implementations, the process 2500 can be performed by the rotary piston-type actuators 100, 400, 700, 800, 1200, 1500, 1700, 1900, 2200, 2300, and/or 2600 which will be discussed in the descriptions of FIGS. 26-28.

At 2510, a rotary actuator is provided. The rotary actuator of example actuator 2500 includes a first housing defining a first arcuate chamber including a first cavity, a first fluid port in fluid communication with the first cavity, an open end, and a first seal disposed about an interior surface of the open end, a rotor assembly rotatably journaled in the first housing and including a rotary output shaft and a first rotor arm extending radially outward from the rotary output shaft, an arcuate-shaped first piston disposed in the first housing for reciprocal movement in the first arcuate chamber through the open end. The first seal, the first cavity, and the first piston define a first pressure chamber, and a first connector, coupling a first end of the first piston to the first rotor arm. For example, the actuator 100 includes the components of the pressure chamber assembly 300 and the rotary piston assembly 200 included in the actuation section 120.

At 2520, a pressurized fluid is applied to the first pressure chamber. For example, pressurized fluid can be flowed through the fluid port 320 into the pressure chamber 310.

At 2530, the first piston is urged partially outward from the first pressure chamber to urge rotation of the rotary output shaft in a first direction. For example, a volume of pressurized fluid flowed into the pressure chamber 310 will displace a similar volume of the rotary piston 260, causing the rotary piston 260 to be partly urged out of the pressure cavity 310, which in turn will cause the rotor shaft 210 to rotate clockwise.

At 2540, the rotary output shaft is rotated in a second direction opposite that of the first direction. For example, the rotor shaft 210 can be rotated counter-clockwise by an external force, such as another mechanism, a torque-providing load, a return spring, or any other appropriate source of rotational torque.

At 2550, the first piston is urged partially into the first pressure chamber to urge pressurized fluid out the first fluid port. For example, the rotary piston 260 can be pushed into the pressure chamber 310, and the volume of the piston end 252 extending into the pressure chamber 310 will displace a similar volume of fluid, causing it to flow out the fluid port 312.

In some embodiments, the example process 2500 can be used to provide substantially constant power over stroke to a connected mechanism. For example, as the actuator 100 rotates, there may be less than 10% position-dependent variation in the torque delivered to a connected load.

In some embodiments, the first housing further defines a second arcuate chamber comprising a second cavity, a second fluid port in fluid communication with the second cavity, and a second seal disposed about an interior surface of the open end, the rotor assembly also includes a second rotor arm, the rotary actuator also includes an arcuate-shaped second piston disposed in said housing for reciprocal movement in the second arcuate chamber, wherein the second seal, the second cavity, and the second piston define a second pressure chamber, and a second connector coupling a first end of the second piston to the second rotor arm. For example, the actuator 100 includes the components of the pressure chamber assembly 300 and the rotary piston assembly 200 included in the actuation section 110.

In some embodiments, the second piston can be oriented in the same rotational direction as the first piston. For example, the two pistons 260 are oriented to operate cooperatively in the same rotational direction. In some embodiments, the second piston can be oriented in the opposite rotational direction as the first piston. For example, the rotary pistons 250 are oriented to operate in the opposite rotational direction relative to the rotary pistons 260.

In some embodiments, the actuator can include a second housing and disposed about the first housing and having a second fluid port, wherein the first housing, the second housing, the seal, and the first piston define a second pressure chamber. For example, the actuator 400 includes the outer housing 450 that surrounds the pressure chamber assembly 420. Pressurized fluid in the bore 452 is separated from fluid in the pressure chambers 422 by the seals 426.

In some implementations, rotating the rotary output shaft in a second direction opposite that of the first direction can include applying pressurized fluid to the second pressure chamber, and urging the second piston partially outward from the second pressure chamber to urge rotation of the rotary output shaft in a second direction opposite from the first direction. For example, pressurized fluid can be applied to the pressure chambers 310 of the first actuation section 110 to urge the rotary pistons 260 outward, causing the rotor shaft 210 to rotate counter-clockwise.

In some implementations, rotating the rotary output shaft in a second direction opposite that of the first direction can include applying pressurized fluid to the second pressure chamber, and urging the first piston partially into the first pressure chamber to urge rotation of the rotary output shaft in a second direction opposite from the first direction. For example, pressurized fluid can be flowed into the bore 452 at a pressure higher than that of fluid in the pressure chambers 422, causing the rotary pistons 414 to move into the pressure chambers 422 and cause the rotor shaft 412 to rotate counter-clockwise.

In some implementations, rotation of the rotary output shaft can urge rotation of the housing. For example, the rotary output shaft 412 can be held rotationally stationary and the housing 450 can be allowed to rotate, and application of pressurized fluid in the pressure chambers 422 can urge the rotary pistons 414 out of the pressure chambers 422, causing the housing 450 to rotate about the rotary output shaft 412.

FIGS. 26-28 show various views of the components of another example rotary piston-type actuator 2600. In general, the actuator 2600 is similar to the example actuator 100 of FIG. 1, except for the configuration of the seal assemblies. Whereas the seal assembly 320 in the example actuator 100 remains substantially stationary (e.g., +/−5 degrees) relative to the pressure chamber 310 and is in sliding contact with the surface of the rotary piston 250, in the example actuator 2600, the seal configuration is comparatively reversed as will be described below.

Referring to FIG. 26, a perspective view of the example rotary piston-type actuator 2600 is shown. The actuator 2600 includes a rotary piston assembly 2700 and a pressure chamber assembly 2602. The actuator 2600 includes a first actuation section 2610 and a second actuation section 2620. In the example of actuator 2600, the first actuation section 2610 is configured to rotate the rotary piston assembly 2700 in a first direction, e.g., counter-clockwise, and the second actuation section 2620 is configured to rotate the rotary piston assembly 2700 in a second direction opposite the first direction, e.g., clockwise.

Referring now to FIG. 27, a perspective view of the example rotary piston assembly 2700 is shown apart from the pressure chamber assembly 2602. The rotary piston assembly 2700 includes a rotor shaft 2710. A plurality of rotor arms 2712 extend radially from the rotor shaft 2710, the distal end of each rotor arm 2712 including a bore (not shown) substantially aligned (e.g., +/−2 degrees) with the axis of the rotor shaft 2710 and sized to accommodate one of a collection of connector pins 2714.

As shown in FIG. 27, the first actuation section 2710 of example rotary piston assembly 2700 includes a pair of rotary pistons 2750, and the second actuation section 2720 includes a pair of rotary pistons 2760. While the example actuator 2600 includes two pairs of the rotary pistons 2750, 2760, other embodiments can include greater and/or lesser numbers of cooperative and opposing rotary pistons.

In the example rotary piston assembly shown in FIG. 27, each of the rotary pistons 2750, 2760 includes a piston end 2752 and one or more connector arms 2754. The piston end 252 is formed to have a generally semi-circular body having a substantially smooth surface (e.g., a surface quality that can form a fluid barrier when in contact with a seal). Each of the connector arms 2754 includes a bore 2756 substantially aligned (e.g., +/−2 degrees) with the axis of the semi-circular body of the piston end 2752 and sized to accommodate one of the connector pins 2714.

In some implementations, each of the rotary pistons 2750, 2760 includes a seal assembly 2780 disposed about the outer periphery of the piston ends 2752. In some implementations, the seal assembly 2780 can be a circular or semi-circular sealing geometry retained on all sides in a standard seal groove. In some implementations, commercially available reciprocating piston or cylinder type seals can be used. For example, commercially available seal types that may already be in use for linear hydraulic actuators flying on current aircraft may demonstrate sufficient capability for linear load and position holding applications. In some implementations, the sealing complexity of the actuator 2600 may be reduced by using a standard, e.g., commercially available, semi-circular, unidirectional seal designs generally used in linear hydraulic actuators. In some embodiments, the seal assembly 2780 can be a one-piece seal.

FIG. 28 is a perspective cross-sectional view of the example rotary piston-type actuator 2600. The illustrated example shows the rotary pistons 2760 inserted into a corresponding pressure chamber 2810 formed as an arcuate cavity in the pressure chamber assembly 2602. The rotary pistons 2750 are also inserted into corresponding pressure chambers 2810, not visible in this view.

In the example actuator 2600, when the rotary pistons 2750, 2760 are each inserted through an open end 2830 of each pressure chamber 2810, each seal assembly 2780 contacts the outer periphery of the piston end 2760 and the substantially smooth interior surface of the pressure chamber 2810 to form a substantially pressure-sealed (e.g., less than 10% pressure drop per hour) region within the pressure chamber 2810.

In some embodiments, the seal 2780 can act as a bearing. For example, the seal 2780 may provide support for the piston 2750, 2760 as it moves in and out of the pressure chamber 310.

FIGS. 29A-29E are various views of another example rotary piston-type actuator 2900 with a central actuation assembly 2960. For a brief description of each drawing see the brief description of each of these drawings included at the beginning of the Description of the Drawings section of this document.

In general, the example rotary piston-type actuator 2900 substantially similar to the example rotary piston-type actuator 1200 of FIGs. 12-14, where the example rotary piston-type actuator 2900 also includes a central actuation assembly 2960 and a central mounting assembly 2980. Although the example rotary piston-type actuator 2900 is illustrated and described as modification of the example rotary piston-type actuator 1200, in some embodiments the example rotary piston-type actuator 2900 can implement features of any of the example rotary piston-type actuators 100, 400, 700, 800, 1200, 1500, 1700, 1900, 2200, 2300, and/or 2600 in a design that also implements the central actuation assembly 2960 and/or the central mounting assembly 2980.

The actuator 2900 includes a rotary piston assembly 2910, a first actuation section 2901 and a second actuation section 2902. The rotary piston assembly 2910 includes a rotor shaft 2912, a collection of rotor arms 2914, and the collection of dual rotary pistons, e.g., the dual rotary pistons 1216 of FIGS. 12-14.

The first actuation section 2901 of example actuator 2900 includes a first pressure chamber assembly 2950a, and the second actuation section 2902 includes a second pressure chamber assembly 2950b. The first pressure chamber assembly 2950a includes a collection of pressure chambers, e.g., the pressure chambers 1252a of FIGS. 12-14, formed as arcuate cavities in the first pressure chamber assembly 2950a. The second pressure chamber assembly 2950b includes a collection of pressure chambers, e.g., the pressure chambers 1252b of FIGS. 12-14, formed as arcuate cavities in the second pressure chamber assembly 2950b. A semi-circular bore 2953 in the housing accommodates the rotor shaft 2912.

The central mounting assembly 2980 is formed as a radially projected portion 2981 of a housing of the second pressure chamber assembly 2950b. The central mounting assembly 2980 provides a mounting point for removably affixing the example rotary piston-type actuator 2900 to an external surface, e.g., an aircraft frame. A collection of holes 2982 formed in the radially projected section 2981 accommodate the insertion of a collection of fasteners 2984, e.g., bolts, to removably affix the central mounting assembly 2980 to an external mounting feature 2990, e.g., a mounting point (bracket) on an aircraft frame.

The central actuation assembly 2960 includes a radial recess 2961 formed in a portion of an external surface of a housing of the first and the second actuation sections 2901, 2902 at a midpoint along a longitudinal axis AA to the example rotary piston-type actuator 2900. An external mounting bracket 2970 that may be adapted for attachment to an external mounting feature on a member to be actuated, (e.g., aircraft flight control surfaces) is connected to an actuation arm 2962. The actuation arm 2962 extends through the recess 2961 and is removably attached to a central mount point 2964 formed in an external surface at a midpoint of the longitudinal axis of the rotor shaft 2912.

Figure 29A:
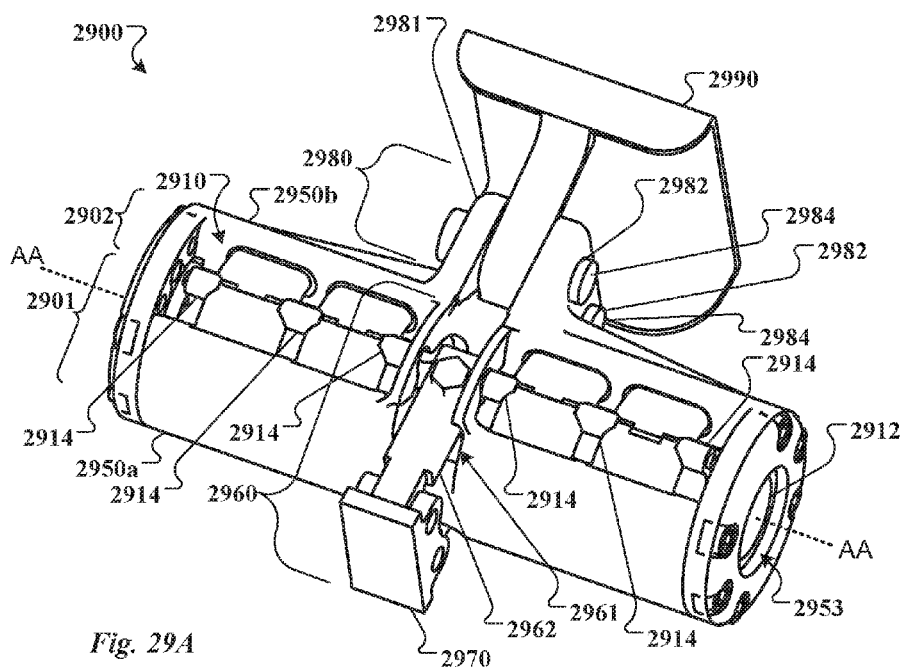
FIG. 29A is a perspective view from above of an example rotary-piston type actuator with a central actuation assembly.
Figure 29B:
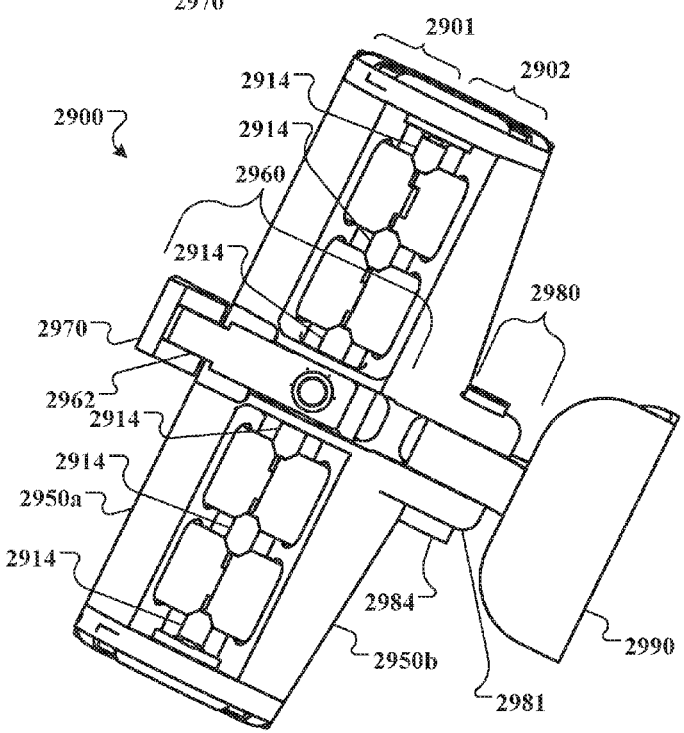
FIG. 29B is a top view of the actuator of FIG. 29A.
Figure 29C:
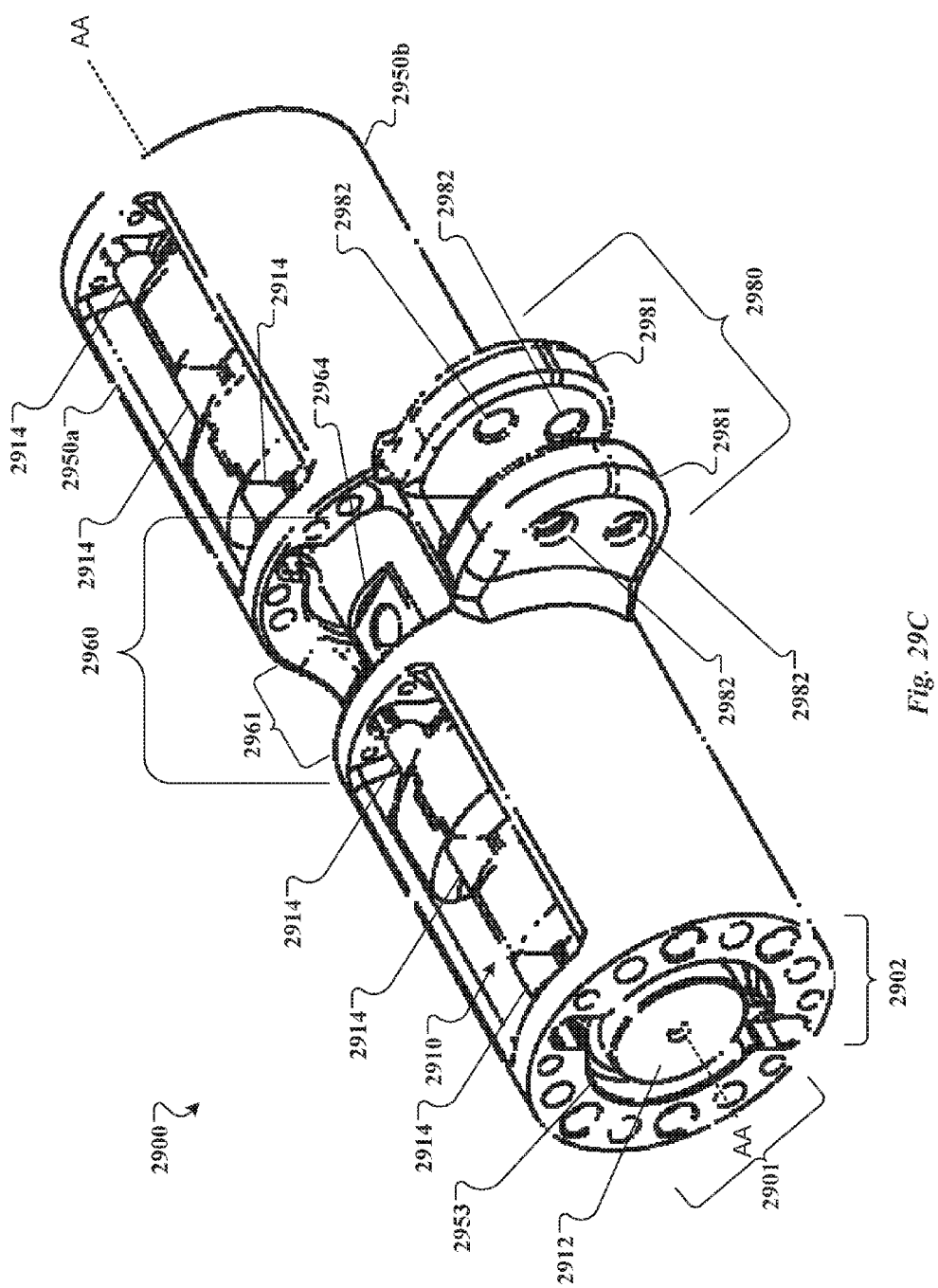
FIG. 29C is a perspective view from the right side and above illustrating the actuator of FIG. 29A with a portion of the central actuation assembly removed for illustration purposes.
Figure 29D:
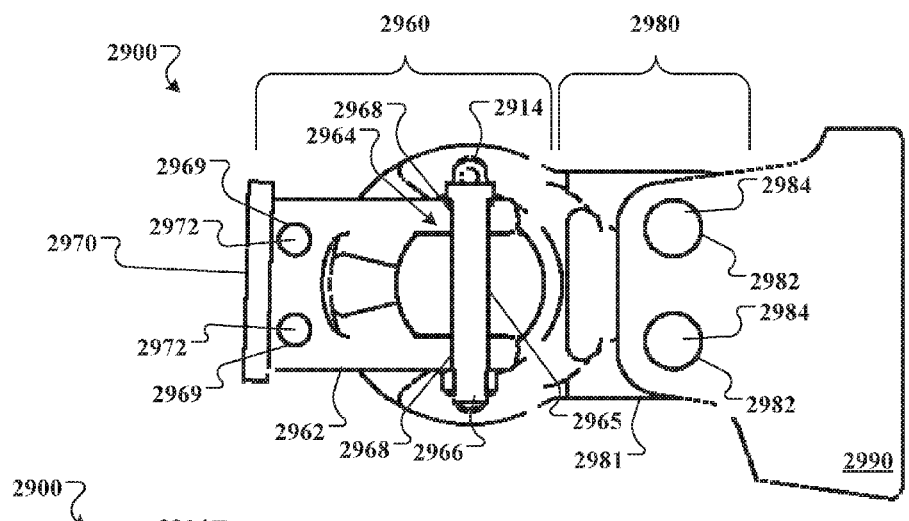
FIG. 29D is a lateral cross section view taken at section AA of the actuator of FIG. 29B.
Figure 29E:
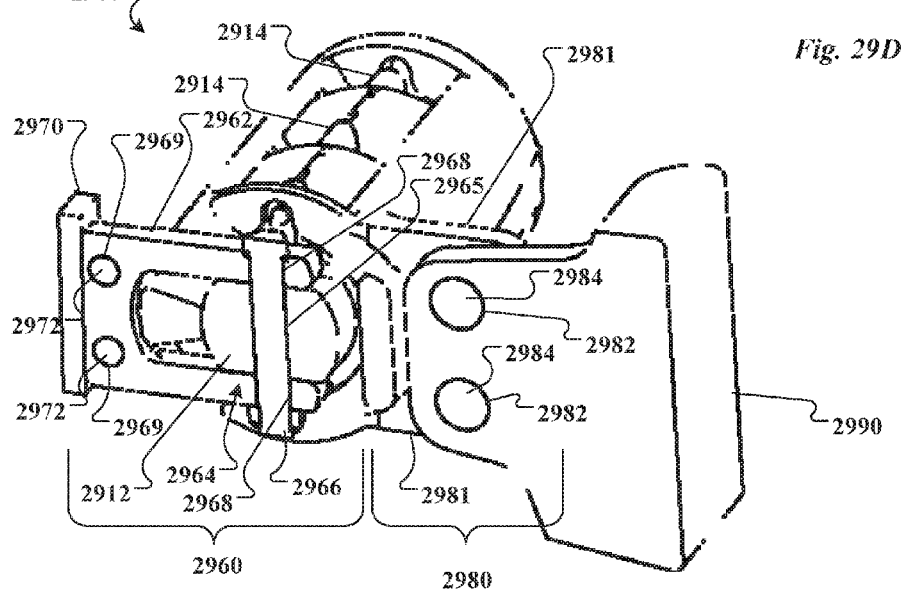
FIG. 29E is a partial perspective view from cross section AA of FIG. 29B.
Figure 30A:
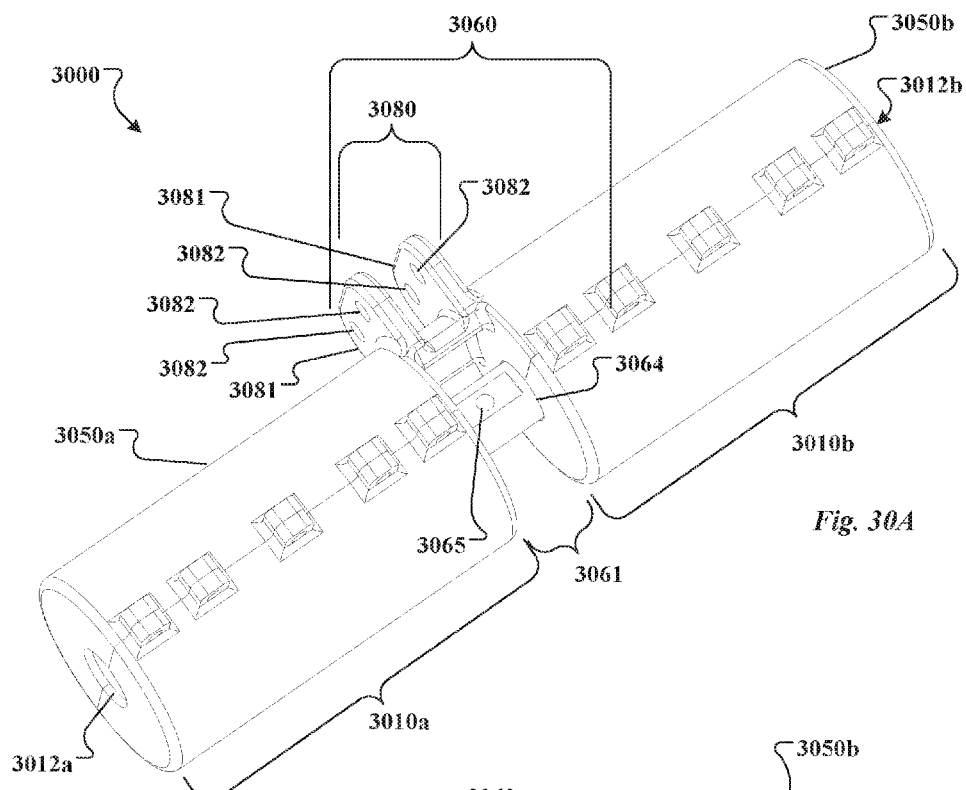
FIG. 30A is a perspective view from above of an example rotary actuator with a central actuation assembly.
Figure 30B:
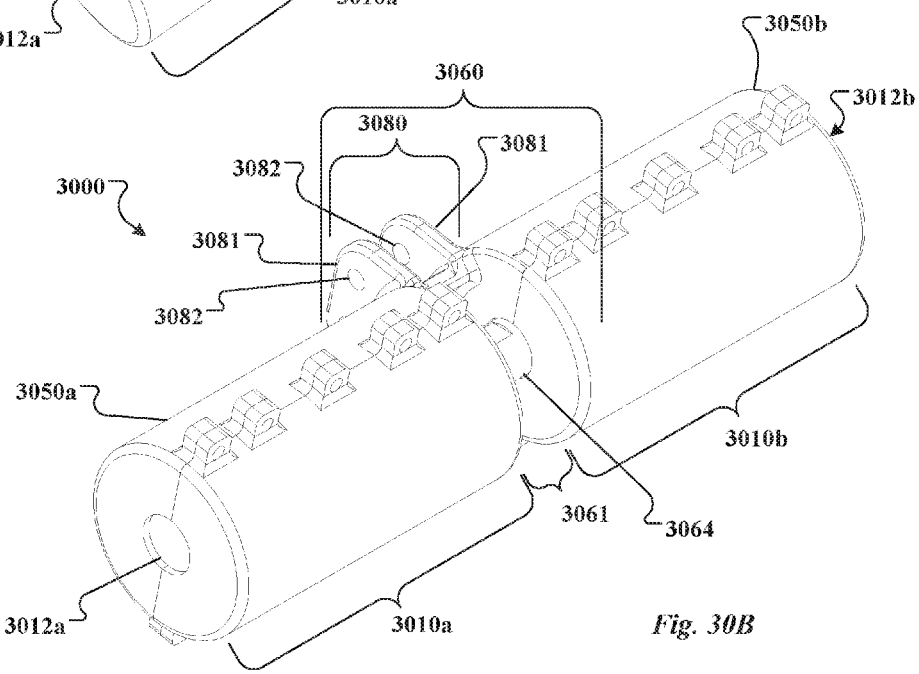
FIG. 30B is another perspective view from above of the example rotary actuator of FIG. 30A.

Referring more specifically to FIGS. 29D and 29E now, the example rotary piston-type actuator 2900 is shown in cutaway end and perspective views taken though a midpoint of the central actuation assembly 2960 and the central mounting assembly 2980 at the recess 2961. The actuation arm 2962 extends into the recess 2961 to contact the central mount point 2964 of the rotor shaft 2912. The actuation arm 2962 is removably connected to the central mount point 2964 by a fastener 2966, e.g., bolt, that is passed through a pair of holes 2968 formed in the actuation arm 2962 and a hole 2965 formed through the central mount point 2964. A collection of holes 2969 are formed in a radially outward end of the actuation arm 2962. A collection of fasteners 2972, e.g., bolts, are passed through the holes 2969 and corresponding holes (not shown) formed in an external mounting feature (bracket) 2970. As mentioned above, the central actuation assembly 2960 connects the example rotary piston actuator 2900 to the external mounting feature 2970 to transfer rotational motion of the rotor assembly 2910 to equipment to be moved (actuated), e.g., aircraft flight control surfaces.

In some embodiments, one of the central actuation assembly 2960 or the central mounting assembly 2980 can be used in combination with features of any of the example rotary piston-type actuators 100, 400, 700, 800, 1200, 1500, 1700, 1900, 2200, 2300, and/or 2600. For example, the example rotary piston-type actuator 2900 may be mounted to a stationary surface through the central mounting assembly 2980, and provide actuation at one or both ends of the rotor shaft assembly 2910. In another example, the example rotary piston assembly 2900 may be mounted to a stationary surface through non-central mounting points, and provide actuation at the central actuation assembly 2960.

FIGS. 30A-30E are various views of an example rotary actuator 3000 with a central actuation assembly 3060. For a brief description of each drawing see the brief description of each of these drawings included at the beginning of the Description of the Drawings section of this document.

In general, the example rotary actuator 3000 is substantially similar to the rotary piston-type actuator 2900 of FIGS. 29A-29E, where the example rotary actuator 3000 also includes a central actuation assembly 3060 and a central mounting assembly 3080. In some embodiments, the example rotary actuator 3000 can be a modification of the example rotary piston-type actuator 2900 in which rotational action can be performed by a mechanism other than a rotary piston-type actuator. For example, the example rotary actuator 3000 can be include a rotary vane type actuator, a rotary fluid type actuator, an electromechanical actuator, a linear-to-rotary motion actuator, or combinations of these or any other appropriate rotary actuator. Although the example rotary actuator 3000 is illustrated and described as modification of the example rotary piston-type actuator 2900, in some embodiments the example rotary actuator 3000 can implement features of any of the example rotary piston-type actuators 100, 400, 700, 800, 1200, 1500, 1700, 1900, 2200, 2300, 2600 and/or 2900 in a design that also implements the central actuation assembly 3060 and/or the central mounting assembly 3080.

The actuator 3000 includes a rotary actuator section 3010a and a rotary actuator section 3010b. In some embodiments, the rotary actuator sections 3010a and 3010b can be rotary vane type actuators, a rotary fluid type actuators, electromechanical actuators, a linear-to-rotary motion actuators, or combinations of these or any other appropriate rotary actuators. The rotary actuator section 3010a includes a housing 3050a, and the rotary actuator section 3010b includes a housing 3050b. A rotor shaft 3012a runs along the longitudinal axis of the rotary actuator section 3010a, and a rotor shaft 3012b runs along the longitudinal axis of the rotary actuator section 3010b.

The central mounting assembly 3080 is formed as a radially projected portion 3081 of the housings 3050a and 3050b. The central mounting assembly 3080 provides a mounting point for removably affixing the example rotary actuator 3000 to an external surface or an external structural member, e.g., an aircraft frame, an aircraft control surface. A collection of holes 3082 formed in the radially projected section 3081 accommodate the insertion of a collection of fasteners (not shown), e.g., bolts, to removably affix the central mounting assembly 3080 to an external mounting feature, e.g., the external mounting feature 2090 of FIG. 29, a mounting point (bracket) on an aircraft frame or control surface.

The central actuation assembly 3060 includes a radial recess 3061 formed in a portion of an external surfaces of the housings 3050a, 3050b at a midpoint along a longitudinal axis AA to the example rotary actuator 3000. In some implementations, an external mounting bracket, such as the external mounting bracket 2970, may be adapted for attachment to an external mounting feature of a structural member or a member to be actuated, (e.g., aircraft flight control surfaces) can be connected to an actuation arm 3062. An actuation arm, such as the actuation arm 2962, can extend through the recess 3061 and can be removably attached to a central mount point 3064 formed in an external surface at a midpoint of the longitudinal axis of the rotor shafts 3012a and 3012b.

Referring more specifically to FIGS. 30D and 30E now, the example rotary piston-type actuator 3000 is shown in end and cutaway perspective views taken though a midpoint of the central actuation assembly 3060 and the central mounting assembly 3080 at the recess 3061. The actuation arm (not shown) can extend into the recess 3061 to contact the central mount point 3064 of the rotor shafts 3012a, 3012b. The actuation arm can be removably connected to the central mount point 3064 by a fastener, e.g., bolt, that can be passed through a pair of holes (e.g. the holes 2968 formed in the actuation arm 2962) and a hole 3065 formed through the central mount point 3064. Similarly to as was discussed in the description of the rotary piston-type actuator 2900 and the central actuation assembly 2960, the central actuation assembly 3060 connects the example rotary actuator 3000 to an external mounting feature or structural member to impart rotational motion of the actuator sections 3010a, 3010b to equipment to be moved (actuated), e.g., aircraft flight control surfaces, relative to structural members, e.g., aircraft frames.

In some embodiments, one of the central actuation assembly 3060 or the central mounting assembly 3080 can be used in combination with features of any of the example rotary piston-type actuators 100, 400, 700, 800, 1200, 1500, 1700, 1900, 2200, 2300, 2600 and/or 2900. For example, the example rotary actuator 3000 may be mounted to a stationary surface through the central mounting assembly 3080, and provide actuation at one or both ends of the rotor shafts 3012a, 3012b. In another example, the example rotary actuator 3000 may be mounted to a stationary surface through non-central mounting points, and provide actuation at the central actuation assembly 3060. In another example, the rotary actuator 3000 may be mounted to a stationary surface through the central mount point 3064, and provide actuation at the central mounting assembly 3080.

FIGS. 31A-31E are various views of an example rotary actuator 3100 with a central actuation assembly 3160. For a brief description of each drawing see the brief description of each of these drawings included at the beginning of the Description of the Drawings section of this document.

In general, the example rotary actuator 3100 is substantially similar to the rotary actuator 3000 of FIGS. 30A-30E, where the example rotary actuator 3100 also includes a central actuation assembly 3160 and a central mounting assembly 3180. In some embodiments, the example rotary actuator 3100 can be a modification of the example rotary piston-type actuator 3000 in which rotational action can be performed by a mechanism other than a rotary fluid actuator. The example rotary actuator 3100 is an electromechanical actuator. Although the example rotary actuator 3100 is illustrated and described as modification of the example rotary actuator 3000, in some embodiments the example rotary actuator 3100 can implement features of any of the example rotary piston-type actuators 100, 400, 700, 800, 1200, 1500, 1700, 1900, 2200, 2300, 2600 and/or 2900 and/or the rotary actuator 3000 in a design that also implements the central actuation assembly 3160 and/or the central mounting assembly 3180.

The actuator 3100 includes a rotary actuator section 3110a and a rotary actuator section 3110b. In some embodiments, the rotary actuator sections 3110a and 3110b can be electromechanical actuators. The rotary actuator section 3110a includes a housing 3150a, and the rotary actuator section 3110b includes a housing 3150b. A rotor shaft 3112a runs along the longitudinal axis of the rotary actuator section 3110a, and a rotor shaft 3112b runs along the longitudinal axis of the rotary actuator section 3110b.

The central mounting assembly 3180 is formed as a radially projected portion 3181 of the housings 3150a and 3150b. The central mounting assembly 3180 provides a mounting point for removably affixing the example rotary actuator 3100 to an external surface or an external structural member, e.g., an aircraft frame, an aircraft control surface. A collection of holes 3182 formed in the radially projected section 3181 accommodate the insertion of a collection of fasteners (not shown), e.g., bolts, to removably affix the central mounting assembly 3180 to an external mounting feature, e.g., the external mounting feature 2090 of FIG. 29, a mounting point (bracket) on an aircraft frame or control surface.

The central actuation assembly 3160 includes a radial recess 3161 formed in a portion of an external surfaces of the housings 3150a, 3150b at a midpoint along a longitudinal axis AA to the example rotary actuator 3100. In some implementations, an external mounting bracket, such as the external mounting bracket 2970, may be adapted for attachment to an external mounting feature of a structural member or a member to be actuated, (e.g., aircraft flight control surfaces) can be connected to an actuation arm 3162. An actuation arm, such as the actuation arm 2962, can extend through the recess 3161 and can be removably attached to a central mount point 3164 formed in an external surface at a midpoint of the longitudinal axis of the rotor shafts 3112a and 3112b.

Figure 31A:
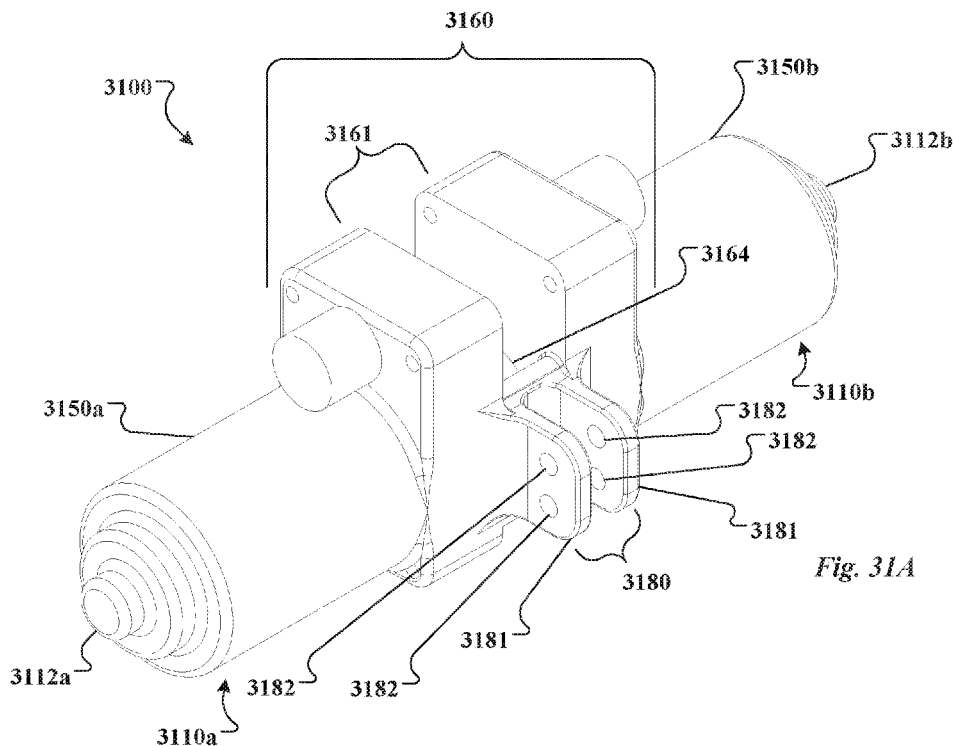
FIG. 31A is a perspective view from above of another example rotary actuator with a central actuation assembly.
Figure 31B:
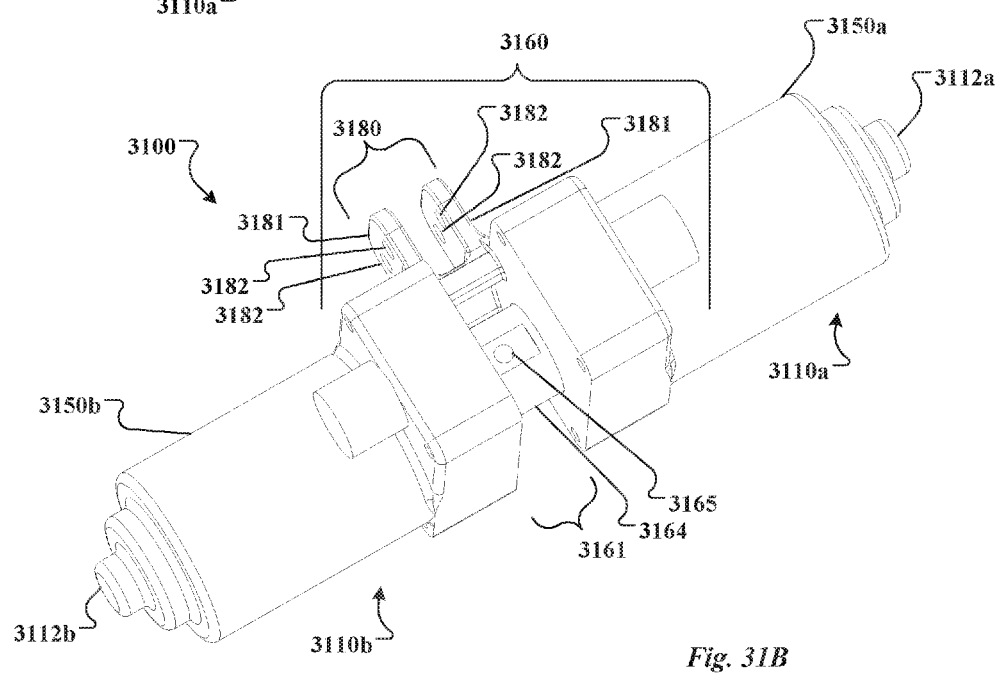
FIG. 31B is another perspective view from above of the example rotary actuator of FIG. 31A.
Figure 31C:
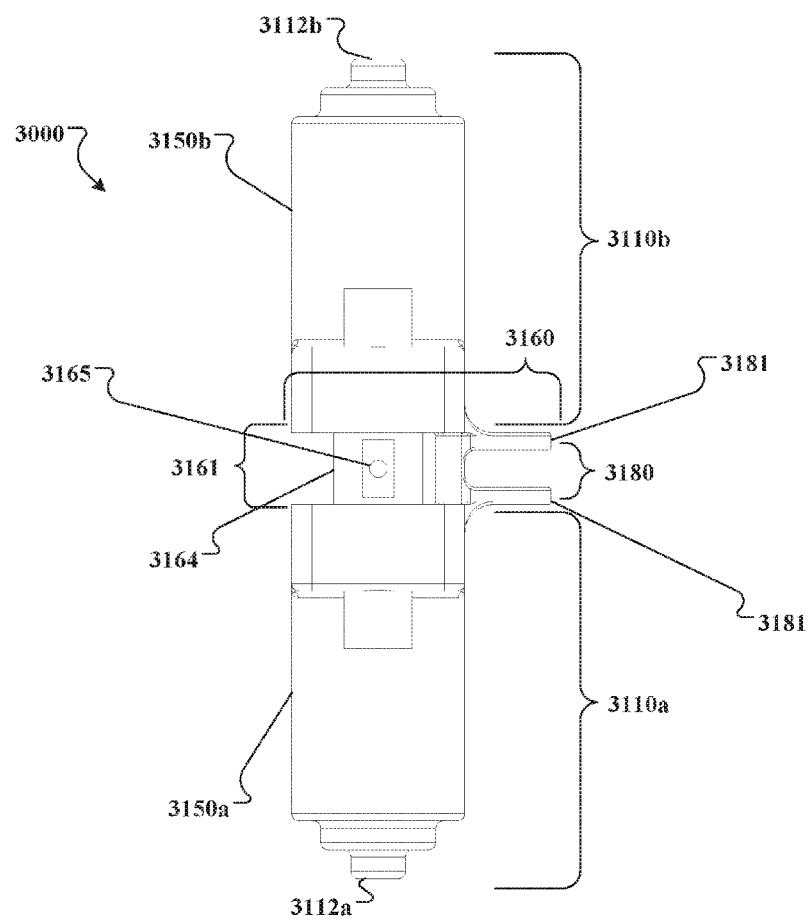
FIG. 31C is a top view of the example rotary actuator of FIG. 31A.
Figure 31D:
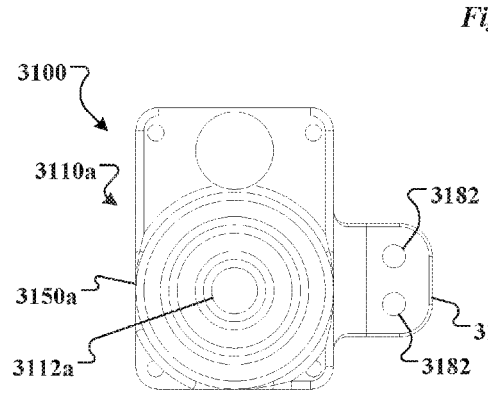
FIG. 31D is an end view of the example rotary actuator of FIG. 31A.
Figure 31E:
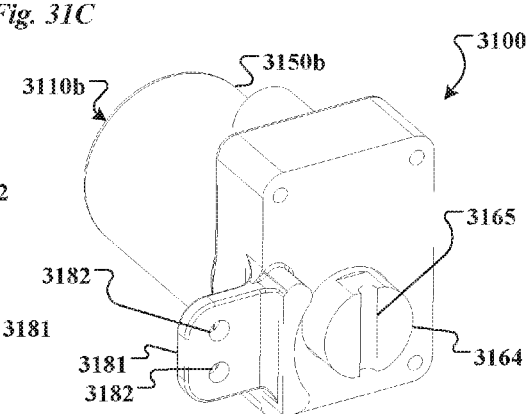
FIG. 31E is a partial perspective view from cross section AA of FIG. 31C.

Referring more specifically to FIGS. 31D and 31E now, the example rotary piston-type actuator 3100 is shown in end and cutaway perspective views taken though a midpoint of the central actuation assembly 3160 and the central mounting assembly 3080 at the recess 3161. The actuation arm (not shown) can extend into the recess 3161 to contact the central mount point 3164 of the rotor shafts 3112a, 3112b. The actuation arm can be removably connected to the central mount point 3164 by a fastener, e.g., bolt, that can be passed through a pair of holes (e.g. the holes 2968 formed in the actuation arm 2962) and a hole 3165 formed through the central mount point 3164. Similarly to as was discussed in the description of the rotary piston-type actuator 2900 and the central actuation assembly 2960, the central actuation assembly 3160 connects the example rotary actuator 3100 to an external mounting feature or structural member to impart rotational motion of the actuator sections 3110a, 3110b to equipment to be moved (actuated), e.g., aircraft flight control surfaces, relative to structural members, e.g., aircraft frames.

In some embodiments, one of the central actuation assembly 3160 or the central mounting assembly 3180 can be used in combination with features of any of the example rotary piston-type actuators 100, 400, 700, 800, 1200, 1500, 1700, 1900, 2200, 2300, 2600 and/or 2900 and/or the rotary actuator 3000. For example, the example rotary actuator 3100 may be mounted to a stationary surface through the central mounting assembly 3180, and provide actuation at one or both ends of the rotor shafts 3112a, 3112b. In another example, the example rotary actuator 3100 may be mounted to a stationary surface through non-central mounting points, and provide actuation at the central actuation assembly 3160. In another example, the rotary actuator 3100 may be mounted to a stationary surface through the central mount point 3164, and provide actuation at the central mounting assembly 3180.

Figure 32:
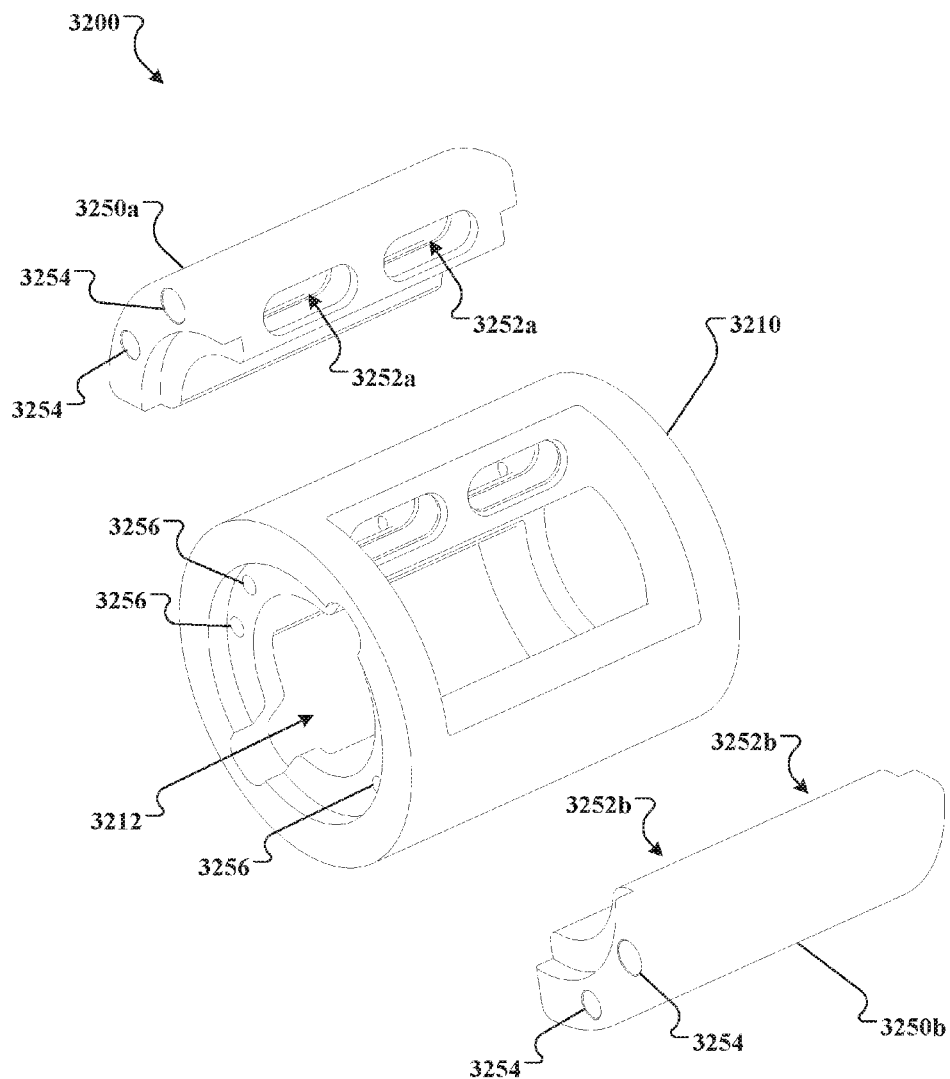
FIG. 32 is an exploded perspective view of another example pressure chamber assembly.

FIG. 32 is an exploded perspective view of another example pressure chamber assembly 3200. In some embodiments, features of the pressure chamber assembly 3200 can be used with any of the actuators 400, 800, 1200, 1500, 1750, 1900, 2200, 2300, and 2600. The pressure chamber assembly 3200 includes a housing 3210, a modular piston housing 3250a, and a modular piston housing 3250b. The housing 3210 includes a central longitudinal cavity 3212. The central longitudinal cavity 3212 is formed to accommodate a rotor shaft (not shown) such as the rotor shaft 210 of the rotary piston assembly 200 of FIG. 2.

The modular piston housing 3250a of example pressure chamber assembly 3200 is an arcuate-shaped assembly that includes a collection of pressure chambers 3252a formed as arcuate cavities in the modular piston housing 3250a. Similarly, the modular piston housing 3250b is also an arcuate-shaped assembly that includes a collection of pressure chambers 3252b formed as arcuate cavities in the modular piston housing 3250b. In the illustrated example, the modular piston housing 3250b mirrors the arcuate shape of the modular piston housing 3250a. The pressure chambers 3252a, 3252b are formed to accommodate rotary pistons (not shown) such as rotary pistons 250. In some implementations, the modular piston housings 3250a, 3250b can be formed as unitary piston housings. For example, the modular piston housings 3250a, 3250b may each be machined, extruded, or otherwise formed without forming seams within the pressure chambers 3251a, 3252b.

In the assembled form of the example pressure chamber assembly 3200, the modular piston housings 3250a, 3250b are removably affixed to the housing 3210. In some embodiments, the pressure chamber assembly 3200 can include radial apertures into which the modular piston housings 3250a, 3250b can be inserted. In some embodiments, the pressure chamber assembly 3200 can include longitudinal apertures into which the modular piston housings 3250a, 3250b can be inserted.

The modular piston housings 3250a, 3250b of example pressure chamber assembly 3200 include a collection of bores 3254. In the assembled form of the pressure chamber assembly 3200 the bores 3254 align with a collection of bores 3256 formed in the housing 3210, a collection of fasteners (not shown), e.g., bolts or screws, are passed through the bores 3256 and into the bores 3254 to removably affix the modular piston housings 3250a, 3250b to the housing 3210.

In some embodiments, modular piston housings 3250a, 3250b can include a seal assembly about the interior surface of the pressure chambers 3252a, 3252b. In some embodiments, the seal assembly can be a circular or semi-circular sealing geometry retained on all sides in a standard seal groove. In some embodiments, commercially available reciprocating piston or cylinder type seals can be used. For example, commercially available seal types that may already be in use for linear hydraulic actuators flying on current aircraft may demonstrate sufficient capability for linear load and position holding applications. In some embodiments, the sealing complexity of the example pressure chamber assembly 3200 may be reduced by using a standard, e.g., commercially available, semi-circular, unidirectional seal design generally used in linear hydraulic actuators. In some embodiments, the seal assemblies can be a one-piece seal. In some embodiments of the modular piston housings 3250a, 3250b, the seal assemblies may be included as part of the rotary pistons. In some embodiments, the modular piston housings 3250a, 3250b may include a wear member between the pistons and the pressure chambers 3252a, 3252b.

Each of the pressure chambers 3252a, 3252b of example pressure chamber assembly 3200 may include a fluid port (not shown) formed through the modular piston housings 3250a, 3250b, through which pressurized fluid may flow. Upon introduction of pressurized fluid (e.g., hydraulic oil, water, air, gas) into the pressure chambers 3252a, 3252b, the pressure differential between the interior of the pressure chambers 3252a, 3252b and the ambient conditions outside the pressure chambers 3252a, 3252b can cause ends of the pistons to be urged outward from the pressure chambers 3252a, 3252b. As the piston ends are urged outward, the pistons urge a rotary piston assembly, such as the rotary piston assembly 200, to rotate.

In some embodiments, the modular piston housings 3250a, 3250b may include the central longitudinal cavity 3212 and other features of the housing 3210. In some embodiments, the modular piston housings 3250a, 3250b may be removably affixed to each other. For example, the modular piston housings 3250a, 3250b may be bolted, screwed, clamped, welded, pinned, or otherwise directly or indirectly retained relative to each other such that the assembled combination provides the features of the housing 3210, eliminating the need for the housing 3210.

Figure 33A:
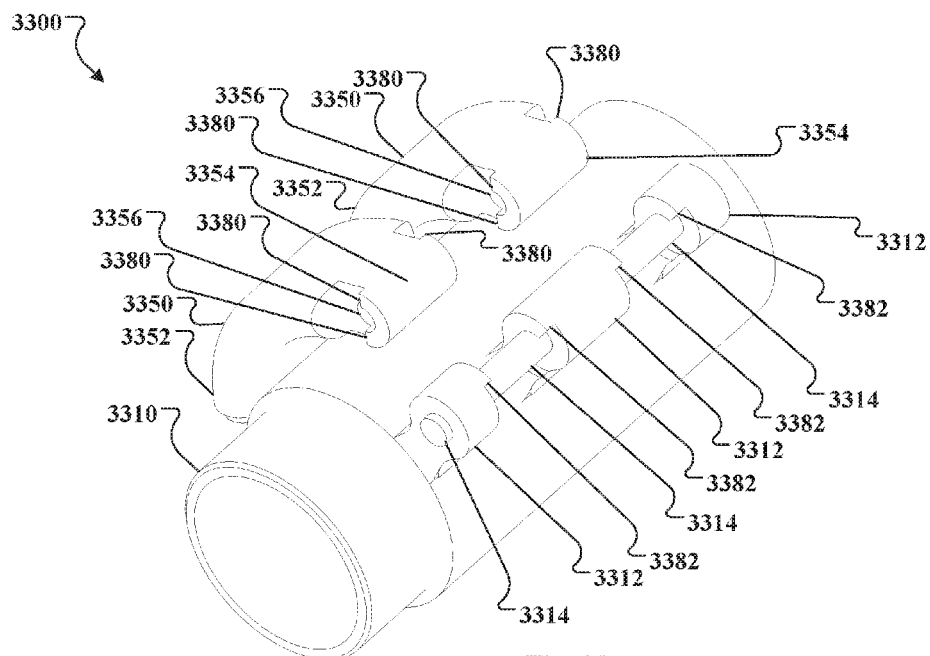
FIGS. 33A-33C are exploded and assembled perspective views of another example rotary piston assembly.
Figure 33B:
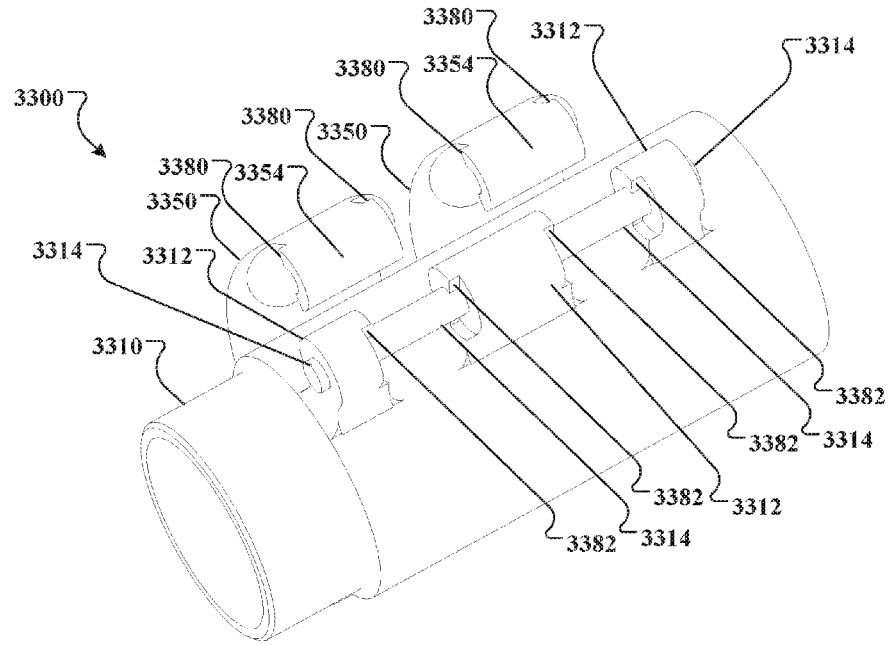
Figure 33C:
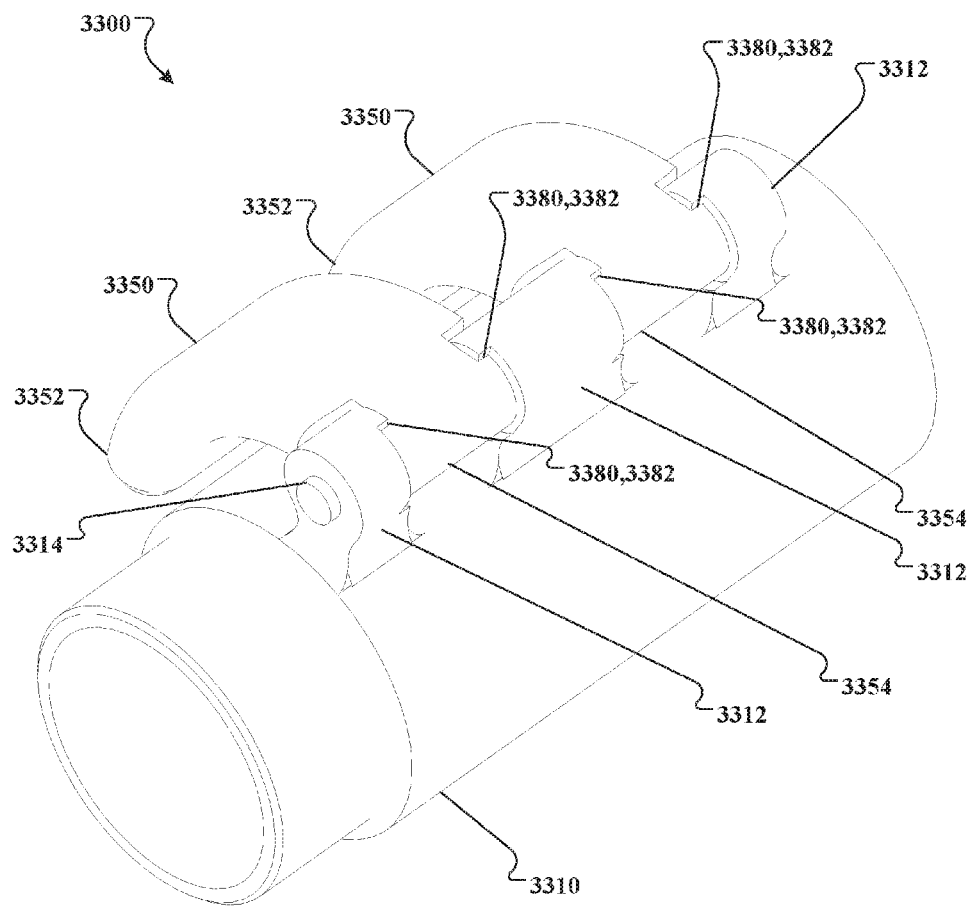

FIGS. 33A-33C are exploded and assembled perspective views of another example rotary piston assembly 3300. In some embodiments, features of the rotary piston assembly 3300 can be used with any of the rotary piston assemblies 200, 700, 1100, 1501, 1701, and 2700, and/or with any of the actuators 400, 800, 1200, 1500, 1750, 1900, 2200, 2300, 2600, 2900, and 3000. The rotary piston assembly 3300 includes a rotor shaft 3310. A plurality of rotor arms 3312 extend radially from the rotor shaft 3310, the distal end of each rotor arm 3312 including a bore (not shown) substantially aligned (e.g., +/−2 degrees) with the axis of the rotor shaft 3310 and sized to accommodate one of a collection of connector pins 3314.

The example rotary piston assembly 3300 includes a pair of rotary pistons 3350. While the example rotary piston assembly 3300 includes two of the rotary pistons 3350, other embodiments can include greater and/or lesser numbers of cooperative and opposing rotary pistons. Each of the rotary pistons 3350 includes a piston end 3352 and one or more connector arms 3354. The piston end 3352 is formed to have a generally semi-circular body having a substantially smooth surface (e.g., a surface quality that can form a fluid barrier when in contact with a seal). Each of the connector arms 3354 includes a bore 3356 substantially aligned (e.g., +/−2 degrees) with the axis of the semi-circular body of the piston end 3352 and sized to accommodate one of the connector pins 3314.

Each of the rotary pistons 3350 of the example rotary piston assembly 3300 may be assembled to the rotor shaft 3310 by aligning the connector arms 3354 with the rotor arms 3312 such that the bores (not shown) of the rotor arms 3312 align with the bores 3365. The connector pins 3314 may then be inserted through the aligned bores to create connections between the pistons 3350 and the rotor shaft 3310. As shown, each connector pin 3314 is slightly longer than the aligned bores. In the example assembly, about the circumferential periphery of each end of each connector pin 3314 that extends beyond the aligned bores is a circumferential recess (not shown) that can accommodate a retaining fastener (not shown), e.g., a snap ring or spiral ring.

The connections between the connector arms 3354 with the rotor arms 3312, unlike embodiments such as the rotary piston assembly 200, are not hinged. The connector arms 3312 include retainer elements 3380, and the rotor arms 3312 include retainer elements 3382. When the assembly 3300 is in its assembled form, the retainer elements 3380, 3382 are intermeshed relative to the rotary motion of the pistons 3350 and the rotor shaft 3310. In some embodiments, the retainer elements 3380, 3382 can be formed with radial geometries that prevent rotation of the rotary pistons 3350 away from the radius of curvature of the rotary pistons 3350.

In the exemplary embodiment, contact among the retainer elements 3380, 3382 permits rotary movement to be transmitted between the rotor shaft 3310 and the rotary pistons 3350. Movement of the pistons 3350 urges motion of the rotor arms 3312 and the rotor shaft 3310 through contact among the retainer elements 3380, 3382. Likewise, movement of the rotor shaft 3310 and the rotor arms 3312 urges motion of the pistons 3350 through contact among the retainer elements 3380, 3382. In some embodiments, the retainer elements 3380, 3382 can be connected by one or more fasteners that prevent rotation of the rotary pistons 3350 away from the radius of curvature of the rotary pistons 3350. For example, the retainer elements 3380, 3382 can be connected by bolts, screws, clamps, welds, adhesives, or any other appropriate form of connector or fastener.

In the example rotary piston assembly 3300, contact among the retainer elements 3380, 3382 permits rotary movement to be transmitted between the rotor shaft 3310 and the rotary pistons 3350 even if the connector pin 3314 becomes broken or is missing. In some embodiments, the connector pin 3314 may be longitudinally constrained by a piston housing (not shown). For example, the connector pin 3314 may break at some point along its length, but the housing may be formed such that the ends of the connector pin 3314 may not have sufficient room to permit a broken section of the connector pin 3314 to move far enough longitudinally to become disengaged from the bores 3356. In some embodiments such as this, the retainer elements 3380, 3382 and/or the housing can provide a fail-safe construction that can prevent broken pieces of the connector pin 3314 from becoming dislodged from their normal locations, which can present a risk of if such broken pieces were to become jammed within components of a rotary actuator in which the rotary piston assembly 3300 may be used.

In some embodiments, the connector pin 3314 and the bores 3356 and the bores (not shown) of the rotor arms 3312 can be formed with cross-sectional geometries that prevent rotation of the connector pin 3314 within the bores 3356 and the bores (not shown) of the rotor arms 3312 around the longitudinal axis of the connector pin 3314. For example, the connector pin 3314 can be a "locking pin" formed with a square, rectangular, triangular, hex, star, oval, or any other appropriate non-circular cross-section, and the bores 3356 and the bores (not shown) of the rotor arms 3312 are formed with corresponding cross-sections, such that the connector pin 3314 can be inserted when the bores are aligned and the pistons 3350 are substantially prevented from rotating (e.g., less than 5 degrees of rotation) about the axis of the connector pin 3314 when the connector pin 3314 is inserted within the bores.

In some embodiments, the retainer elements 3380, 3382 and/or the "locking pin" embodiment of the connector pin 3314 can affect the performance of the rotary piston assembly 3300. For example, embodiments of the rotary piston assembly 3300 implementing the retainer elements 3380, 3382 and/or the "locking pin" embodiment of the connector pin 3314, can reduce or prevent relative movement between the pistons 3350 and the rotor arms 3312 as the rotary piston assembly 3300 moves within a rotary piston actuator, which can provide substantially constant torque (e.g., less than 10% variance) over a relatively full range of motion of the assembly 3300.

Figure 34A:
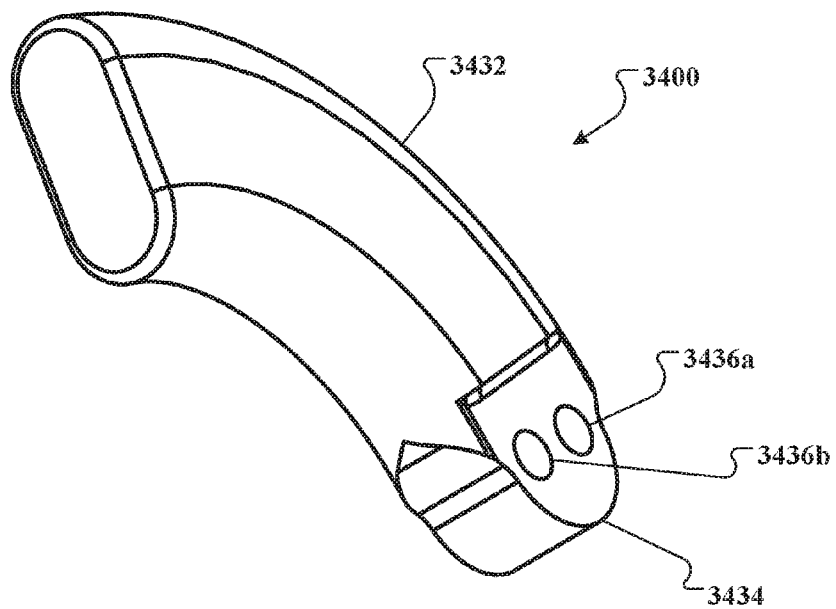
FIGS. 34A and 34B are perspective views of another example rotary piston.
Figure 34B:
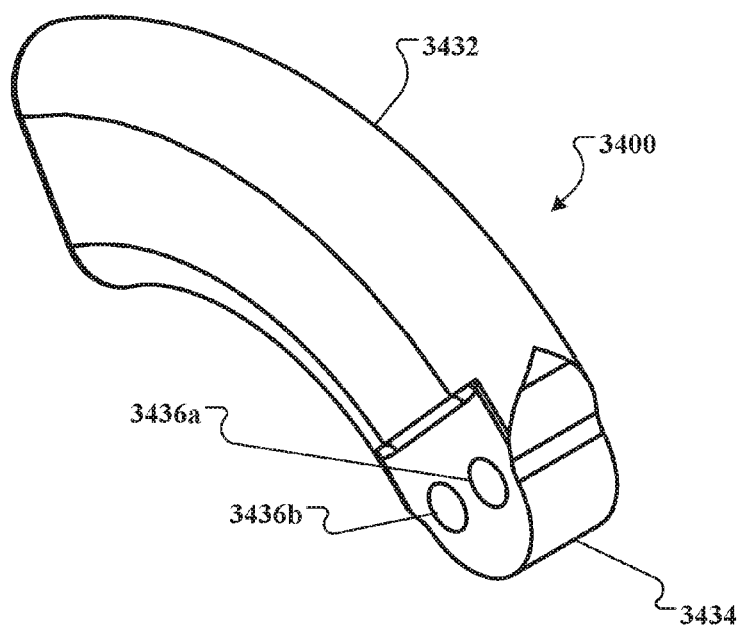

FIGS. 34A and 34B are perspective views of another example rotary piston 3400. In some embodiments, the rotary piston 3400 can be the rotary piston 3350 of FIGS. 33A-33C. In some embodiments, features of the rotary piston 3400 can be used with any of the rotary piston assemblies 200, 700, 1100, 1501, 1701, and 2700, and/or with any of the actuators 400, 800, 1200, 1500, 1750, 1900, 2200, 2300, 2600, 2900, 3000, 3200 and 3300.

As shown in the example rotary piston of FIGS. 34A-34B, the rotary piston 3400 includes a piston end 3432 and one or more connector arms 3434. The piston end 3432 is formed to have a generally elliptical body having a substantially smooth surface (e.g., a surface quality that can form a fluid barrier when in contact with a seal). Each of the connector arms 3434 includes a bore 3436a and a bore 3436b substantially aligned (e.g., +/−2 degrees) with the axis of the elliptical body of the piston end 3432 and sized to accommodate a connector pin such as one of the connector pins 3314. Other embodiments may include more than two bores in a rotary piston. In other embodiments, the piston end 3432 is formed to have a generally rectangular body, or a body having any other appropriate cross-section.

In some embodiments, the "multiple pin" embodiment of the rotary piston 3400 can affect the performance of a rotary piston assembly. For example, embodiments of rotary piston assemblies implementing the rotary piston 3400, two locking pins, and a correspondingly formed rotor arm can reduce or prevent relative movement between the piston 3400 and the rotor arms as the rotary piston assembly moves within a rotary piston actuator, which can provide substantially constant torque (e.g., less than 10% variance) over a relatively full range of motion of the assembly.

In some embodiments, one or more of the bores 3436a, 3436b can be formed with cross-sectional geometries that prevent rotation of a connector pin, such as the connector pin 3314, within the bores 3436a, 3436b around the longitudinal axis of the connector pin. For example, one or more of the bores 3436a, 3436b can be formed with square, rectangular, triangular, hex, star, oval, or any other appropriate non-circular cross-sections, such that correspondingly configured connector pins can be inserted to substantially prevent the rotary piston 3400 from rotating about the axes of the bores 3436a, 3436b when the connector pins are inserted within the bores 3436a, 3436b (e.g., prevent rotation of greater than 5 degrees).

Figure 35A:
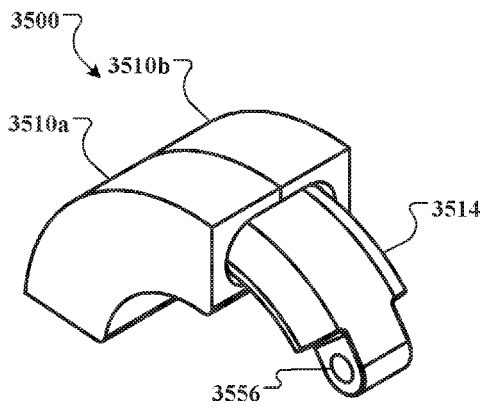
FIG. 35A is a perspective view of another example pressure chamber assembly.
Figure 35B:
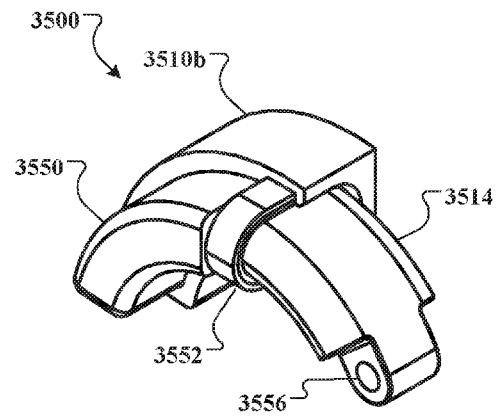
FIG. 35B is a perspective partial cutaway view of the example pressure chamber assembly of FIG. 35A.
Figure 35C:
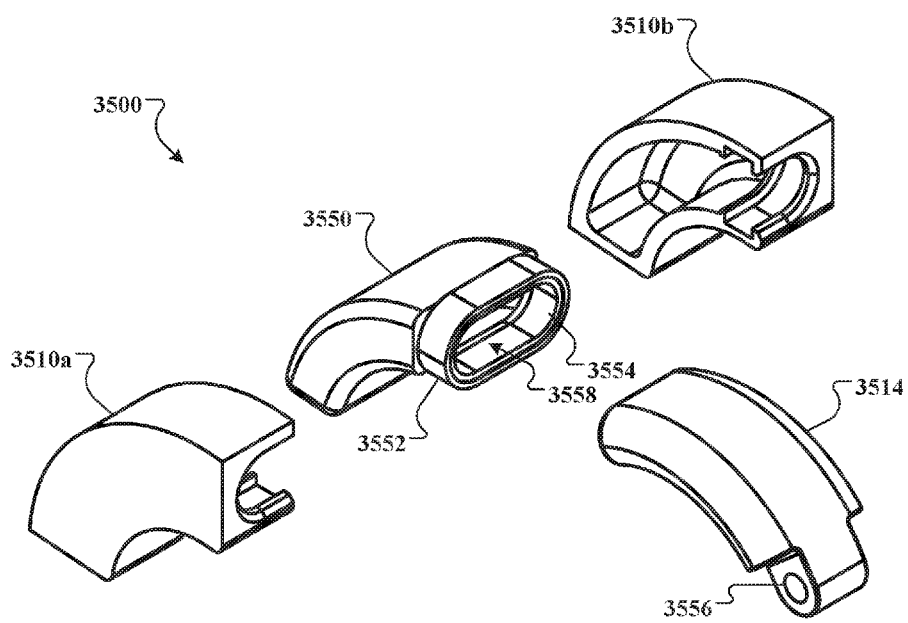
FIG. 35C is a perspective exploded view of the example pressure chamber assembly of FIG. 35A.

FIG. 35A is a perspective view of another example pressure chamber assembly 3500. FIG. 35B is a perspective partial cutaway view of the example pressure chamber assembly 3500. FIG. 35C is a perspective exploded view of the example pressure chamber assembly 3500. In some embodiments, features of the pressure chamber assembly 3500 can be used with any of the rotary piston assemblies 200, 700, 1100, 1501, 1701, and 2700, the rotary piston 3400, and/or with any of the actuators 400, 800, 1200, 1500, 1750, 1900, 2200, 2300, 2600, 2900, 3000, 3200 and 3300. As shown in FIG. 35C, the pressure chamber assembly 3500 includes a piston housing 3550, a modular housing 3510a, and a modular housing 3510b. The modular housing 3510a includes an arcuate central recess 3512a, and the modular housing 3510b includes an arcuate central recess 3512b. In their assembled form, the arcuate central recesses 3512a and 3512b accommodate the piston housing 3550.

As shown in FIG. 35C, the piston housing 3550 is formed to accommodate a rotary piston 3514 in a cavity 3558. The piston housing 3550 includes a collar 3552. The collar 3552 is formed to hold a seal 3554 in sealing contact with the rotary piston 3514. In some embodiments, the rotary piston can be any of the rotary pistons 260, 414, 712, 812, 822, 1216, 1520a, 1520b, 1720, 1930, 2222, 2400, 2754, 3350, and 3400. In some implementations, the pressure chamber 3550 can be formed as a unitary piston housing. For example, pressure chamber 3550 may be machined, extruded, hydro formed, or otherwise formed without forming seams within the pressure chambers 3550.

The example rotary piston 3514 includes a bore 3556. In some embodiments, the bore 3356 can be formed with a cross-sectional geometry that prevents rotation of a connector pin, such as the connector pin 3314 of FIGS. 33A-33C, within the bore 3556 and the bores (not shown) of a rotor arm, such as the rotor arms 3312 around the longitudinal axis of the connector pin. For example, the bore 3356 can be formed to accommodate a "locking pin" formed with a square, rectangular, triangular, hex, star, oval, or any other appropriate non-circular cross-section, such that the connector pin can be inserted through the bore 3556 and are substantially prevented from rotating about the axis of the bore 3556 when the connector pin is inserted within the bore 3556 (e.g., prevent rotation greater than 5 degrees).

In some embodiments, the rotary piston 3514 can include retainer elements. For example, the rotary piston 3514 can include the retainer elements 3380 (for example, as shown in FIGS. 33A-C) that can intermesh with the retainer elements 3382 to prevent rotation of the rotary piston 3550 away from the radius of curvature of the rotary pistons 3550.

Figure 36:
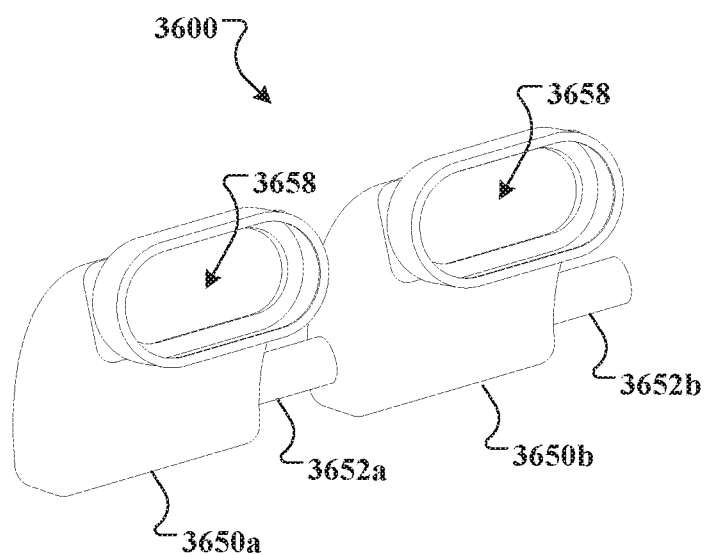
FIG. 36 is a perspective view of an example piston housing assembly.

FIG. 36 is a perspective view of an example piston housing assembly 3600. The assembly 3600 includes a piston housing 3650a and a piston housing 3650b. The piston housings 3650a-3650b each includes a cavity 3658. In some embodiments, the piston housings 3650a-3650b can be used in place or in addition to the piston housing 3550 of the example pressure chamber assembly 3500 of FIGS. 35A-35C. For example, the piston housings 3650a-3650b can be enclosed by modular housings such as the modular housings 3510a and 3510b.

The assembly 3600 includes a collection of fluid ports 3652a and 3652b. The fluid ports 3652a-3652b are in fluid communication with the cavities 3658 and or fluid supply lines (not shown). In some embodiments, the fluid ports 3652 can flow fluid among the piston housings 3650a-3650b. For example, fluid may be applied to pressurize the piston housings 3650a, and the fluid will flow through the fluid port 3652a to pressurize the piston housings 3650b as well. In some embodiments, any appropriate number of piston housings, such as the piston housings 3650a-3650b, and fluid ports, such as the fluid ports 3652, can be assembled in an alternating daisy-chain arrangement to form the assembly 3600.

Figure 37:
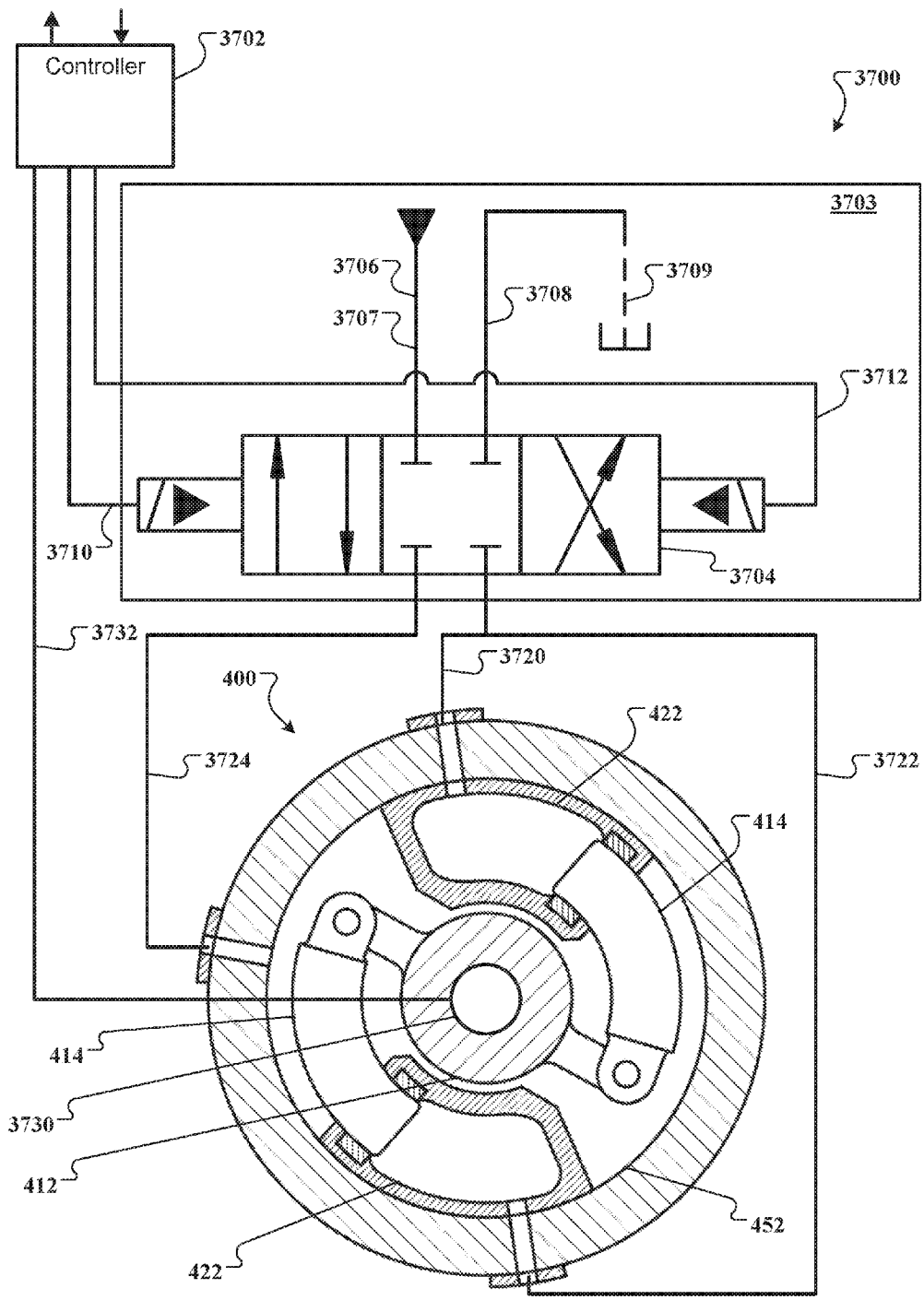
FIG. 37 is a schematic of an example rotary piston-type actuator system.

FIG. 37 is a schematic of an example rotary piston-type actuator system 3700. The system 3700 includes the rotary piston-type actuator 400 of FIG. 4. In some embodiments, the actuator 400 may be replaced in the system 3700 by any of the rotary piston assemblies 200, 700, 1100, 1501, 1701, 2700, and 3500, the rotary piston 3400, and/or with any of the actuators 800, 1200, 1500, 1750, 1900, 2200, 2300, 2600, 2900, 3000, 3200 and 3300. The system 3700 also includes a controller 3702, and a fluid pressure assembly 3703. The fluid pressure assembly 3703 includes a servo valve 3704, a fluid pressure source 3706, and a drain 3709.

In some embodiments, the fluid pressure source 3706 can be a central fluid pressure source 3706 fluidly connected to the servo valve 3704 by a high pressure fluid line 3707. In some embodiments, the drain 3709 can be a central drain or fluid return reservoir fluidly connected to the servo valve 3704 by a low pressure fluid line 3708. For example, the fluid pressure source 3706 can be a fluid pressure pump that provides fluid pressure for multiple fluid-operated devices, such as the actuator 400. In some embodiments, the fluid pressure source 3706 can be a central hydraulic or pneumatic pressure system of an aircraft. In some embodiments, the system 3700 can be used to actuate a flight control surface or other apparatus in an aircraft.

The controller 3702 is fluidly connected to the servo valve 3704 by a fluid line 3710 and a fluid line 3712. The controller 3702 is configured to selectively apply fluid pressure to the fluid lines 3710 and 3712 to actuate the servo valve 3704. The servo valve 3704 is fluidly connected to the fluid chambers 422 and the bore 452 by a fluid line 3720, a fluid line 3722, and a fluid line 3724. The servo valve 3704 is configured to selectively and reversibly connect the fluid pressure source 3706 and the drain 3708 to the fluid chambers 422 and the bore 452.

The system 3700 includes a rotary position sensor assembly 3730. The rotary position sensor assembly 3730 is mechanically coupled to the actuator 400 to provide a signal representative of the position, speed, direction of rotation, and/or acceleration of the rotor shaft 412. In some embodiments, the position sensor assembly 3730 is a position limit sensor configured to detect when the rotor shaft 412 has moved to a predetermined position. The signal is provided to the controller 3702 over a conductor 3732, such as a wire or an optical fiber. In some embodiments, the controller 3702 can use the signal from the position sensor assembly 3730 to form a feedback loop for controlling the position of the rotor shaft 412.

Figure 38:
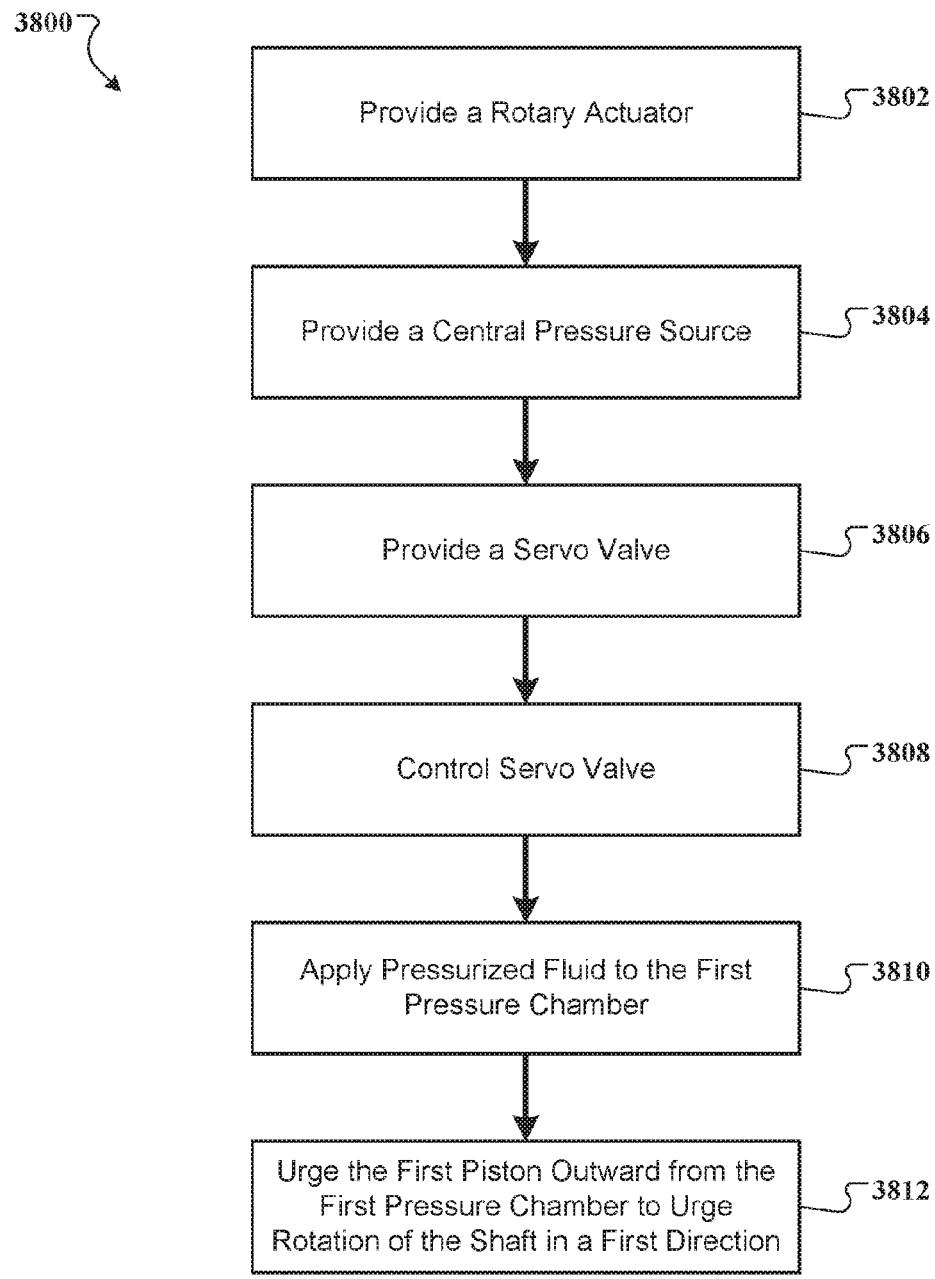
FIG. 38 is a flow diagram of an example process for using the example rotary piston-type actuator system of FIG. 37.

FIG. 38 is a flow diagram of an example process 3800 for using the example rotary piston-type actuator system 3700 of FIG. 37. At 3802, a rotary actuator is provided. The rotary actuator includes a first housing defining a first arcuate chamber having a first cavity, a first fluid port in fluid communication with the first cavity, and an open end, a rotor assembly rotatably journaled in said first housing and having a rotary output shaft and a first rotor arm extending radially outward from the rotary output shaft, and an arcuate-shaped first piston disposed in said first housing for reciprocal movement in the first arcuate chamber through the open end. A first seal, the first cavity, and the first piston define a first pressure chamber, and a first portion of the first piston contacts the first rotor arm. The actuator also includes a first fluid line coupled to the first fluid port, a high pressure fluid line, and a low pressure fluid line. For example, the rotary piston-type actuator 400 can be provided.

At 3804 a central pressure source is provided. The central pressure source is coupled to the high pressure fluid line. For example, the fluid pressure source 3706 is fluidly connected to the servo valve 3704 by the high pressure fluid line 3707, and the drain 3709 is fluidly connected to the servo valve 3704 by the low pressure fluid line 3708.

At 3806, a servo valve is provided. The servo valve is positioned between the central pressure source and the hydraulic actuator. For example, the servo valve 3704 is positioned along a fluid path connecting the pressure source 3706 and the actuator 400.

At 3808, the servo valve is controlled to selectively connect the first fluid line to the high pressure fluid line and the low pressure fluid line. For example, the servo valve 3704 can be controlled by the controller 3702 to selectively connect the fluid lines 3707 and 3708 to the fluid lines 3720, 3722, and/or 3724.

At 3810 pressurized fluid is applied to the first pressure chamber. For example, the servo valve 3704 can be controlled by the controller 3702 to adjustably and reversibly apply fluid pressure from the pressure source 3706 to the fluid chamber 422. In some embodiments, the servo valve 3704 can be controlled to adjustably and reversibly apply fluid pressure from the pressure source 3706 to the bore 452.

At 3812, the first piston is urged partially outward from the first pressure chamber to urge rotation of the rotary output shaft in a first direction. For example, fluid pressure in the fluid chambers 422 urges the pistons 414 partially outward from the fluid chambers 422. The outward motion of the pistons 414 urges rotation of the rotor shaft 412.

In some embodiments, the housing can include a second arcuate chamber having a second cavity, and a second fluid port in fluid communication with the second cavity, wherein the rotor assembly further comprises a second rotor arm. The rotary actuator can also include an arcuate-shaped second piston positioned in the housing for reciprocal movement in the second arcuate chamber. A second seal, the second cavity, and the second piston can define a second pressure chamber, and a first portion of the second piston can contact the second rotor arm. A second fluid line can be coupled to the second fluid port, and the servo valve can be controllable to selectively connect the second fluid line to the high pressure fluid line and the low pressure fluid line to control movement of the hydraulic actuator. In some implementations, the process 3800 can also include controlling the servo valve to selectively connect the second fluid line to the high pressure fluid line and the low pressure fluid line to apply pressurized fluid to the second pressure chamber, and urging the second piston partially outward from the second pressure chamber.

In some embodiments, a controller can be coupled to control the servo valve, and controlling the servo valve can include controlling, by the controller, the servo valve to selectively connect the first fluid line to the high pressure fluid line and the low pressure fluid line to apply pressurized fluid to the first pressure chamber. For example, the controller 3702 can control the servo valve 3704 to connect the pressure source 3706 and the drain 3709 to the fluid chambers 422 and/or the bore 452.

In some embodiments, a position sensor (e.g., the position sensor assembly 3730) can be provided and configured to provide a position feedback signal indicative of a position of the rotary actuator. A position feedback signal from the position sensor can be provided to the controller to control the servo valve, and the controller can control the servo valve to selectively connect the first fluid line to the high pressure fluid line and the low pressure fluid line to apply pressurized fluid to the first pressure chamber based on the position feedback signal. In some embodiments, the position sensor can be coupled to the rotary output shaft, and the position feedback signal can be a rotary position feedback signal. In some embodiments, the position sensor can be a position limit sensor, and the position feedback signal can be a position limit signal. In some implementations, the process 3800 can include urging rotation of the rotary output shaft to control at least one of the group consisting of rotary output shaft speed, rotary output shaft position, rotary output shaft torque, and rotary output shaft acceleration.

In some embodiments, the process 3800 can be used with an actuator having a central actuation assembly, such as the assembly 2900 of FIGS. 29A-29E or the assembly 3000 of FIGS. 30A-30E.

Figure 39:
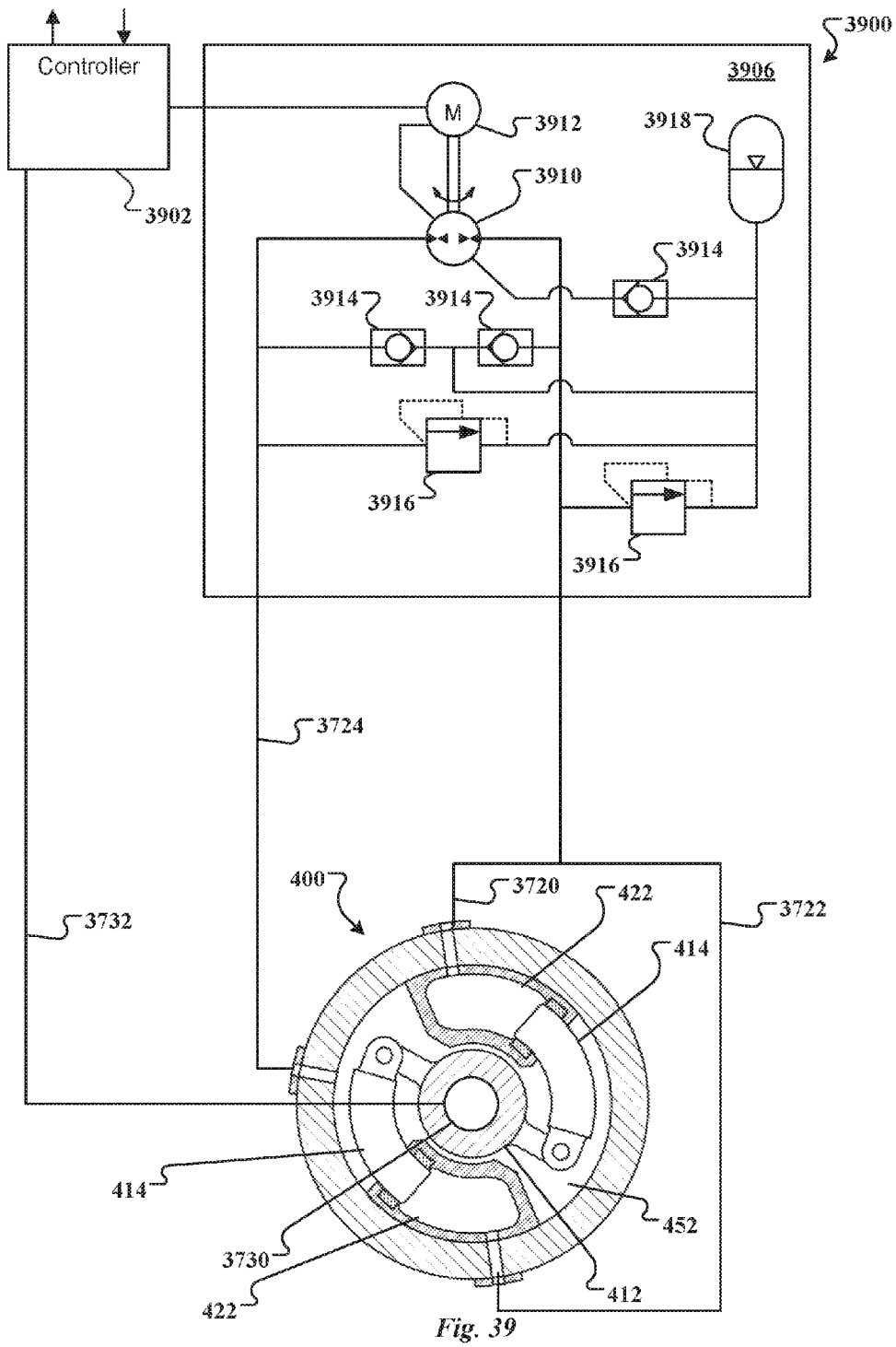
FIG. 39 is a schematic of another example rotary piston-type actuator system.

FIG. 39 is a schematic of another example rotary piston-type actuator system. The system 3700 includes the rotary piston-type actuator 400 of FIG. 4. In some embodiments, the actuator 400 may be replaced in the system 3900 by any of the rotary piston assemblies 200, 700, 1100, 1501, 1701, 2700, and 3500, the rotary piston 3400, and/or with any of the actuators 800, 1200, 1500, 1750, 1900, 2200, 2300, 2600, 2900, 3000, 3200 and 3300. The system 3900 also includes a controller 3902 and a fluid pressure source 3906.

The fluid pressure source 3906 includes a fluid pump 3910 driven by a motor 3912, which is controlled by the controller 3902. The pump 3910 drives fluid unidirectionally or bidirectionally to and/or from the fluid chambers 422 and the bore 452 through the fluid lines 3720-3724 to cause actuation of the rotor shaft 412. A collection of check valves 3914, relief valves 3916, and a fluid reservoir 3918 are also interconnected between the fluid lines 3720-3724 to maintain and protect the integrity of the fluid circuit formed within the fluid pressure source 3906.

In some embodiments, the fluid pressure source 3906 can be a local fluid pressure source fluidly connected to the assembly 400. For example, the fluid pressure source 3906 can be a fluid pressure pump that provides fluid pressure for a single fluid-operated device, such as the actuator 400. In some embodiments, the fluid pressure source 3906 can be a local (e.g., point of use) hydraulic or pneumatic pressure system of an aircraft. In some embodiments, the system 3900 can be used to actuate a flight control surface or other apparatus in an aircraft.

The system 3900 includes the rotary position sensor assembly 3730. Signals from the position sensor assembly 3730 are provided to the controller 3902 over a conductor 3732 such as a wire or an optical fiber. In some embodiments, the controller 3902 can use the signal from the position sensor assembly 3730 to form a feedback loop for controlling the position of the rotor shaft 412.

Figure 40:
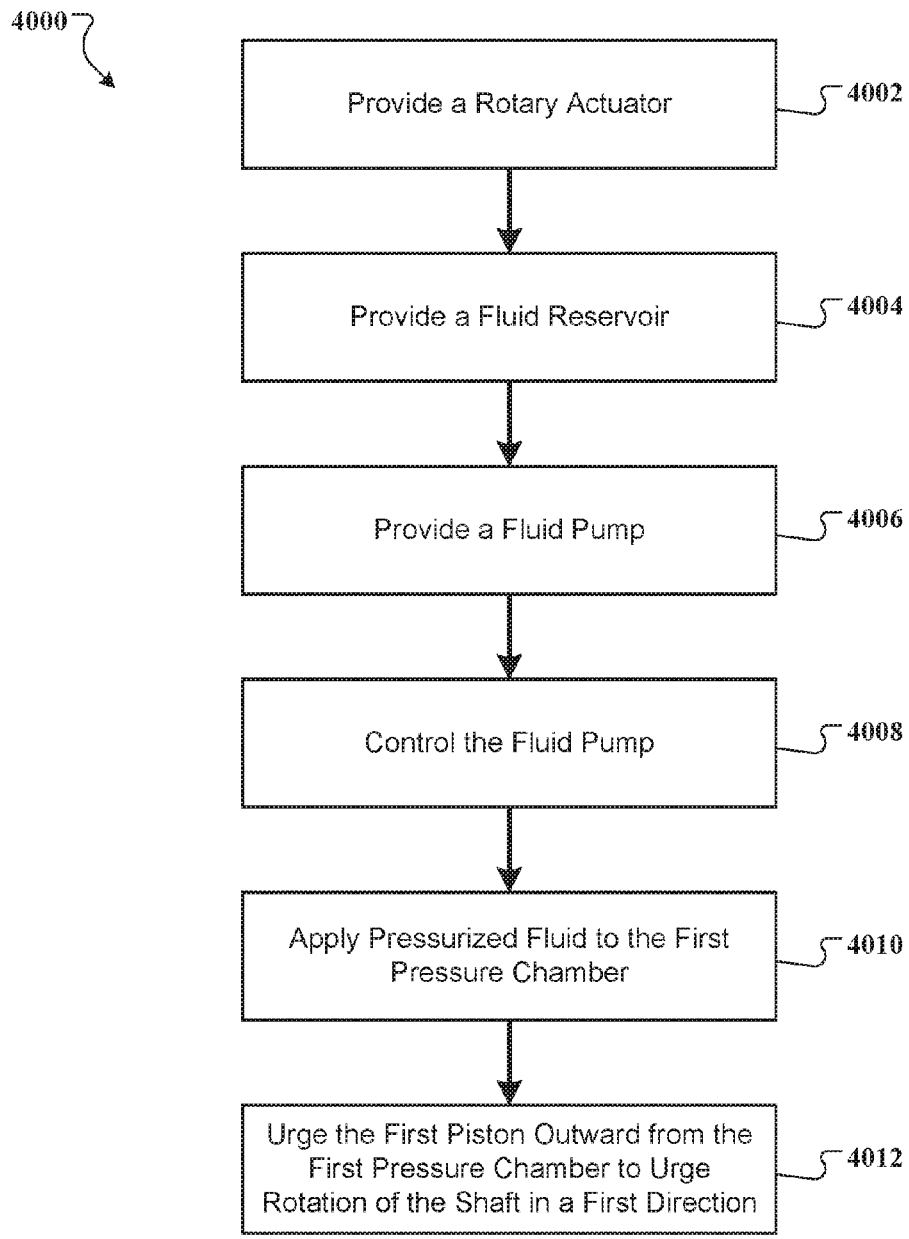
FIG. 40 is a flow diagram of an example process for using the example rotary piston-type actuator system of FIG. 39.

FIG. 40 is a flow diagram of an example process 4000 for using the example rotary piston-type actuator system 3900 of FIG. 39. At 4002, a rotary actuator is provided. The rotary actuator includes a first housing defining a first arcuate chamber having a first cavity, a first fluid port in fluid communication with the first cavity, and an open end, a rotor assembly rotatably journaled in said first housing and having a rotary output shaft and a first rotor arm extending radially outward from the rotary output shaft, and an arcuate-shaped first piston disposed in said first housing for reciprocal movement in the first arcuate chamber through the open end. A first seal, the first cavity, and the first piston define a first pressure chamber, and a first portion of the first piston contacts the first rotor arm. The actuator also includes a first fluid line coupled to the first fluid port, a high pressure fluid line, and a low pressure fluid line. For example, the rotary piston-type actuator 400 can be provided.

At 4004, a fluid reservoir is provided. At 4006, a fluid pump coupled to the fluid reservoir is provided. For example, the fluid reservoir 3918 and the fluid pump 3910 are provided.

At 4008 the fluid pump is controlled, and at 4010 high pressure is selectively provided to the first fluid line to apply pressurized fluid to the first pressure chamber. For example, the controller 3902 can activate the motor 3912 and drive the fluid pump 3910 to provide high pressure to one or more of the fluid lines 3720-3724, which in turn provide the pressurized fluid or one or more of the fluid chambers 422 and/or the bore 452.

At 4012, the first piston is urged partially outward from the first pressure chamber to urge rotation of the rotary output shaft in a first direction. For example, fluid pressure in the fluid chambers 422 urges the pistons 414 partially outward from the fluid chambers 422. The outward motion of the pistons 414 urges rotation of the rotor shaft 412.

In some embodiments, the housing can include a second arcuate chamber having a second cavity, and a second fluid port in fluid communication with the second cavity, wherein the rotor assembly further comprises a second rotor arm. The rotary actuator can also include an arcuate-shaped second piston positioned in the housing for reciprocal movement in the second arcuate chamber. A second seal, the second cavity, and the second piston can define a second pressure chamber, and a first portion of the second piston can contact the second rotor arm. For example the assembly 400 includes two of the pistons 414 and two of the fluid chambers 422. A second fluid line can be coupled to the second fluid port. In some implementations, the process 3900 can also include controlling the fluid pump to selectively provide high pressure to the second fluid line to apply pressurized fluid to the second pressure chamber, and urging the second piston partially outward from the second pressure chamber. For example, high pressure fluid can be applied to a second one of the fluid chambers 422 to urge a second one of the pistons 414 to move outward. In some embodiments, the fluid pump can provide high pressure to the bore 452 to urge the pistons 414 into the fluid chambers 422.

In some embodiments, a controller can be coupled to control the fluid pump, and controlling the fluid pump can include controlling, by the controller, the fluid pump to selectively apply pressurized fluid to the first pressure chamber. For example, the controller 3902 can control the motor 3912 to selectively pressurize the fluid chambers 422 and/or the bore 452.

In some embodiments, a position sensor (e.g., the position sensor assembly 3730) can be provided and configured to provide a position feedback signal indicative of a position of the rotary actuator. A position feedback signal from the position sensor can be provided to the controller to control the servo valve, and the controller can control the servo valve to selectively connect the first fluid line to the high pressure fluid line and the low pressure fluid line to apply pressurized fluid to the first pressure chamber based on the position feedback signal. In some embodiments, the position sensor can be coupled to the rotary output shaft, and the position feedback signal can be a rotary position feedback signal. In some embodiments, the position sensor can be a position limit sensor, and the position feedback signal can be a position limit signal. In some implementations, the process 3900 can include urging rotation of the rotary output shaft to control at least one of the group consisting of rotary output shaft speed, rotary output shaft position, rotary output shaft torque, and rotary output shaft acceleration.

In some embodiments, the process 3900 can be used with an actuator having a central actuation assembly, such as the assembly 2900 of FIGS. 29A-29E or the assembly 3000 of FIGS. 30A-30E, which may be the central actuation assembly of an aircraft.

Figure 41:
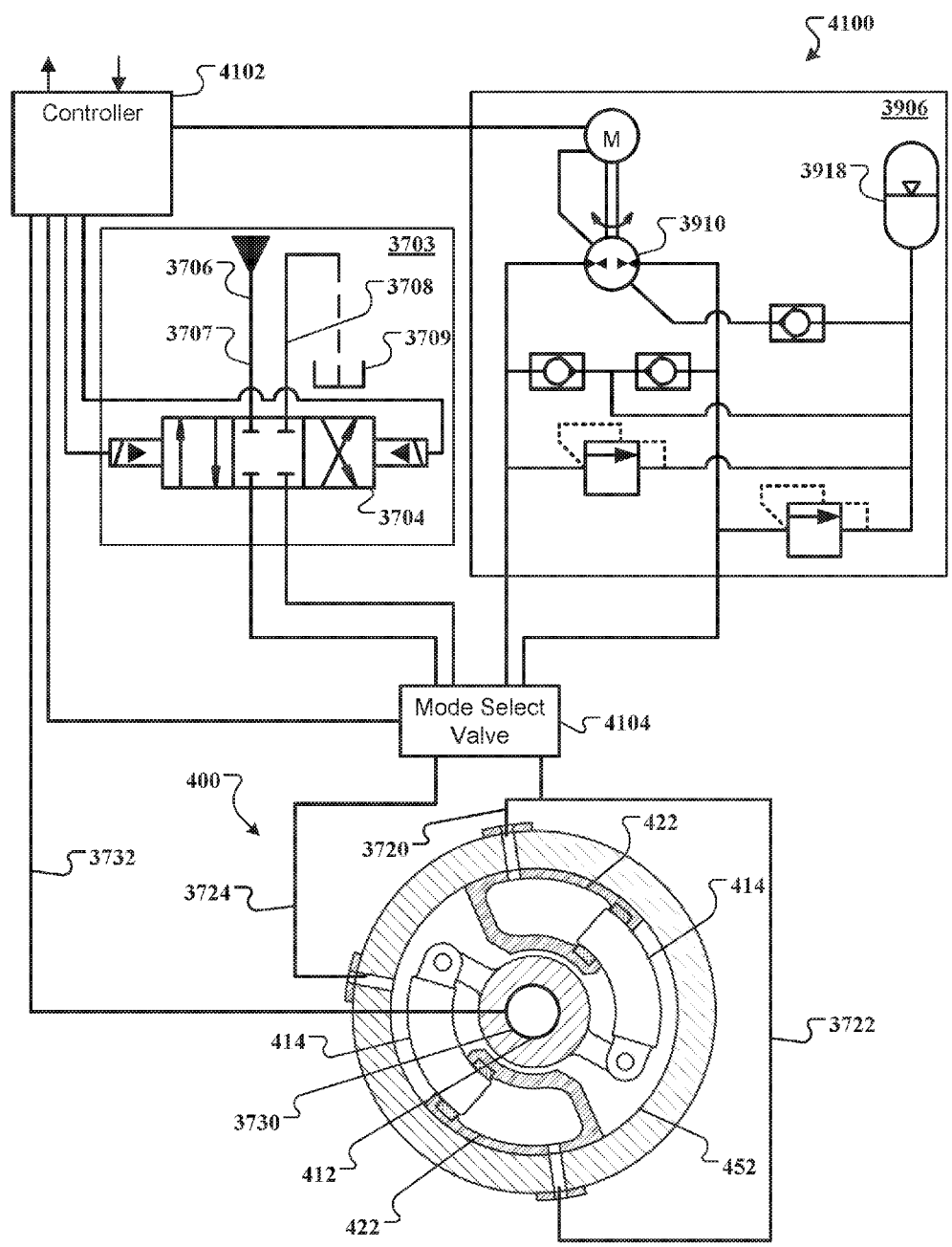
FIG. 41 is a schematic of another example rotary piston-type actuator system.

FIG. 41 is a schematic of another example rotary piston-type actuator system 4100. The system 4100 includes the rotary piston-type actuator 400 of FIG. 4. In some embodiments, the actuator 400 may be replaced in the system 4100 by any of the rotary piston assemblies 200, 700, 1100, 1501, 1701, 2700, and 3500, the rotary piston 3400, and/or with any of the actuators 800, 1200, 1500, 1750, 1900, 2200, 2300, 2600, 2900, 3000, 3200 and 3300. The system 4100 also includes a controller 4102, the fluid pressure assembly 3703, the fluid pressure source 3906, and a mode select valve 4104.

The fluid pressure assembly 3703 and the fluid pressure source 3906 are each controllably connected to the controller 4102. The mode select valve 4104 is controllably linked to the controller 4102, and the controller 4102 is configured to actuate the mode select valve 4104 to selectably and fluidly connect the fluid pressure assembly 3703 and the fluid pressure source 3906 to the fluid lines 3720-3724. The controller 4102 controls the mode select valve 4104 and the selected one of the fluid pressure assembly 3703 and the fluid pressure source 3906 to actuate the actuator 400.

In some embodiments, the system 4100 can be used to provide redundant control of an actuator. For example, the actuator 400 can be operated using fluid pressure provided by the fluid pressure assembly 3703 (e.g., a central hydraulic pressure system in an aircraft), but in the event of a malfunction in the fluid pressure assembly 3703 the controller 4102 can actuate the mode select valve 4104 to cause the actuator 400 to be operated using fluid pressure provided by the fluid pressure source 3906 (e.g., a local hydraulic pressure system located near the actuator 400 in an aircraft).

The system 4100 includes the rotary position sensor assembly 3730. Signals from the position sensor assembly 3730 are provided to the controller 3902 over the conductor 3732 such as a wire or an optical fiber. In some embodiments, the controller 4102 can use the signal from the position sensor assembly 3730 to form a feedback loop for controlling the position of the rotor shaft 412. In some embodiments, the system 4100 can be used to actuate a flight control surface or other apparatus in an aircraft.

Figure 42:
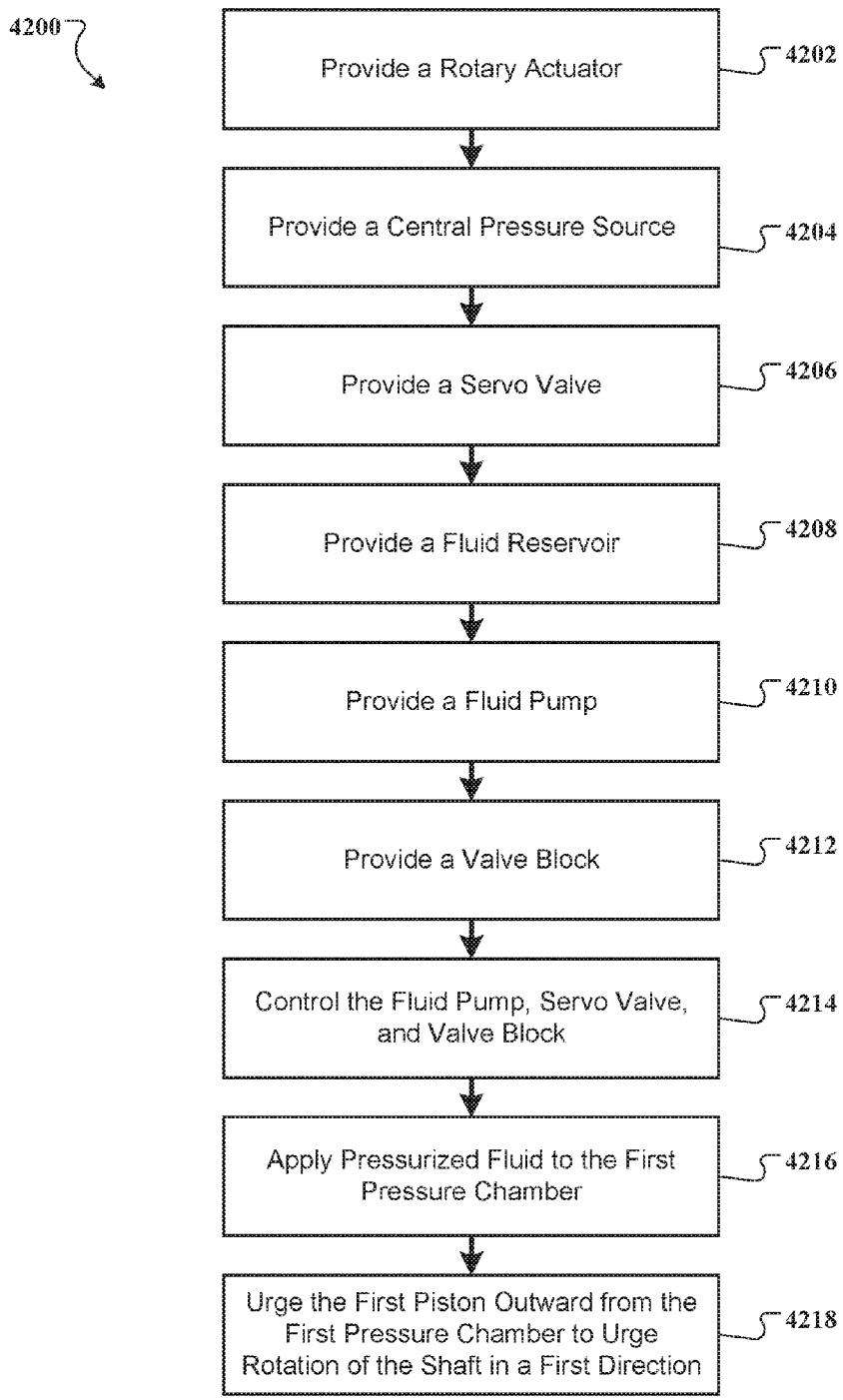
FIG. 42 is a flow diagram of an example process for using the example rotary piston-type actuator system of FIG. 41.

FIG. 42 is a flow diagram of an example process 4200 for using the example rotary piston-type actuator system 4100 of FIG. 41. At 4202, a rotary actuator is provided. The rotary actuator includes a first housing defining a first arcuate chamber having a first cavity, a first fluid port in fluid communication with the first cavity, and an open end, a rotor assembly rotatably journaled in said first housing and having a rotary output shaft and a first rotor arm extending radially outward from the rotary output shaft, and an arcuate-shaped first piston disposed in said first housing for reciprocal movement in the first arcuate chamber through the open end. A first seal, the first cavity, and the first piston define a first pressure chamber, and a first portion of the first piston contacts the first rotor arm. The actuator also includes a first fluid line coupled to the first fluid port, a high pressure fluid line, and a low pressure fluid line. For example, the rotary piston-type actuator 400 can be provided.

At 4204 a central pressure source is provided. The central pressure source is coupled to the high pressure fluid line. For example, the fluid pressure source 3706 is fluidly connected to the servo valve 3704 by the high pressure fluid line 3707, and the drain 3709 is fluidly connected to the servo valve 3704 by the low pressure fluid line 3708.

At 4206, a servo valve is provided. The servo valve is positioned between the central pressure source and the hydraulic actuator. For example, the servo valve 3704 is positioned along a fluid path connecting the pressure source 3706 to the mode select valve 4104 and the actuator 400.

At 4208 a fluid reservoir is provided. At 4210, a fluid pump coupled to the fluid reservoir is provided. For example, the fluid reservoir 3918 and the fluid pump 3910 are provided. At 4212, a valve block is provided. For example, the mode select valve 4104 is provided in the system 4100.

At 4214 the fluid pump, the servo valve, and the valve block are controlled, and at 4216 high pressure is selectively provided to the first fluid line to apply pressurized fluid to the first pressure chamber. For example, the controller 4102 can activate the motor 3912, the servo valve 3704, and the mode select valve 4104 to connect and provide high pressure to one or more of the fluid lines 3720-3724, which in turn provide the pressurized fluid or one or more of the fluid chambers 422 and/or the bore 452.

At 4218, the first piston is urged partially outward from the first pressure chamber to urge rotation of the rotary output shaft in a first direction. For example, fluid pressure in the fluid chambers 422 urges the pistons 414 partially outward from the fluid chambers 422. The outward motion of the pistons 414 urges rotation of the rotor shaft 412.

In some embodiments, the housing can include a second arcuate chamber having a second cavity, and a second fluid port in fluid communication with the second cavity, wherein the rotor assembly further comprises a second rotor arm. The rotary actuator can also include an arcuate-shaped second piston positioned in the housing for reciprocal movement in the second arcuate chamber. A second seal, the second cavity, and the second piston can define a second pressure chamber, and a first portion of the second piston can contact the second rotor arm. For example the assembly 400 includes two of the pistons 414 and two of the fluid chambers 422. A second fluid line can be coupled to the second fluid port. In some implementations, the process 4200 can also include controlling the fluid pump to selectively provide high pressure to the second fluid line to apply pressurized fluid to the second pressure chamber, and urging the second piston partially outward from the second pressure chamber. For example, high pressure fluid can be applied to a second one of the fluid chambers 422 to urge a second one of the pistons 414 to move outward. In some embodiments, the fluid pump can provide high pressure to the bore 452 to urge the pistons 414 into the fluid chambers 422.

In some embodiments, a controller can be coupled to control the fluid pump. In some embodiments, controlling the servo valve can include controlling, by the controller, the servo valve to selectively connect the first fluid line to the high pressure fluid line and the low pressure fluid line to apply pressurized fluid to the first pressure chamber. In some embodiments, controlling the fluid pump can include controlling, by the controller, the fluid pump to selectively apply pressurized fluid to the first pressure chamber. In some embodiments, controlling the valve block can include controlling, by the controller, the valve block to selectively connect the servo valve and the fluid pump to the first pressure chamber. For example, the controller 4102 can control the motor 3912, the servo valve 3704, and the mode select valve 4104 to selectively pressurize the fluid chambers 422 and/or the bore 452.

In some embodiments, a position sensor (e.g., the position sensor assembly 3730) can be provided and configured to provide a position feedback signal indicative of a position of the rotary actuator. A position feedback signal from the position sensor can be provided to the controller to control the servo valve, and the controller can control the servo valve to selectively connect the first fluid line to the high pressure fluid line and the low pressure fluid line to apply pressurized fluid to the first pressure chamber based on the position feedback signal. In some embodiments, the position sensor can be coupled to the rotary output shaft, and the position feedback signal can be a rotary position feedback signal. In some embodiments, the position sensor can be a position limit sensor, and the position feedback signal can be a position limit signal. In some implementations, the process 4200 can include urging rotation of the rotary output shaft to control at least one of the group consisting of rotary output shaft speed, rotary output shaft position, rotary output shaft torque, and rotary output shaft acceleration.

In some embodiments, the process 4200 can be used with an actuator having a central actuation assembly, such as the assembly 2900 of FIGS. 29A-29E or the assembly 3000 of FIGS. 30A-30E.

Figure 43:
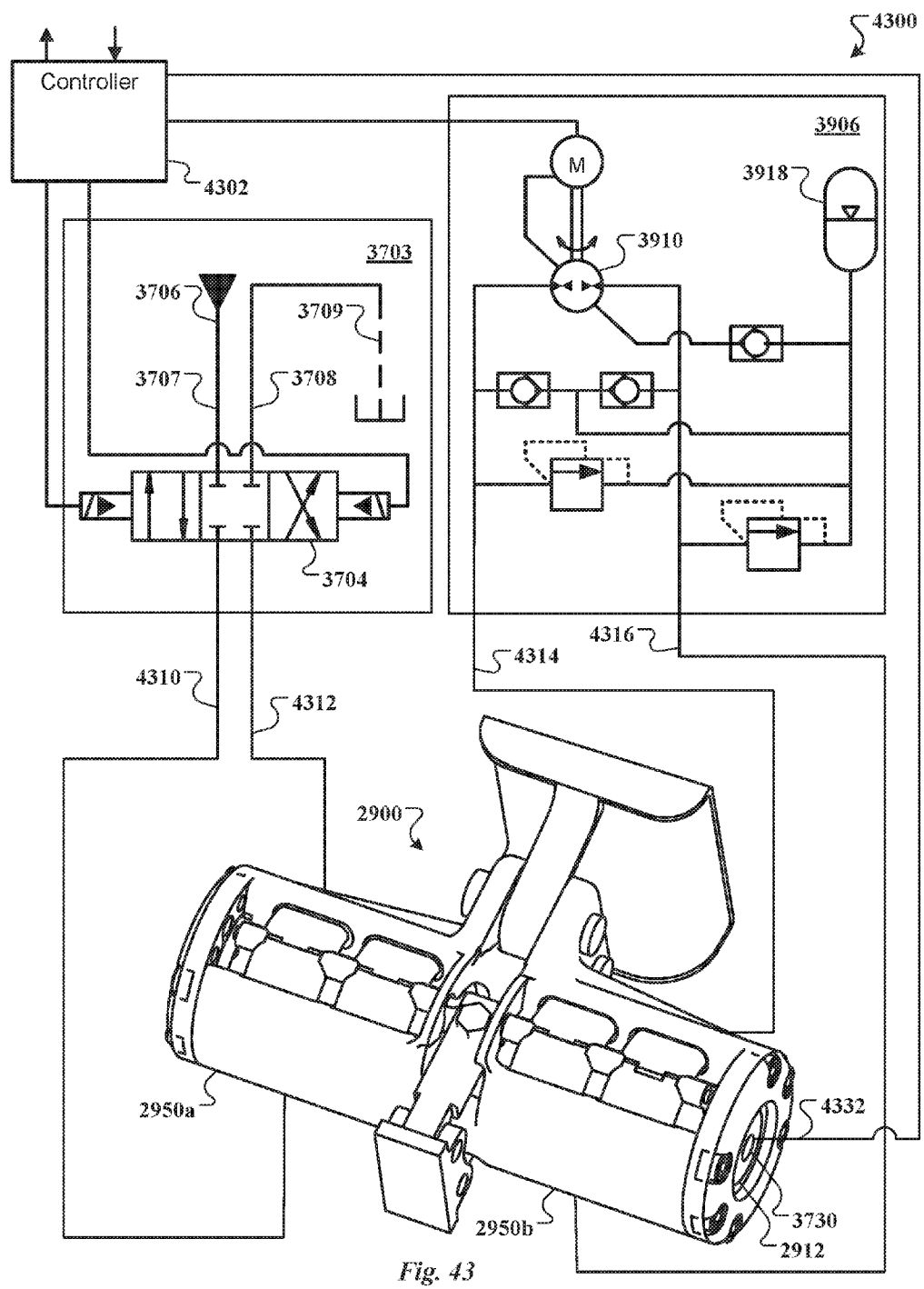
FIG. 43 is a schematic of another example rotary piston-type actuator system.

FIG. 43 is a schematic of another example rotary piston-type actuator system 4300. The system 4300 includes the rotary piston-type actuator 2900 of FIGS. 29A-29E. In some embodiments, the actuator 2900 may be replaced in the system 4300 by any appropriate one or combination of the rotary piston assemblies 200, 700, 1100, 1501, 1701, 2700, and 3500, the rotary piston 3400, and/or with any of the actuators 800, 1200, 1500, 1750, 1900, 2200, 2300, 2600, 2900, 3000, 3200 and 3300. The system 4300 also includes a controller 4302, the fluid pressure assembly 3703, and the fluid pressure source 3906.

The fluid pressure assembly 3703 and the fluid pressure source 3906 are each controllably connected to the controller 4302. The fluid pressure assembly 3703 is fluidly connected by a fluid line 4310 and a fluid line 4312 to one or more fluid chambers, e.g., the pressure chambers 1252*a* of FIGS. 12-14, formed as arcuate cavities in the first pressure chamber assembly 2950*a*. The fluid pressure source 3906 is fluidly connected by a fluid line 4314 and a fluid line 4316 to one or more fluid chambers, e.g., the pressure chambers 1252*a* of FIGS. 12-14, formed as arcuate cavities in the second pressure chamber assembly 2950*b*.

In some embodiments, the system 4300 can be used to provide redundant control of an actuator. For example, the actuator 2900 can be operated using fluid pressure provided by the fluid pressure assembly 3703 (e.g., a central hydraulic pressure system in an aircraft) and the fluid pressure source 3906 (e.g., a local hydraulic pressure system in an aircraft). In some embodiments, the fluid pressure assembly 3703 and the pressure source 3906 can be operated substantially simultaneously by the controller 4302. In some embodiments, the fluid pressure assembly 3703 and the pressure source 3906 can be operated alternatingly by the controller 4302. For example, the actuator 2900 can be operated under fluid pressure provided by the pressure source 3703, and when a malfunction is detected in the pressure source 3703, the controller 4302 can control the pressure source 3906 to control the actuator 2900 in a redundant backup configuration. In some embodiments, the system 4300 can be used to actuate a flight control surface or other apparatus in an aircraft.

The system 4300 includes the rotary position sensor assembly 3730. Signals from the position sensor assembly 3730 are provided to the controller 4302 over a conductor 4332 such as a wire or an optical fiber. In some embodiments, the controller 4302 can use the signal from the position sensor assembly 3730 to form a feedback loop for controlling the position of the rotor shaft 412.

Figure 44:
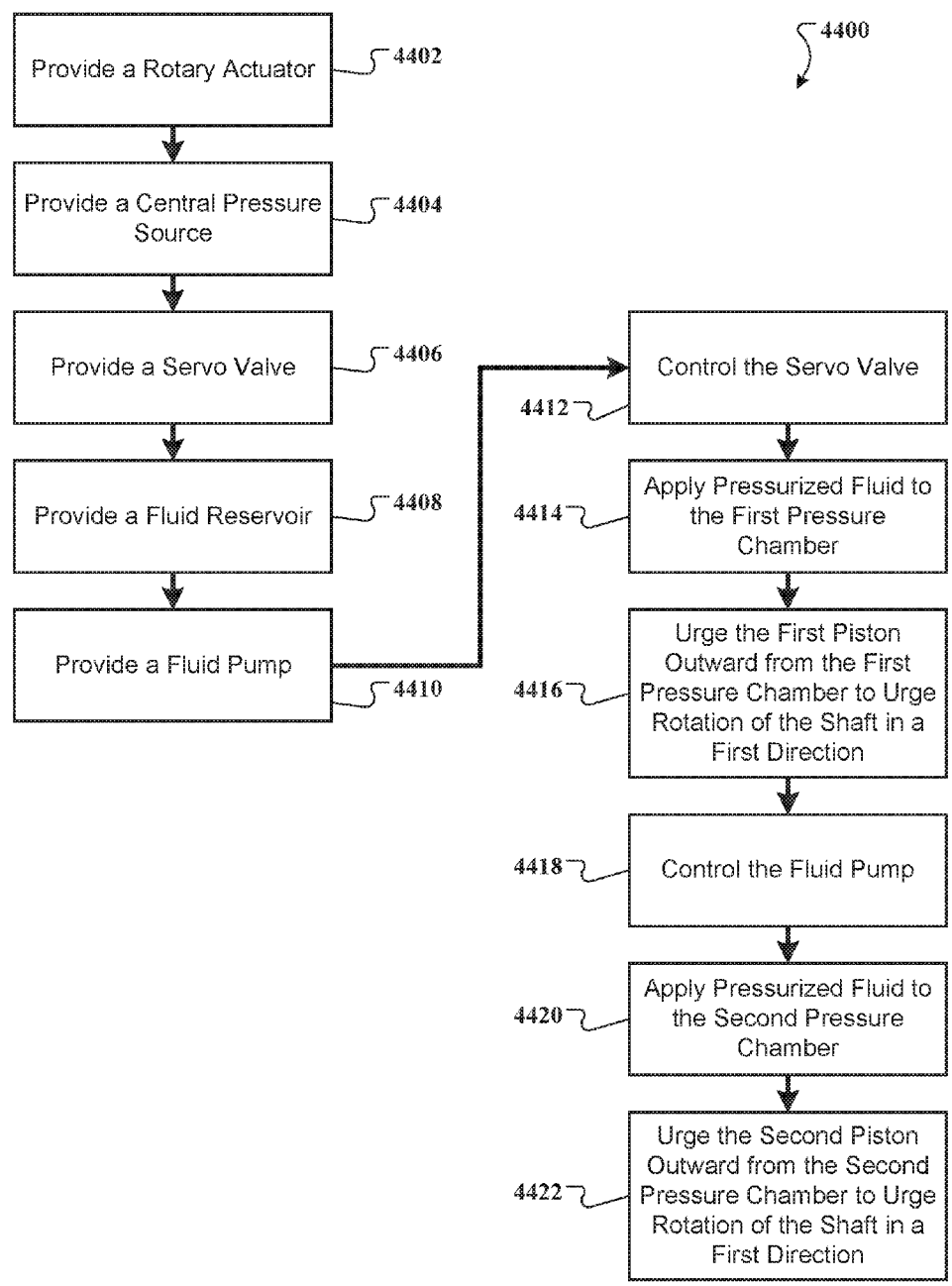
FIG. 44 is a flow diagram of an example process for using the example rotary piston-type actuator system of FIG. 43.

FIG. 44 is a flow diagram of an example process 4400 for using the example rotary piston-type actuator system of FIG. 43. At 4402, a rotary actuator is provided. The rotary actuator includes a first housing defining a first arcuate chamber having a first cavity, a first fluid port in fluid communication with the first cavity, and an open end, a rotor assembly rotatably journaled in said first housing and having a rotary output shaft and a first rotor arm extending radially outward from the rotary output shaft, and an arcuate-shaped first piston disposed in said first housing for reciprocal movement in the first arcuate chamber through the open end. A first seal, the first cavity, and the first piston define a first pressure chamber, and a first portion of the first piston contacts the first rotor arm. The actuator also includes a first fluid line coupled to the first fluid port, a high pressure fluid line, and a low pressure fluid line. For example, the rotary piston-type actuator 2900 can be provided.

At 4404 a central pressure source is provided. The central pressure source is coupled to the high pressure fluid line. For example, the fluid pressure source 3706 is fluidly connected to the servo valve 3704 by the high pressure fluid line 3707, and the drain 3709 is fluidly connected to the servo valve 3704 by the low pressure fluid line 3708.

At 4406, a servo valve is provided. The servo valve is positioned between the central pressure source and the hydraulic actuator. For example, the servo valve 3704 is positioned along a fluid path connecting the pressure source 3706 to the mode select valve 4104 and the actuator 2900.

At 4408 a fluid reservoir is provided. At 4410, a fluid pump coupled to the fluid reservoir is provided. For example, the fluid reservoir 3918 and the fluid pump 3910 are provided.

At 4412 the servo valve is controlled, and at 4414 pressurized fluid is applied to the first fluid line to provide pressurized fluid to the first pressure chamber. For example, the controller 4402 can control the servo valve 3704 to provide high pressure fluid to one or more of the fluid lines 4310-4312, which in turn provide the pressurized fluid or one or more of the fluid chambers in the first pressure chamber assembly 2950*a*.

At 4416, the first piston is urged partially outward from the first pressure chamber to urge rotation of the rotary output shaft in a first direction. For example, fluid pressure in the fluid chambers in the first pressure chamber assembly 2950*a* urges pistons, e.g., the dual rotary pistons 1216 of FIGS. 12-14, partially outward from the fluid chambers. The outward motion of the pistons urges rotation of the rotor shaft 2912.

At 4418 the fluid pump is controlled, and at 4420 pressurized fluid is applied to the second fluid line to provide pressurized fluid to the second pressure chamber. For example, the controller 4402 can control the fluid pump 3910 to provide high pressure fluid to one or more of the fluid lines 4314-4316, which in turn provide the pressurized fluid or one or more of the fluid chambers in the second pressure chamber assembly 2950*b*.

At 4422, the second piston is urged partially outward from the second pressure chamber to urge rotation of the rotary output shaft in a first direction. For example, fluid pressure in the fluid chambers in the second pressure chamber assembly 2950*b* urges pistons, e.g., the dual rotary pistons 1216 of FIGS. 12-14, partially outward from the fluid chambers. The outward motion of the pistons urges rotation of the rotor shaft 2912. In some embodiments, the second piston is urged partially outward from the second pressure chamber to urge rotation of the rotary output shaft in a second direction.

In some embodiments, a central actuation assembly can be provided, including a central mounting point formed in an external surface of the rotary output shaft, where the central mounting point is proximal to the longitudinal midpoint of the rotary output shaft. In some embodiments, an actuation arm can be removably attached at a proximal end to the central mounting point, the actuation arm adapted at a distal end for attachment to an external mounting feature of a member to be actuated. In some embodiments, the process 4400 can include urging rotation of the actuation arm, and urging motion of the member to be actuated. For example, the rotary piston-type actuator 2900 includes the central actuation assembly 2960 and the central mounting assembly 2980.

In some embodiments, the housing can include a second arcuate chamber having a second cavity, and a second fluid port in fluid communication with the second cavity, wherein the rotor assembly further comprises a second rotor arm. The rotary actuator can also include an arcuate-shaped second piston positioned in the housing for reciprocal movement in the second arcuate chamber. A second seal, the second cavity, and the second piston can define a second pressure chamber, and a first portion of the second piston can contact the second rotor arm. For example the assembly 2900 can include one or more of the dual rotary pistons 1216 of FIGS. 12-14, and two fluid chambers, e.g., the pressure chambers 1252a of FIGS. 12-14, formed as arcuate cavities in the first pressure chamber assembly 2950a. A second fluid line can be coupled to the second fluid port. In some implementations, the process 4400 can also include controlling the fluid pump to selectively provide high pressure to the second fluid line to apply pressurized fluid to the second pressure chamber, and urging the second piston partially outward from the second pressure chamber. For example, high pressure fluid can be applied to a second one of the fluid chambers in the first pressure chamber assembly 2950a to urge a second one of the pistons to move outward.

In some embodiments, the fluid pump may not be connected to a central hydraulic system. For example, the fluid pump 3910 is connected to the fluid reservoir 3918 and not the fluid pressure source 3706.

In some embodiments, a first controller can be coupled to control the servo valve, and a second controller can be coupled to control the fluid pump. In some embodiments, the first controller and the second controller can be a single controller. For example, the controller 4202 is configured to control both the servo valve 3704 and the fluid pump 3910. In some embodiments, controlling the servo valve can include controlling, by the controller, the servo valve to selectively connect the first fluid line to the high pressure fluid line and the low pressure fluid line to apply pressurized fluid to the first pressure chamber. In some embodiments, controlling the fluid pump can include controlling, by the controller, the fluid pump to selectively apply pressurized fluid to the second pressure chamber. For example, the controller 4402 can control the motor 3912 and the servo valve 3704 to selectively pressurize the fluid chambers in the first pressure chamber assembly 2950a and the second pressure chamber assembly 2950b.

In some embodiments, a position sensor (e.g., the position sensor assembly 3730) can be provided and configured to provide a position feedback signal indicative of a position of the rotary actuator. A position feedback signal from the position sensor can be provided to the first controller to control the servo valve and to the second controller to control the fluid pump, and the controllers can control the servo valve and the fluid pump based on the position feedback signal. In some embodiments, the position sensor can be coupled to the rotary output shaft, and the position feedback signal can be a rotary position feedback signal. In some embodiments, the first controller, the servo, and the position sensor can be configured as a first feedback loop, and the second controller, the fluid pump, and the position sensor can be configured as a second feedback loop.

In some embodiments, the position sensor can be a position limit sensor, and the position feedback signal can be a position limit signal. In some implementations, the process 4400 can include urging rotation of the rotary output shaft to control at least one of the group consisting of rotary output shaft speed, rotary output shaft position, rotary output shaft torque, and rotary output shaft acceleration.

In some embodiments, the first seal can be disposed about an interior surface of the open end. For example, the first seal can be the seal 1560 of FIG. 16, which is disposed about the interior surface at the open end 1565. In some embodiments, the first seal can be disposed about the periphery of the first piston. In some embodiments, the first housing can be formed as a one-piece housing. For example, the pressure chambers 1252a of FIGS. 12-14 are formed as one-piece chambers. In some embodiments, the first seal can be a one-piece seal. In some embodiments, first rotor arm can be coupled to a flight control surface of an aircraft. In some embodiments, the first rotor arm can be coupled to a primary flight control surface of an aircraft. In some embodiments, the central pressure source can be a central hydraulic system of an aircraft.

Figure 45:
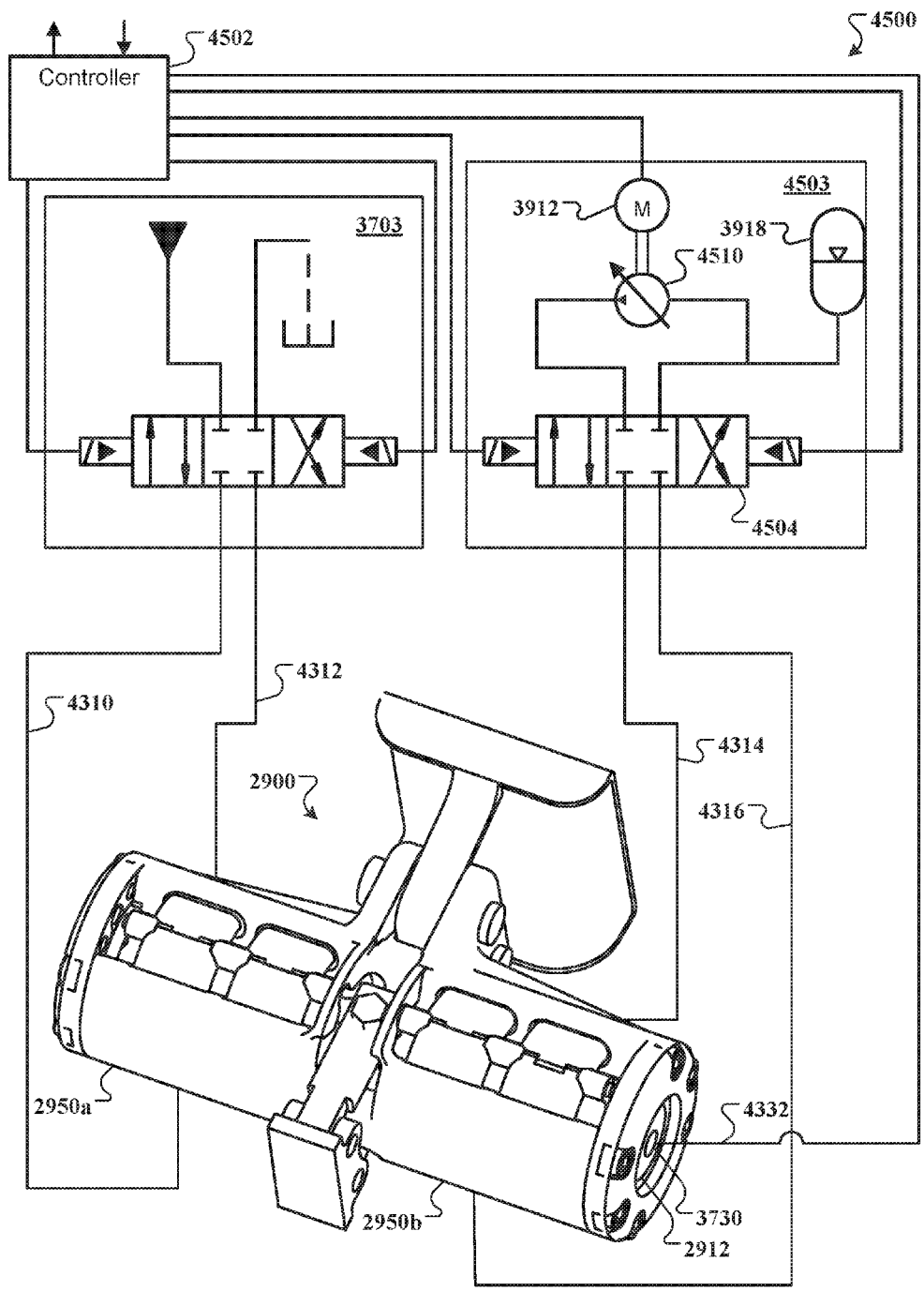
FIG. 45 is a schematic of another example rotary piston-type actuator system.

FIG. 45 is a schematic of another example rotary piston-type actuator system 4500. The system 4500 includes the rotary piston-type actuator 2900 of FIGS. 29A-29E. In some embodiments, the actuator 2900 may be replaced in the system 4500 by any appropriate one or combination of the rotary piston assemblies 200, 700, 1100, 1501, 1701, 2700, and 3500, the rotary piston 3400, and/or with any of the actuators 800, 1200, 1500, 1750, 1900, 2200, 2300, 2600, 2900, 3000, 3200 and 3300. The system 4500 also includes a controller 4502, the fluid pressure assembly 3703, and a fluid pressure source 4503.

The fluid pressure assembly 3703 is fluidly connected by the fluid lines 4310-4312 to one or more fluid chambers, e.g., the pressure chambers 1252a of FIGS. 12-14, formed as arcuate cavities in the first pressure chamber assembly 2950a.

The fluid pressure source 4503 includes a fluid pump 4510 driven by the motor 3912, which is controlled by the controller 4502. The fluid pump 4510 drives pressurized fluid unidirectionally to a servo valve 4504, and the controller 4502 controls the servo valve 4504 to selectably provide the pressurized fluid to the fluid chambers of the second pressure chamber assembly 2950b through the fluid lines 4314-4316 to cause actuation of the rotor shaft 2912.

In some embodiments, the system 4500 can be used to provide redundant control of an actuator. For example, the actuator 2900 can be operated using fluid pressure provided by the fluid pressure assembly 3703 (e.g., a central hydraulic pressure system in an aircraft) and the fluid pressure source 4503 (e.g., a local hydraulic pressure system in an aircraft). In some embodiments, the fluid pressure assembly 3703 and the pressure source 4503 can be operated substantially simultaneously by the controller 4502. In some embodiments, the fluid pressure assembly 3703 and the pressure source 3503 can be operated alternatingly by the controller 4502. For example, the actuator 2900 can be operated under fluid pressure provided by the pressure source 3703, and when a malfunction is detected in the pressure source 3703, the controller 4502 can control the pressure source 4503 to control the actuator 2900 in a redundant backup configuration. In some embodiments, the system 4500 can be used to actuate a flight control surface or other apparatus in an aircraft.

The system 4500 includes the rotary position sensor assembly 3730. Signals from the position sensor assembly 3730 are provided to the controller 4502 over the conductor 4332. In some embodiments, the controller 4502 can use the signal from the position sensor assembly 3730 to form a feedback loop for controlling the position of the rotor shaft 2912.

Figure 46:
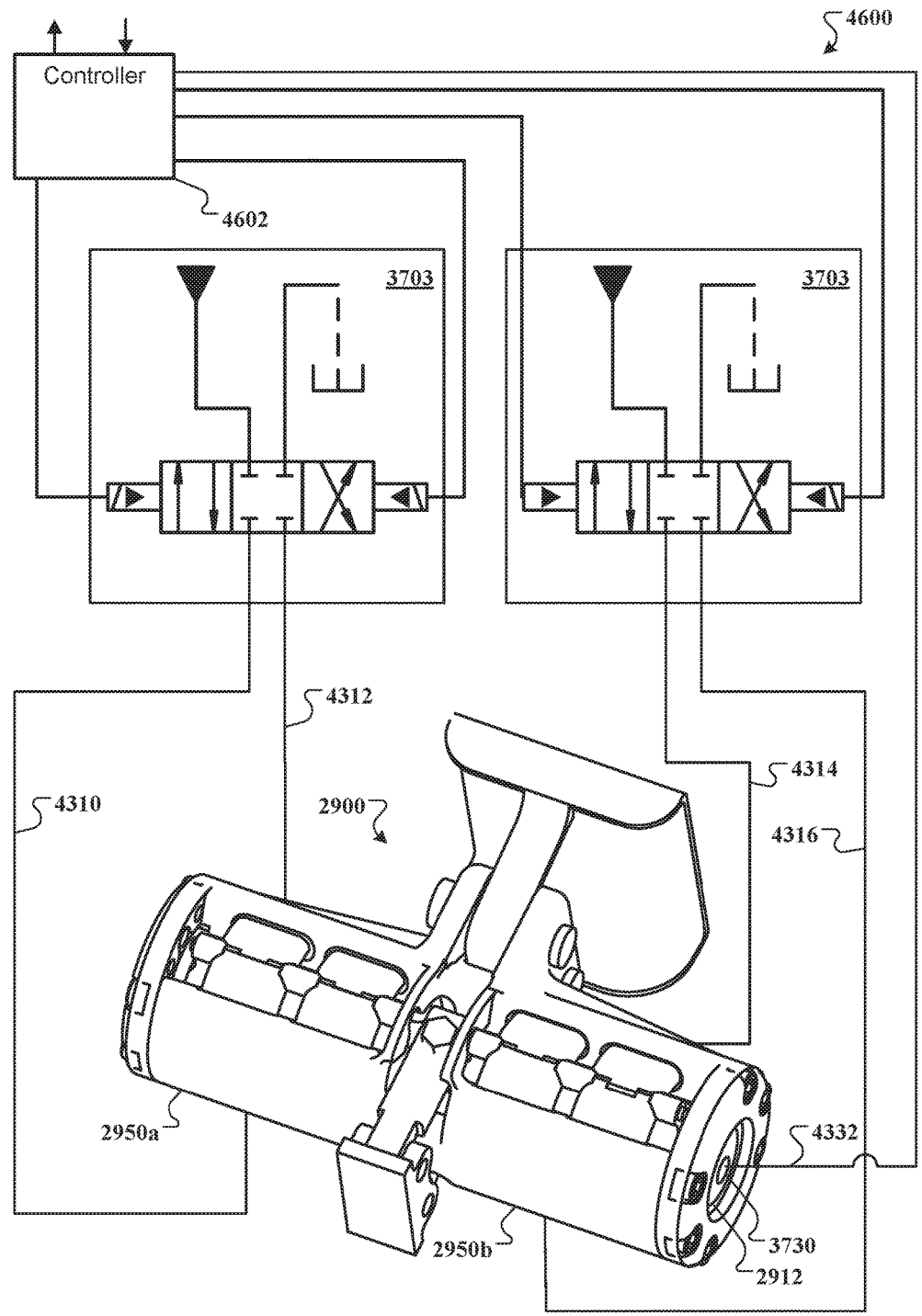
FIG. 46 is a schematic of another example rotary piston-type actuator system.

FIG. 46 is a schematic of another example rotary piston-type actuator system 4600. The system 4600 includes the rotary piston-type actuator 2900 of FIGS. 29A-29E. In some embodiments, the actuator 2900 may be replaced in the system 4500 by any appropriate one or combination of the rotary piston assemblies 200, 700, 1100, 1501, 1701, 2700, and 3500, the rotary piston 3400, and/or with any of the actuators 800, 1200, 1500, 1750, 1900, 2200, 2300, 2600, 2900, 3000, 3200 and 3300. The system 4600 also includes a controller 4602 and two of the fluid pressure sources 3703.

One of the fluid pressure sources 3703 is fluidly connected by the fluid lines 4310-4312 to one or more fluid chambers, e.g., the pressure chambers 1252a of FIGS. 12-14, formed as arcuate cavities in the first pressure chamber assembly 2950a.

The other of the fluid pressure sources 3703 is fluidly connected by the fluid lines 4314-4316 to one or more fluid chambers, e.g., the pressure chambers 1252a of FIGS. 12-14, formed as arcuate cavities in the first pressure chamber assembly 2950b.

In some embodiments, the system 4600 can be used to provide redundant control of an actuator. For example, the actuator 2900 can be operated using fluid pressure provided by both of the fluid pressure sources 3703. In some embodiments, the fluid pressure sources 3703 can be operated substantially simultaneously by the controller 4602. In some embodiments, the fluid pressure sources 3703 can be operated alternatingly by the controller 4602. For example, the actuator 2900 can be operated under fluid pressure provided by a first one of the pressure sources 3703, and when a malfunction is detected in the first pressure source 3703, the controller 4602 can control the a second one of the pressure sources 3703 to control the actuator 2900 in a redundant backup configuration.

In some embodiments, any appropriate combination of two or more fluid pressure sources can be used to control the actuator 2900. For example, two of the fluid pressure sources 4503 of FIG. 45 can be used, or two of the fluid pressure sources 3906 can be used, or any appropriate combination of the pressure sources 3703, 3906, and 4503 can be used simultaneously or alternatingly in a redundant backup configuration for the system 4600. In some embodiments, the system 4600 can be used to actuate a flight control surface or other apparatus in an aircraft.

The system 4600 includes the rotary position sensor assembly 3730. Signals from the position sensor assembly 3730 are provided to the controller 4602 over the conductor 4332. In some embodiments, the controller 4602 can use the signal from the position sensor assembly 3730 to form a feedback loop for controlling the position of the rotor shaft 2912.

Figure 47:
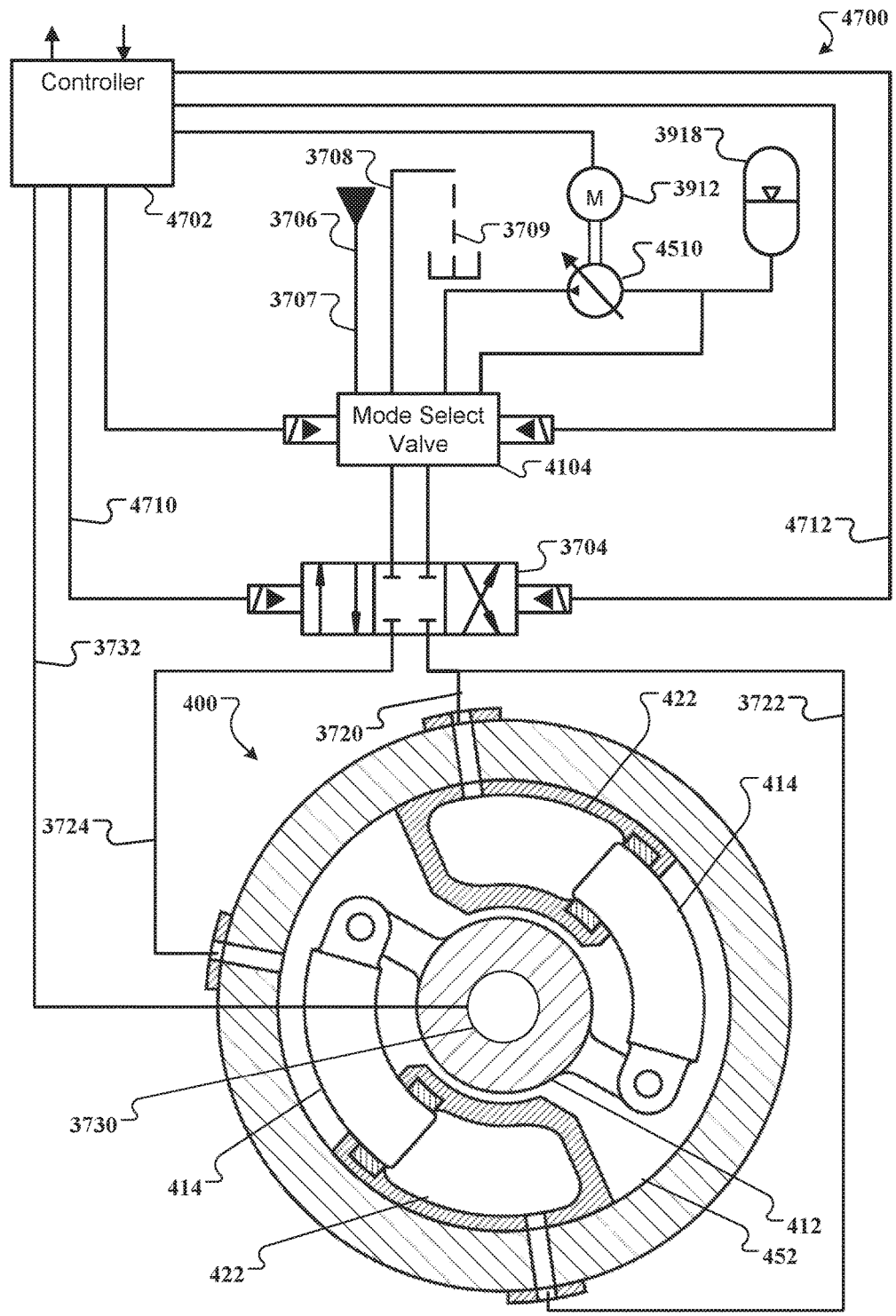
FIG. 47 is a schematic of another example rotary piston-type actuator system.

FIG. 47 is a schematic of another example rotary piston-type actuator system 4700. The system 4700 includes the rotary piston-type actuator 400 of FIGS. 29A-29E. In some embodiments, the actuator 400 may be replaced in the system 4700 by any of the rotary piston assemblies 200, 700, 1100, 1501, 1701, 2700, and 3500, the rotary piston 3400, and/or with any of the actuators 800, 1200, 1500, 1750, 1900, 2200, 2300, 2600, 2900, 3000, 3200 and 3300. The system 4700 also includes a controller 4702, the fluid pressure source 3706, the drain 3704, the motor 3912, the fluid pump 4510, the reservoir 3918, the mode select valve 4104, and the servo valve 3704.

The mode select valve 4104 is controllable by the controller 4702 to selectably provide fluid pressure from the fluid pressure source 3706 and the fluid pump 4510 to the servo valve 3704. The servo valve 3704 is fluidly connected to the fluid chambers 422 and the bore 452 by the fluid line 3720, the fluid line 3722, and the fluid line 3724. The controller 4702 is fluidly connected to the servo valve 3704 by a fluid line 4710 and a fluid line 4712. The controller 4702 is configured to selectively apply fluid pressure to the fluid lines 3710 and 3712 to actuate the servo valve 3704. The servo valve 3704 is configured to selectively and reversibly connect the fluid pressure provided through the mode select valve 4104 to the fluid chambers 422 and the bore 452.

The system 4700 includes the rotary position sensor assembly 3730. The rotary position sensor assembly 3730 is mechanically coupled to the actuator 400 to provide a signal representative of the position, speed, and/or acceleration of the rotor shaft 412. In some embodiments, the position sensor assembly 3730 is a position limit sensor configured to detect when the rotor shaft 412 has moved to a predetermined position. The signal is provided to the controller 4702 over the conductor 3732. In some embodiments, the controller 4702 can use the signal from the position sensor assembly 3730 to form a feedback loop for controlling the position of the rotor shaft 412.

In some embodiments, the system 4700 can be used to provide redundant control of an actuator. For example, the actuator 400 can be operated using fluid pressure provided by both of the fluid pressure source 3706 and the fluid pump 4510. For example, the actuator 400 can be operated under fluid pressure provided by the fluid pressure source 3706, and when a malfunction is detected in the pressure source 3706, the controller 4702 can control the mode select valve 4104 to select the fluid pump 4510 to provide fluid pressure to actuate the actuator 400 in a redundant backup configuration. In some embodiments, the system 4700 can be used to actuate a flight control surface or other apparatus in an aircraft.

In some embodiments, any appropriate combination of two or more fluid pressure sources can be used to control the actuator 400. For example, two of the fluid pressure sources 4503 of FIG. 45 can be used, or two of the fluid pressure sources 3906 can be used, or any appropriate combination of the pressure sources 3703, 3906, and 4503 can be used simultaneously or alternatingly in a redundant backup configuration for the system 4600.

Figure 48:
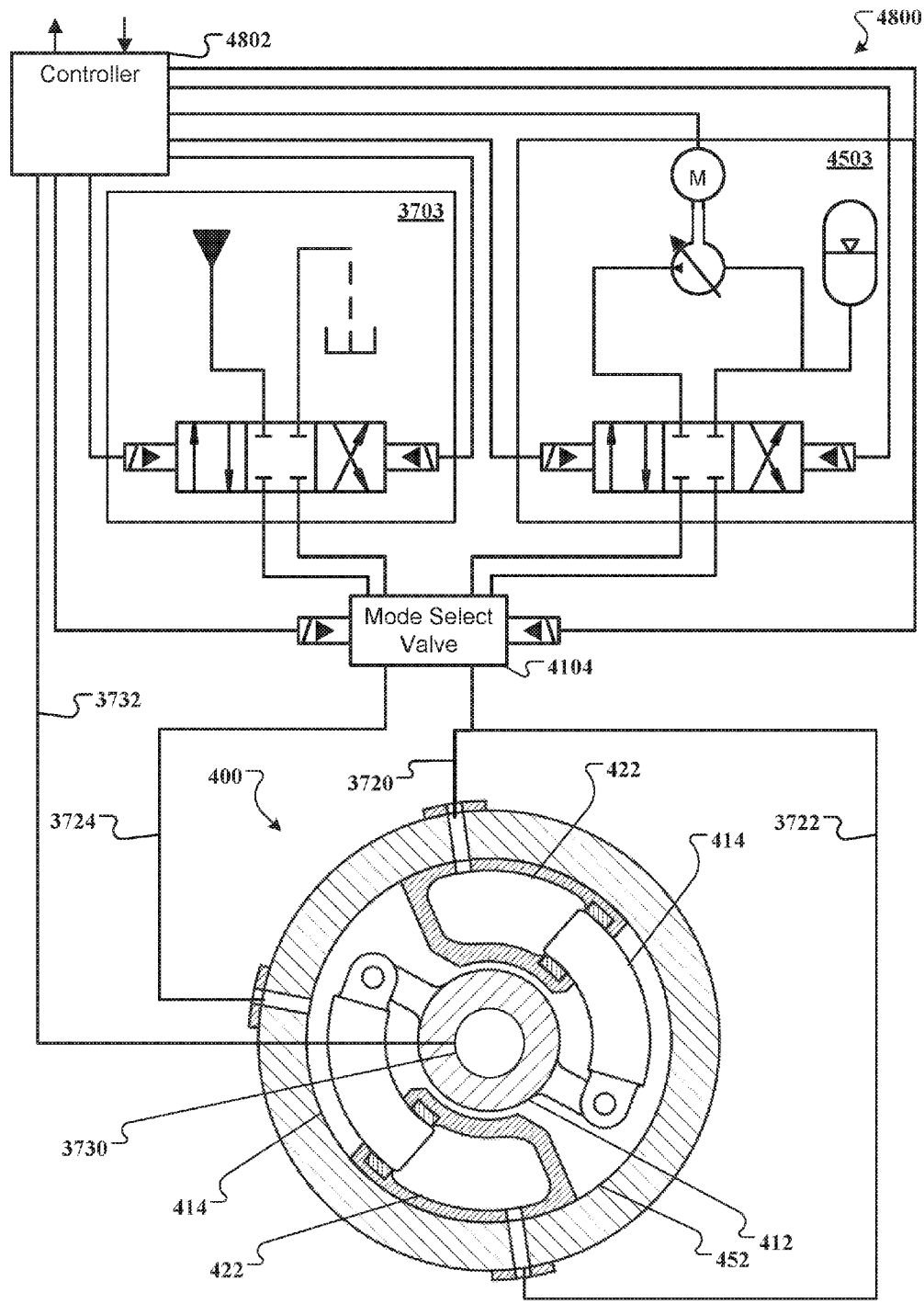
FIG. 48 is a schematic of another example rotary piston-type actuator system.

FIG. 48 is a schematic of another example rotary piston-type actuator system 4800. The system 4800 includes the rotary piston-type actuator 400 of FIGS. 29A-29E. In some embodiments, the actuator 400 may be replaced in the system 4800 by any of the rotary piston assemblies 200, 700, 1100, 1501, 1701, 2700, and 3500, the rotary piston 3400, and/or with any of the actuators 800, 1200, 1500, 1750, 1900, 2200, 2300, 2600, 2900, 3000, 3200 and 3300. The system 4800 also includes a controller 4802, the fluid pressure assembly 3703, the fluid pressure source 4503, and the mode select valve 4104.

The mode select valve 3704 is fluidly connected to the fluid chambers 422 and the bore 452 by the fluid line 3720, the fluid line 3722, and the fluid line 3724. The mode select valve 4104 is controllable by the controller 4802 to selectably provide fluid pressure from the fluid pressure assembly 3703 and the fluid pressure source 4503 to the fluid chamber 422 and the bore 452. The controller 4702 is configured to selectively control the fluid pressure sources 3703, 3906 and the mode select valve 4104 to selectively and reversibly connect the fluid pressure provided through the mode select valve 4104 to the fluid chambers 422 and the bore 452 to actuate the actuator 400

The system 4800 includes the rotary position sensor assembly 3730. The rotary position sensor assembly 3730 is mechanically coupled to the actuator 400 to provide a signal representative of the position, speed, and/or acceleration of the rotor shaft 412. In some embodiments, the position sensor assembly 3730 is a position limit sensor configured to detect when the rotor shaft 412 has moved to a predetermined position. The signal is provided to the controller 4802 over the conductor 3732. In some embodiments, the controller 4802 can use the signal from the position sensor assembly 3730 to form a feedback loop for controlling the position of the rotor shaft 412.

In some embodiments, the system 4800 can be used to provide redundant control of an actuator. For example, the actuator 400 can be operated using fluid pressure provided by both of the fluid pressure assembly 3703 and the fluid pressure source 3906. For example, the actuator 400 can be operated under fluid pressure provided by the fluid pressure assembly 3703, and when a malfunction is detected in the pressure source 3703, the controller 4802 can control the mode select valve 4104 to select the fluid pump 3910 to provide fluid pressure to actuate the actuator 400 in a redundant backup configuration. In some embodiments, the system 4800 can be used to actuate a flight control surface or other apparatus in an aircraft.

In some embodiments, any appropriate combination of two or more fluid pressure sources can be used to control the actuator 400. For example, two of the fluid pressure sources 4503 of FIG. 45 can be used, or two of the fluid pressure sources 3906 can be used, or any appropriate combination of the pressure sources 3703, 3906, and 4503 can be used simultaneously or alternatingly in a redundant backup configuration for the system 4800.

Figure 49B:
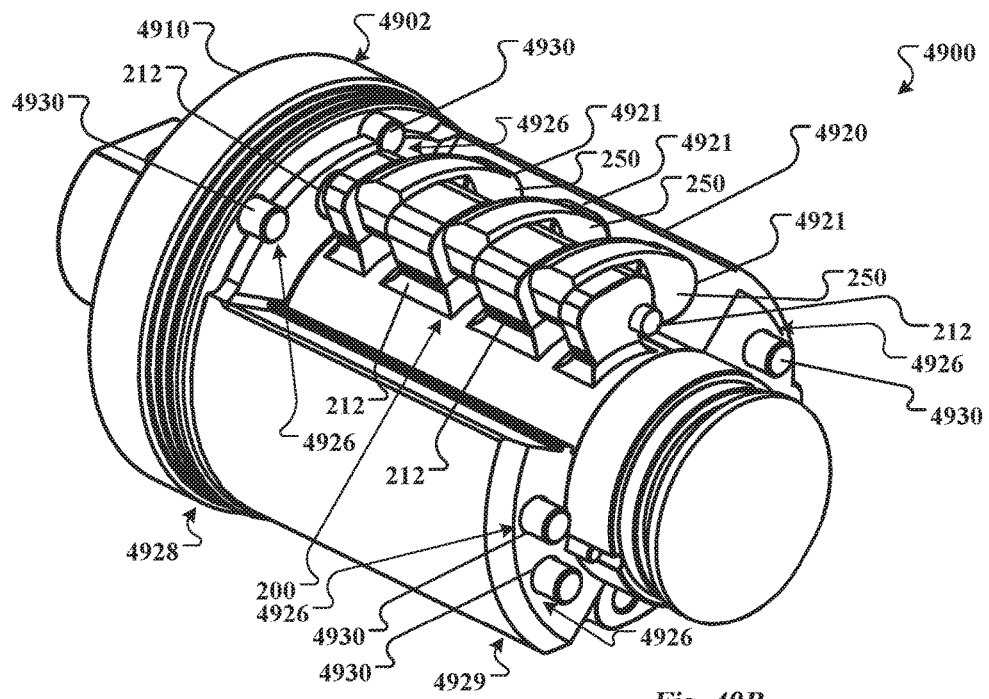
Figure 49C:
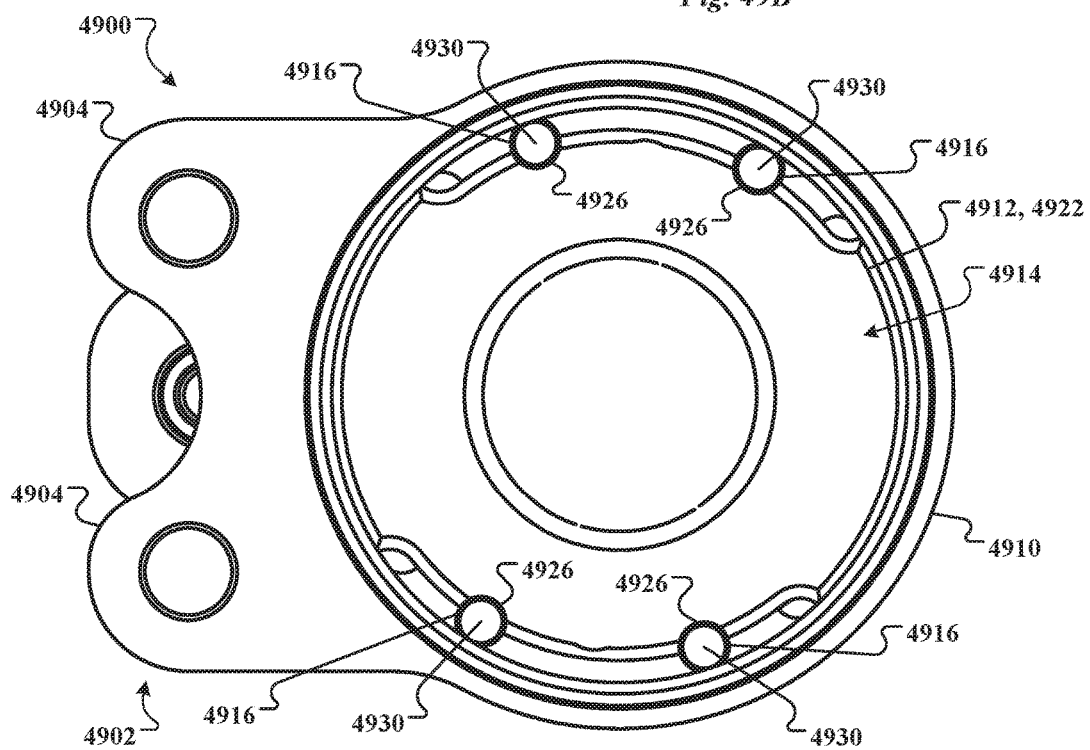

FIGS. 49A-49C are perspective, end, and exploded views of an example anti-rotation configuration of an example rotary piston-type actuator 4900. In some embodiments, the actuator 4900 may be a modification of any of the rotary piston assemblies 200, 700, 1100, 1501, 1701, 2700, and 3500, the rotary piston 3400, with any of the actuators 800, 1200, 1500, 1750, 1900, 2200, 2300, 2600, 2900, 3000, 3200 and 3300, and/or and of the systems 3700, 3900, 4100, 4300, 4500, 4600, 4700, and 4800.

The example actuator 4900, as shown in FIGS. 49A-49C, includes an outer housing 4910 having a mounting end 4902 and a distal end 4903. The outer housing 4910 includes an interior boundary 4912 that defines a central bore 4914 and includes a collection of interior recesses 4916. The outer housing 4910 includes a mounting lug 4904 that projects radially outward at the mounting end 4902 of the outer housing 4910. The mounting lug 4904 provides a mounting point for affixing, removably or permanently, the rotary actuator 4900 to an external mounting surface, such as the interior of an aircraft wing.

In the embodiment shown in FIGS. 49A-49C, a chamber housing assembly 4920 (e.g., a pressure chamber assembly) is disposed in the central bore 4914. In some embodiments, the chamber housing assembly 4920 can be an adaptation of and/or include the subcomponents of any one of the pressure chamber assemblies 300, 420, 820, 1120, 1250a, 1250b, 1550, 1750, 1960, 2210, 2602, 2950a, and 2950b, or of any other rotary actuator embodiments of FIGS. 1-48.

The chamber housing assembly 4920 includes an arcuate chamber (not shown), the arcuate chamber having a cavity (not shown), a fluid port (not shown) in fluid communication with the cavity, and an open end 4921. An exterior boundary 4922 of the chamber housing assembly 4920 includes a collection of exterior recesses 4926. The cavity also includes a collection of the exterior recesses 4926 (not shown). When the chamber housing 4920 is assembled into the central bore 4914 of the outer housing 4910 such that the interior boundary 4912 and the exterior boundary 4914 are in concentric proximity to each other, each of the exterior recesses 4926 aligns with a respective one of the interior recesses 4916. When the exterior recesses 4926 and the interior recesses 4916 align, a collection of circumferentially enclosed open spaces (e.g., bores) are provided.

A collection of pins 4930 are provided between the interior boundary 4912 of the outer housing 4910 and the exterior boundary 4922 of the chamber housing assembly 4920. Each of the pins 4930 is mated to one of the exterior recesses 4926 and a corresponding one of the interior recesses 4916 to maintain an orientation of the chamber housing assembly 4920 with respect to the outer housing 4910. In some embodiments, each exterior recess 4926 and the corresponding interior recess 4916 can define a pin receptacle, and each of the pins 4930 can extend from a mounting surface into a respective pin receptacle. For example, instead of the pins 4930 being discrete components that are assembled to the assembly 4900 (e.g., as shown in FIG. 49A), the pins 4930 may be formed as integral parts of the outer housing 4910, as integral parts of the pressure chamber housing assembly 4920, and/or as part of a locking plate in which the pins 4930 are formed as protrusions of a removable disk. In some embodiments, the interior recesses 4916 can be defined by interior depressions in the interior boundary 4912 at the mounting end 4902 of the outer housing 4910 and/or at the distal end 4903 of the outer housing 4910, and the exterior recesses 4926 can be defined by exterior depressions in the exterior boundary 4922 at a mounting end 4928 and/or at a distal end 4929 of the chamber housing assembly 4920. In some embodiments, the pin receptacles can define inner radiuses that are sized to mate with a cylindrical outer boundary of the pins 4930.

The example actuator 4900 also includes the rotor assembly (e.g., the rotary piston assembly 200, partly visible in FIG. 49B) rotatably journaled in the chamber housing assembly 4920 and comprising a rotary output shaft (e.g., the rotor shaft 210) and a collection of the rotor arms 212 extending radially outward from the rotary output shaft. The rotor assembly also includes a collection of the arcuate-shaped pistons 250 disposed in the chamber housing assembly 4920 for reciprocal movement in the arcuate chamber through the open ends 4921, wherein a seal (not shown), the cavity, and the piston 250 define a pressure chamber (not shown), and a portion of the piston 250 connects to the rotor arm 212.

Figure 50C:
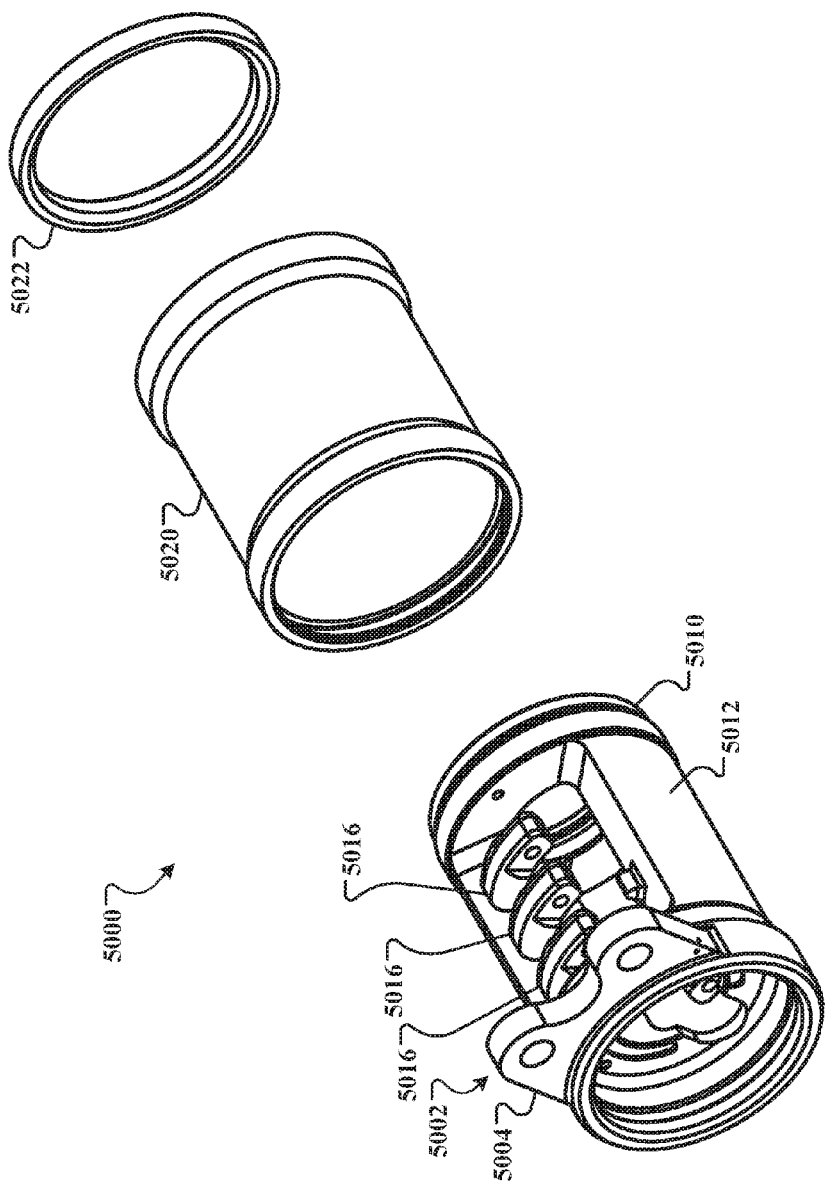

FIGS. 50A-50C are perspective and exploded views of another example anti-rotation configuration of an example rotary piston-type actuator 5000. In some embodiments, the actuator 5000 may be a modification of any of the rotary piston assemblies 200, 700, 1100, 1501, 1701, 2700, and 3500, the rotary piston 3400, with any of the actuators 800, 1200, 1500, 1750, 1900, 2200, 2300, 2600, 2900, 3000, 3200, 3300, and 4900, and/or and of the systems 3700, 3900, 4100, 4300, 4500, 4600, 4700, and 4800.

Referring mainly to FIGS. 50A and 50C, the example actuator 5000 includes a housing 5010 having an interior surface 5012 that defines a collection of arcuate chambers (not shown). Each of the arcuate chambers has a cavity 5014, a fluid port (not shown) in fluid communication with the cavity 5014, and an open end 5016. The housing 5010 also includes a mounting lug 5004 that projects radially outward from a cylindrical exterior portion 5006 of the housing 5010 at a mounting end 5002 of the housing 5010. The mounting lug 5004 provides a mounting point for affixing, removably or permanently, the rotary actuator 5000 to an external mounting surface, such as the interior of an aircraft wing.

In some embodiments, the housing 5010 can be a unitary structure that includes the arcuate chamber and the mounting lug 5004. For example, the housing 5010, the arcuate chamber, and the mounting lug 5004 can all be extruded, molded, machined, or otherwise formed from a single piece of material.

Referring now to FIGS. 50B and 50C, the example actuator 5000 includes the rotor assembly 200 rotatably journaled in the housing 5010 and having a rotary output shaft (e.g., the rotor shaft 210) and a collection of the rotor arms 212 (not shown) extending radially outward from the rotary output shaft. The rotor assembly includes a collection of the arcuate-shaped pistons 250. Each of the pistons 250 is disposed in the housing 5010 for reciprocal movement in the corresponding arcuate chamber through the open end 5016, wherein a seal (not shown), the cavity 5014, and the piston 250 define a pressure chamber, and a portion of the piston 250 connects to the rotor arm (e.g., the piston 250 can connect to the rotor arm 210 as shown in FIG. 2).

A housing sleeve 5020 is formed as a cylinder with an inner diameter that permits the housing sleeve 5020 to slip over and radially surround the housing 5010. A retaining ring 5022 is removably affixed to the housing 5010 (e.g., by threads, fasteners, clamps) to retain the housing sleeve 5020 in its assembled position. In some embodiments, the housing sleeve 5020 and/or the retaining ring 5022 can include sleeve seals (e.g., o-rings) such that the housing sleeve 5020, the sleeve seals, the portions of the pistons 250 that are outside of the pressure chambers, the seals about the open ends, and interior surfaces of the housing 5010 form one or more pressure chambers. For example, fluid can be applied to the pressure chambers formed outside of the cavities 5014 to urge the arcuate-shaped pistons 5016 into the cavity 5014.

Figure 51A:
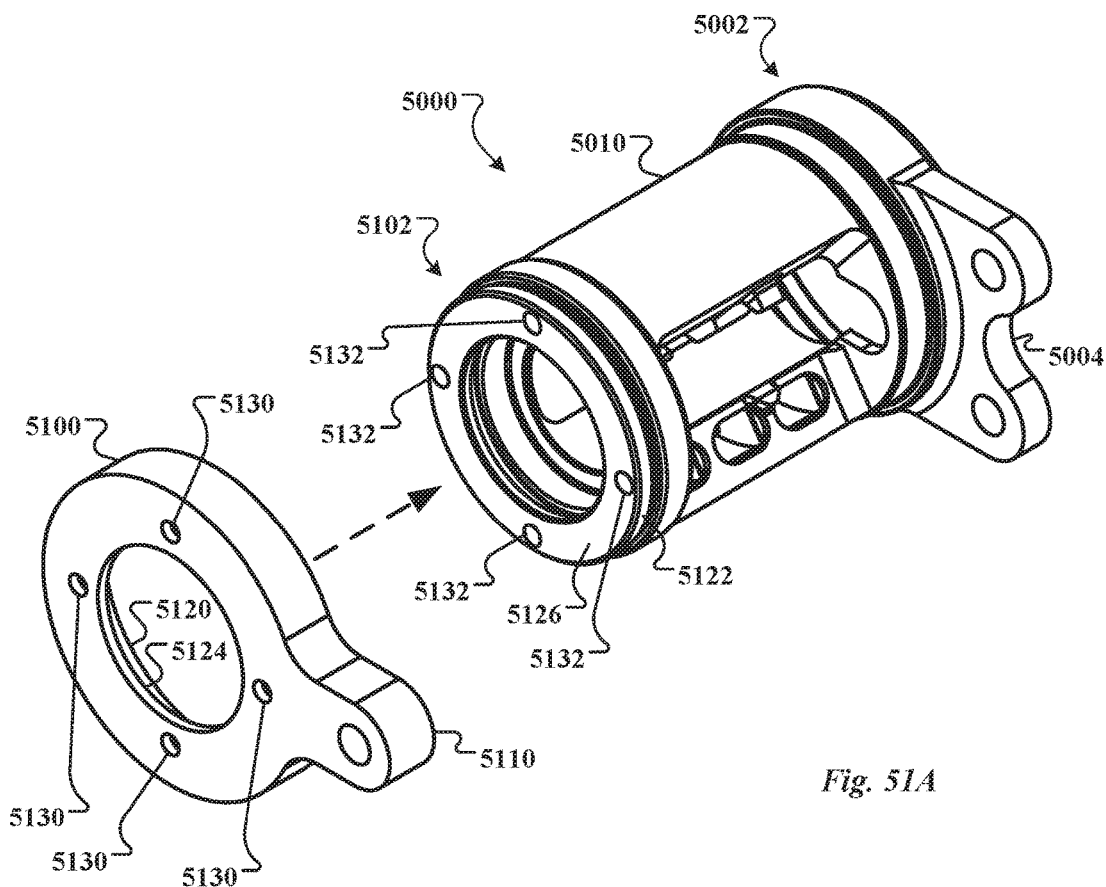
FIGS. 51A and 51B are perspective views of another example anti-rotation configuration of an example rotary piston-type actuator.
Figure 51B:
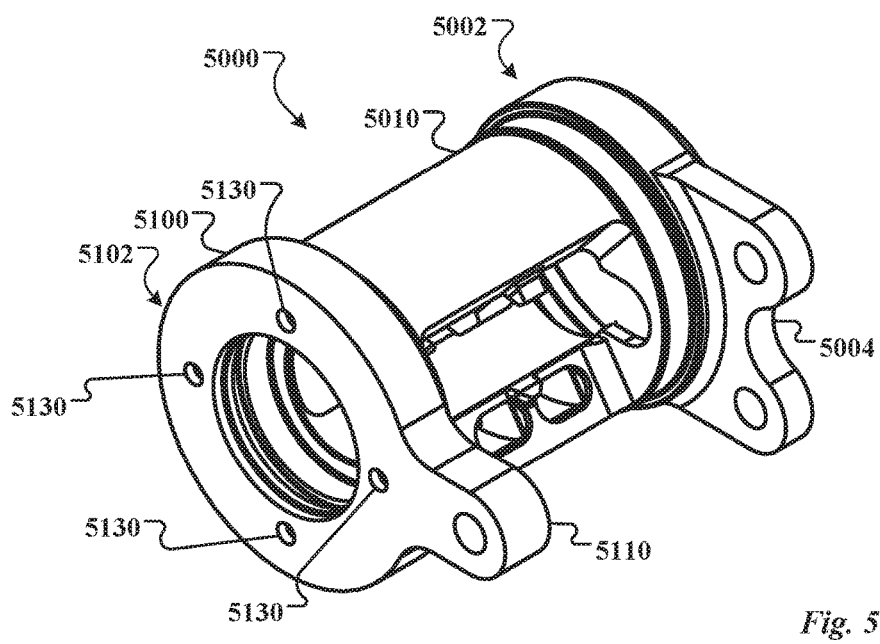

FIGS. 51A and 51B are perspective views of the example rotary piston-type actuator 5000 with a support ring 5100. The support ring 5100 includes a mounting lug 5110 that projects radially outward from a cylindrical exterior portion of the support ring 5100. The mounting lug 5110 provides a mounting point for affixing, removably or permanently, the rotary actuator 5000 to an external mounting surface, such as the interior of an aircraft wing, at an end 5102 axially opposed to the mounting end 5002.

Referring now to FIG. 51A, the support ring 5100 has an interior surface 5120 that mates with an exterior surface 5122 of the housing 5010 to maintain an orientation of the support ring 5100 with respect to the housing 5010. The interior surface 5120 includes one or more flat regions 5124 that mate with one or more corresponding flat regions 5126 on the exterior surface 5122 of the housing 5010 at the end 5102. For example, referring now to FIG. 51B, when the support ring 5100 is assembled to the housing 5010 at the end 5102, the flat regions 5124 can at least partly contact the flat regions 5126 to orient the support ring 5100 with respect to the housing 5010.

In some embodiments, the orientation of the support ring 5100 relative to the housing 5010 can orient the mounting lug 5110 relative to the mounting lug 5004. For example, the mounting lug 5110 may be oriented substantially aligned in parallel with the mounting lug 5004, substantially perpendicular to the mounting lug 5004, or oriented at any appropriate angle relative to the orientation of the mounting lug 5004.

Referring now to FIGS. 51A and 51B, the support ring 5100 includes a collection of bores 5130. The bores 5130 align with a collection of bores 5132 formed in the end 5102 such that a collection of fasteners (not shown) (e.g., bolts, screws, clamps) can be passed through the bores 5130 and into the bores 5132 to removably secure the support ring 5100 to the housing 5010. In some embodiments, the bores 5130, 5132 and the fasteners can orient the support ring 5100 rotationally, relative to the housing 5010.

Figure 52:
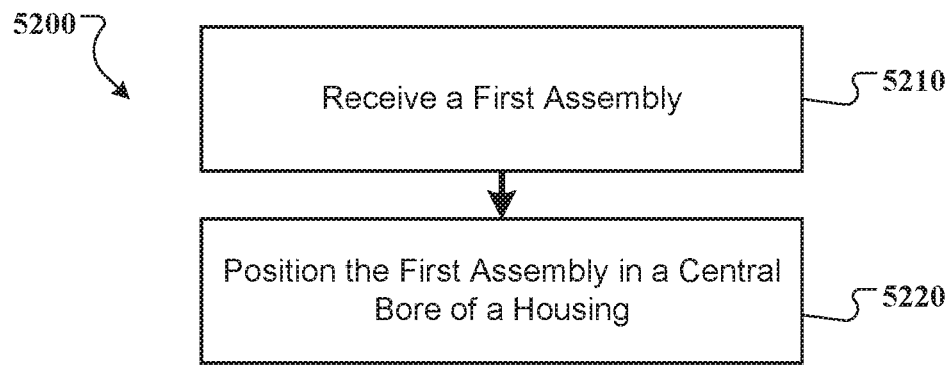
FIG. 52 is a flow diagram of an example process for assembling an anti-rotation configuration of an example rotary piston-type actuator.

FIG. 52 is a flow diagram of an example process 5200 for assembling an anti-rotation configuration of an example of a rotary piston-type actuator. In some implementations, the process 5200 can be used to assemble the actuator 4900 of FIGS. 49A-49C.

At 5210, a first assembly is received. The first assembly includes a chamber housing assembly having an arcuate chamber comprising a cavity, a fluid port in fluid communication with the cavity, and an open end, an exterior boundary of the chamber housing assembly comprising exterior recesses. For example, the housing assembly can be the assembly 4920. The first housing also includes pins mated to the exterior recesses of the chamber housing assembly (e.g., the pins 4930, the recesses 4916), a rotor assembly (e.g., the rotor assembly 200) rotatably journaled in the chamber housing assembly and comprising a rotary output shaft and a rotor arm extending radially outward from the rotary output shaft, and an arcuate-shaped piston disposed in the chamber housing assembly for reciprocal movement in the arcuate chamber through the open end. A seal, the cavity, and the piston define a pressure chamber, and a portion of the piston connects to the rotor arm.

At 5220, the first assembly is positioned in a central bore of a housing. The housing includes an interior boundary that defines the central bore and has interior recesses. For example, the housing can be the outer housing 4910. Positioning the first assembly in the central bore of the housing aligns each of the interior recesses with a respective one of the exterior recesses and mates the interior recess to a corresponding pin to maintain an orientation of the chamber housing assembly with respect to the housing. For example, as shown in FIG. 49C, the assembly 4920 can be inserted into the outer housing 4910 in an orientation that aligns the recesses 4916 and 4926 and provides spaces in which the pins 4930 can be inserted. With the pins 4930 in place, the assembly 4920 is substantially prevented from rotating relative to the outer housing 4910.

Figure 53:
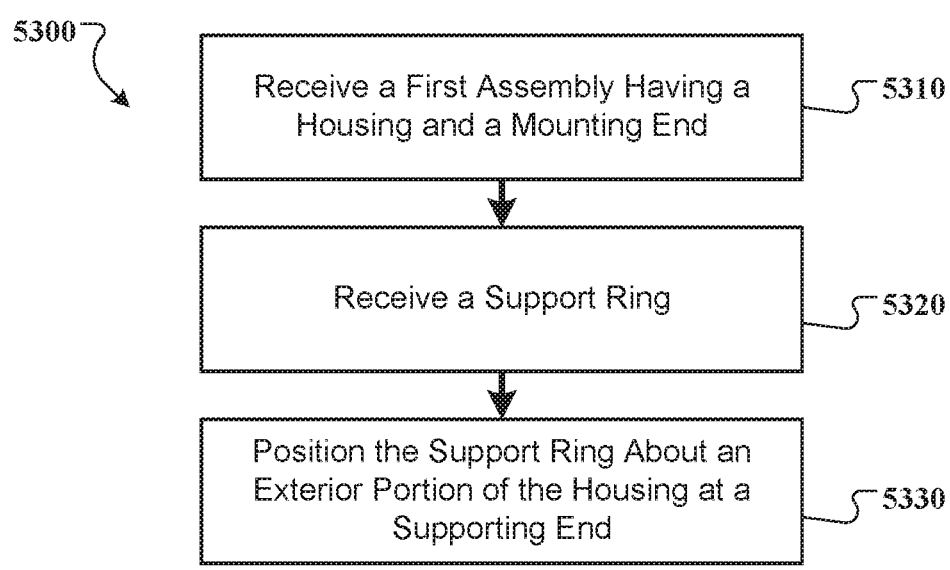
FIG. 53 is a flow diagram of another example process for assembling an anti-rotation configuration of an example rotary piston-type actuator.

FIG. 53 is a flow diagram of another example process 5300 for assembling an anti-rotation configuration of an example of a rotary piston-type actuator. In some implementations, the process 5300 can be used to assemble the actuator 5000 and the support ring 5100 of FIGS. 51A and 51B.

At 5310, a first assembly is received. For example, the actuator 5000 can be received. The assembly includes a housing (e.g., the housing 5010) having an interior surface that defines an arcuate chamber, the arcuate chamber comprising a cavity, a fluid port in fluid communication with the cavity, and an open end. The housing has a mounting lug (e.g., the lug 5004) that projects radially outward from a cylindrical exterior portion of the housing at a mounting end of the housing (e.g., mounting end 5002). The mounting lug provides a mounting point for removably affixing the rotary actuator to an external mounting surface. The assembly also includes a rotor assembly rotatably journaled in the housing and has a rotary output shaft and a rotor arm extending radially outward from the rotary output shaft. The assembly also has an arcuate-shaped piston disposed in the housing for reciprocal movement in the arcuate chamber through the open end. A seal, the cavity, and the piston define a pressure chamber, and a portion of the piston connects to the rotor arm.

At 5320, a support ring (e.g., the support ring 5100) is received. The support ring includes a second mounting lug (e.g., the lug 5110) that projects radially outward from a cylindrical exterior portion of the support ring.

At 5330, the support ring is positioned about a cylindrical exterior portion of the housing at a supporting end of the housing axially opposed to the mounting end. For example, the support ring 5100 can be removably or permanently affixed to the support end 5102 of the housing 5010.

Although a few implementations have been described in detail above, other modifications are possible. For example, the logic flows depicted in the figures do not require the particular order shown, or sequential order, to achieve desirable results. In some examples, the terms "about", "proximal", "approximately", "substantially", or other such terms in association with a position or quantity, can mean but are not limited to, the described position or quantity plus or minus 10% of the described quantity or length of the major dimension of the described position, or within 10% deviation from of the average of the described quantity or position, unless specified otherwise. In addition, other steps may be provided, or steps may be eliminated, from the described flows, and other components may be added to, or removed from, the described systems. Accordingly, other implementations are within the scope of the following claims.

What is claimed is:

1. A rotary actuator comprising:
    a housing comprising an external peripheral surface and an interior surface that defines an arcuate chamber, the arcuate chamber comprising a cavity, a fluid port in fluid communication with the cavity, and an open end, a radial recess formed in the external peripheral surface, the housing comprising a mounting lug that projects radially outward from a cylindrical exterior portion of the housing at a mounting end of the housing and disposed about 180 degrees from the radial recess, the mounting lug adapted for attachment to an external mounting connector of an external mounting surface and providing a mounting point for removably affixing the rotary actuator to the external mounting surface;
    a rotor assembly rotatably journaled in the housing and comprising a rotary output shaft and a rotor arm extending radially outward from the rotary output shaft through the radial recess; and
    an arcuate-shaped piston disposed in the housing for reciprocal movement in the arcuate chamber through the open end, wherein a seal, the cavity, and the piston define a pressure chamber, and a portion of the piston connects to the rotor arm.

2. The rotary actuator of claim 1, wherein the housing comprises a unitary structure that includes the arcuate chamber and the mounting lug.

3. The rotary actuator of claim 1, further comprising a support ring about the housing, the support ring comprising a second mounting lug that projects radially outward from a cylindrical exterior portion of the support ring.

4. The rotary actuator of claim 3 wherein the support ring comprises an interior surface that mates with an exterior surface of the housing to maintain an orientation of the support ring with respect to the housing.

5. The rotary actuator of claim 3, wherein the interior surface includes flat regions that mate with corresponding flat regions on the exterior surface of the housing.

6. The rotary actuator of claim 1, wherein the housing further comprises a chamber housing assembly and an outer housing, wherein the outer housing comprises the mounting lug and an interior boundary that defines a central bore and comprises interior recesses, and the chamber housing assembly comprises exterior recesses and the interior surface that defines the arcuate chamber, and the rotary actuator further comprises pins residing between the interior boundary of the outer housing and the exterior boundary of the chamber housing assembly, each of the pins mated to one of the exterior recesses and a corresponding one of the interior recesses to maintain an orientation of the chamber housing assembly with respect to the outer housing.

7. The rotary actuator of claim 1, wherein the mounting lug defines a first bore and a second bore, the first bore and the second bore each formed parallel to a longitudinal axis of the rotary output shaft, the first bore being radially spaced apart from the second bore.

8. The rotary actuator of claim 7, further comprising a support ring about the housing, the support ring comprising a second mounting lug that projects radially outward from a cylindrical exterior portion of the support ring, the second mounting lug defining a third bore formed parallel to the first bore and the second bore and aligned radially between the first bore and the second bore.

9. A method of assembling a rotary actuator, the method comprising:
    receiving a first assembly comprising:
        a housing comprising a radial recess formed in an external peripheral surface of the housing and an interior surface that defines an arcuate chamber, the arcuate chamber comprising a cavity, a fluid port in fluid communication with the cavity, and an open end, the housing comprising a mounting lug that projects radially outward from a cylindrical exterior portion of the housing at a mounting end of the housing, the mounting lug providing a mounting point for removably affixing the rotary actuator to an external mounting surface;
        a rotor assembly rotatably journaled in the housing and comprising a rotary output shaft and a rotor arm extending radially outward from the rotary output shaft through the radial recess; and
        an arcuate-shaped piston disposed in the housing for reciprocal movement in the arcuate chamber through the open end, wherein a seal, the cavity, and the piston define a pressure chamber, and a portion of the piston connects to the rotor arm;
    receiving a support ring comprising a second mounting lug that projects radially outward from a cylindrical exterior portion of the support ring;
    positioning the support ring about a cylindrical exterior portion of the housing at a supporting end of the housing axially opposed to the mounting end;
    energizing the rotor assembly;
    urging rotation of the rotary output shaft;
    urging rotation of the rotor arm; and
    urging motion of a member to be actuated.

10. The method of claim 9, wherein the support ring comprises an interior surface that mates with an exterior surface of the housing to maintain an orientation of the support ring with respect to the housing, the method further comprising mating the interior surface with the exterior surface.

11. The method of claim 9, wherein the interior surface includes flat regions that mate with corresponding flat regions on the exterior surface of the housing, the method further comprising mating the flat regions of the interior surface with the corresponding flat regions on the exterior surface of the housing.

12. The method of claim 9, wherein a piston housing assembly is located within the cavity of the arcuate chamber.

13. The method of claim 9, wherein:

the housing further comprises a chamber housing assembly and an outer housing, wherein the outer housing comprises the mounting lug and an interior boundary that defines a central bore and comprises interior recesses, and the chamber housing assembly comprises exterior recesses and the interior surface that defines the arcuate chamber, and the method further comprising:

- providing pins configured to be mated to the exterior recesses and the interior recesses,
- mating each of the exterior recesses with a corresponding pin,
- positioning the chamber housing assembly in the central bore of the outer housing,
- aligning each of the interior recesses with a respective one of the pins mated with a corresponding exterior recess, and
- mating the interior recess to a corresponding pin to maintain an orientation of the chamber housing assembly with respect to the outer housing.

14. The method of claim 9, wherein the mounting lug is disposed about 180 degrees from the radial recess, said mounting assembly adapted for attachment to an external mounting connector of a mounting surface.

15. The method of claim 9, wherein the mounting lug defines a first bore and a second bore, the first bore and the second bore each formed parallel to a longitudinal axis of the rotary output shaft, the first bore being radially spaced apart from the second bore, and the second mounting lug defines a third bore;

wherein positioning the support ring about a cylindrical exterior portion of the housing at a supporting end of the housing axially opposed to the mounting end further comprises orienting the third bore parallel to the first bore and the second bore and aligning the third bore radially between the first bore and the second bore.

* * * * *